United States Patent
Hirakawa

(10) Patent No.: US 12,474,551 B2
(45) Date of Patent: Nov. 18, 2025

(54) IMAGING LENS AND IMAGING APPARATUS

(71) Applicant: FUJIFILM Corporation, Tokyo (JP)

(72) Inventor: Yuya Hirakawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 395 days.

(21) Appl. No.: 18/156,770

(22) Filed: Jan. 19, 2023

(65) Prior Publication Data
US 2023/0266569 A1 Aug. 24, 2023

(30) Foreign Application Priority Data

Jan. 27, 2022 (JP) .................... 2022-011184

(51) Int. Cl.
G02B 15/14 (2006.01)
G02B 13/00 (2006.01)
G02B 13/18 (2006.01)

(52) U.S. Cl.
CPC ....... *G02B 15/1421* (2019.08); *G02B 13/006* (2013.01); *G02B 13/18* (2013.01)

(58) Field of Classification Search
CPC .. G02B 15/1421; G02B 13/006; G02B 13/18; G02B 9/64; G02B 13/02; G02B 15/20; G02B 15/1431; G02B 15/22; G02B 15/14; G02B 13/00
USPC ......... 359/682, 686–688, 747, 753, 771–783
See application file for complete search history.

(56) References Cited

U.S. PATENT DOCUMENTS

| | | | | |
|---|---|---|---|---|
| 2002/0005851 A1* | 1/2002 | Kinno | ............ | G02B 27/646 345/426 |
| 2012/0194924 A1 | 8/2012 | Sakai et al. | | |
| 2014/0055558 A1* | 2/2014 | Souma | ............ | G02B 9/14 359/708 |
| 2014/0340763 A1 | 11/2014 | Harada | | |
| 2016/0139386 A1 | 5/2016 | Morooka | | |
| 2016/0313543 A1 | 10/2016 | Nakahara | | |
| 2017/0176721 A1 | 6/2017 | Kim et al. | | |
| 2018/0074300 A1* | 3/2018 | Gyoda | ............ | G02B 15/177 |

(Continued)

FOREIGN PATENT DOCUMENTS

| | | |
|---|---|---|
| JP | 2012-159613 A | 8/2012 |
| JP | 2014-021341 A | 2/2014 |
| JP | 2016-099362 A | 5/2016 |

(Continued)

OTHER PUBLICATIONS

An Office Action; "Notice of Reasons for Refusal," mailed by the Japanese Patent Office on Jul. 29, 2025, which corresponds to Japanese Patent Application No. 2022-011184 and is related to U.S. Appl. No. 18/156,770; with English language translation.

*Primary Examiner* — Thomas K Pham
*Assistant Examiner* — Kuei-Jen L Edenfield
(74) *Attorney, Agent, or Firm* — Studebaker Brackett PLLC

(57) ABSTRACT

The imaging lens includes, successively in order from a position closest to an object side, a first lens group that has a positive refractive power and a second lens group that has a negative refractive power. During focusing, only the second lens group moves. The first lens group consists of a first A group, an aperture stop, and a first B group, in order from the object side. The second lens group includes at least one positive lens. The imaging lens satisfies predetermined conditional expressions.

20 Claims, 20 Drawing Sheets

(56) References Cited

U.S. PATENT DOCUMENTS

2019/0306389 A1   10/2019   Kawamura
2021/0333512 A1   10/2021   Tomioka

FOREIGN PATENT DOCUMENTS

| JP | 2016-206491 A | 12/2016 |
| JP | 2018-045064 A | 3/2018 |
| JP | 2019-174713 A | 10/2019 |
| JP | 2021-173847 A | 11/2021 |
| WO | 2013/118470 A1 | 8/2013 |

* cited by examiner

EXAMPLE 1

EXAMPLE 1

EXAMPLE 2

EXAMPLE 3

EXAMPLE 3

EXAMPLE 4

EXAMPLE 5

EXAMPLE 6

EXAMPLE 6

EXAMPLE 7

EXAMPLE 8

IMAGING LENS AND IMAGING APPARATUS

CROSS-REFERENCE TO RELATED APPLICATIONS

This application claims priority from Japanese Patent Application No. 2022-011184, filed on Jan. 27, 2022, the entire disclosure of which is incorporated herein by reference.

BACKGROUND OF THE INVENTION

Technical Field

A technique of the present disclosure relates to an imaging lens and an imaging apparatus.

Related Art

In the related art, as an imaging lens that can be used in an imaging apparatus such as a digital camera, an imaging lens described in JP2012-159613A below is known.

In recent years, there has been a demand for an imaging lens that maintains high optical performance even in closeup imaging while having a small size.

SUMMARY

The present disclosure has been made in view of the above circumstances, and an object of the present disclosure is to provide an imaging lens that maintains high optical performance even in closeup imaging while having a small size, and an imaging apparatus comprising the imaging lens.

According to an aspect of the present disclosure, an imaging lens comprises, successively in order from a position closest to an object side to an image side: a first lens group that has a positive refractive power; and a second lens group that has a negative refractive power. Only the second lens group moves along an optical axis during focusing, the first lens group consists of a first A group, an aperture stop, and a first B group, in order from the object side to the image side, and the second lens group includes at least one positive lens. Assuming that a maximum imaging magnification is $\beta$, a focal length of the first A group is f1A, and a focal length of the first B group is f1B, Conditional Expressions (1) and (2) are satisfied, which are represented by $$0.45 < |\beta| \qquad (1), \text{ and}$$

$$-15 < f1A/f1B < -1.7 \qquad (2).$$

It is preferable that the imaging lens according to the above-mentioned aspect satisfies Conditional Expression (2-1), which is represented by $$-10 < f1A/f1B < -2 \qquad (2\text{-}1).$$

It is preferable that the first B group includes a positive lens at a position closest to the object side. Assuming that an Abbe number of the positive lens closest to the object side in the first B group based on a d line is v1Bp1, it is preferable that the imaging lens according to the above-mentioned aspect satisfies Conditional Expression (3), which is represented by $$60 < v1Bp1 < 105 \qquad (3).$$

It is preferable that the first B group includes a positive lens at a position closest to the image side. Assuming that a larger diameter of a diameter of an on-axis luminous flux in a state where an infinite distance object is in focus and a diameter of an on-axis luminous flux in a state where a closest object is in focus, on an object side surface of the positive lens closest to the image side in the first B group is DMp, and a larger diameter of a diameter of the on-axis luminous flux in a state where the infinite distance object is in focus and a diameter of the on-axis luminous flux in a state where the closest object is in focus, on an image side surface of a lens adjacent to the object side of the positive lens closest to the image side in the first B group is DMpa, it is preferable that the imaging lens according to the above-mentioned aspect satisfies Conditional Expression (4), which is represented by $$0.5 < DMpa/DMp < 1 \qquad (4).$$

It is preferable that the first B group includes a cemented lens consisting of one negative lens and one positive lens. Assuming that a refractive index of the positive lens of the cemented lens of the first B group at a d line is N1Bp, a refractive index of the negative lens of the cemented lens of the first B group at the d line is N1Bn, an Abbe number of the positive lens of the cemented lens of the first B group based on the d line is v1Bp, an Abbe number of the negative lens of the cemented lens of the first B group based on the d line is v1Bn, a partial dispersion ratio of the positive lens of the cemented lens in the first B group between a g line and an F line is 61Bp, and a partial dispersion ratio of the negative lens of the cemented lens of the first B group between the g line and the F line is 61Bn, it is preferable that the imaging lens according to the above-mentioned aspect satisfies Conditional Expressions (5), (6), and (7), which are represented by $$-0.5 < N1Bp - N1Bn < 0 \qquad (5),$$

$$30 < v1Bp - v1Bn < 70 \qquad (6), \text{ and}$$

$$-0.1 < 61Bp - 61Bn < -0.03 \qquad (7).$$

Assuming that a focal length of the imaging lens in a state where an infinite distance object is in focus is f, it is preferable that the imaging lens according to the above-mentioned aspect satisfies Conditional Expression (8), which is represented by $$0 < f/f1B < 4 \qquad (8).$$

It is preferable that the first A group includes at least one positive lens.

Assuming that a minimum value of Abbe numbers of all positive lenses of the second lens group based on the d line is v2 min, it is preferable that the imaging lens according to the above-mentioned aspect satisfies Conditional Expression (9), which is represented by $$10 < v2 \min < 22 \qquad (9).$$

Assuming that a lateral magnification of the second lens group in a state where an infinite distance object is in focus is $\beta 2i$, a combined lateral magnification of all lenses closer to the image side than the second lens group in a state where the infinite distance object is in focus is $\beta ri$, and $\beta ri = 1$ in a case where a lens is not disposed closer to the image side than the second lens group, it is preferable that the imaging lens according to the above-mentioned aspect satisfies Conditional Expression (10), which is represented by $$-6 < (1 - \beta 2i^2) \times \beta ri^2 < -2 \qquad (10).$$

The imaging lens according to the above-mentioned aspect may be configured to consist of, in order from the object side to the image side, the first lens group, the second lens group, and a third lens group that remains stationary with respect to an image plane during focusing. In such a configuration, assuming that a focal length of the imaging lens in a state where an infinite distance object is in focus is f, and a focal length of the third lens group is f3, it is preferable that the imaging lens according to the above-mentioned aspect satisfies Conditional Expression (11), which is represented by $$-0.3 < f/f3 < 0.8 \qquad (11).$$

Further, in a case where one lens component is one single lens or one cemented lens, it is preferable that the third lens group consists of one lens component.

Assuming that a sum of an air-equivalent distance on an optical axis from a lens surface closest to the image side in the imaging lens to an image plane and a distance on the optical axis from a paraxial exit pupil position to a lens surface closest to the image side in the imaging lens in a state in which a closest object is in focus is Expm, and a sum of an air-equivalent distance on the optical axis from the lens surface closest to the image side in the imaging lens to the image plane and a distance on the optical axis from the paraxial exit pupil position to the lens surface closest to the image side in the imaging lens in a state in which an infinite distance object is in focus is Expi, it is preferable that the imaging lens according to the above-mentioned aspect satisfies Conditional Expression (12), which is represented by $$0.35 < Expm/Expi < 1 \qquad (12).$$

Assuming that a focal length of the imaging lens in a state where an infinite distance object is in focus is f, and a focal length of the first lens group is f1, it is preferable that the imaging lens according to the above-mentioned aspect satisfies Conditional Expression (13), which is represented by $$0.2 < f/f1 < 4 \qquad (13).$$

In a case where one lens component is one single lens or one cemented lens, assuming that a paraxial curvature radius of a surface closest to the object side in the lens component closest to the object side in the imaging lens is R1f, and a paraxial curvature radius of a surface closest to the image side in the lens component closest to the object side in the imaging lens is R1r, it is preferable that the imaging lens according to the above-mentioned aspect satisfies Conditional Expression (14), which is represented by $$0 < (R1f + R1r)/(R1f - R1r) < 3 \qquad (14).$$

Assuming that an air-equivalent distance on an optical axis from a lens surface closest to the image side in the imaging lens to an image plane in a state where an infinite distance object is in focus is Bf, a focal length of the imaging lens in a state where the infinite distance object is in focus is f, and a maximum half angle of view in a state where the infinite distance object is in focus is ωi, it is preferable that the imaging lens according to the above-mentioned aspect satisfies Conditional Expression (15), which is represented by $$0.3 < Bf/(f \times \tan \omega i) < 4 \qquad (15).$$

It is preferable that the second lens group includes at least two positive lenses.

It is preferable that the second lens group includes a cemented lens consisting of one positive lens and one negative lens. Assuming that a refractive index of the positive lens of the cemented lens of the second lens group at a d line is N2p, a refractive index of the negative lens of the cemented lens of the second lens group at the d line is N2n, an Abbe number of the positive lens of the cemented lens of the second lens group based on the d line is ν2p, an Abbe number of the negative lens of the cemented lens of the second lens group based on the d line is ν2n, a partial dispersion ratio of the positive lens of the cemented lens of the second lens group between a g line and an F line is θ2p, and a partial dispersion ratio of the negative lens of the cemented lens of the second lens group between the g line and the F line is θ2n, the imaging lens according to the above-mentioned aspect satisfies Conditional Expressions (16), (17), and (18), which are represented by $$-0.6 < N2p - N2n < -0.1 \qquad (16),$$

$$-20 < \nu 2p - \nu 2n < 50 \qquad (17), \text{ and}$$

$$-0.3 < \theta 2p - \theta 2n < 0.15 \qquad (18).$$

It is preferable that the second lens group includes a cemented lens consisting of one positive lens and one negative lens. Assuming that a refractive index of the negative lens of the cemented lens of the second lens group at a d line is N2n, and an Abbe number of the negative lens of the cemented lens of the second lens group based on the d line is ν2n, the imaging lens according to the above-mentioned aspect satisfies Conditional Expressions (19) and (20), which are represented by $$1.75 < N2n < 2.2 \qquad (19), \text{ and}$$

$$20 < \nu 2n < 40 \qquad (20).$$

An imaging apparatus according to another aspect of the present disclosure comprises the imaging lens according to the above-mentioned aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the terms "group that has a positive refractive power" and "group that has a positive refractive power" mean that the group as a whole has a positive refractive power. Similarly, the terms "group that has a negative refractive power" and "group has a negative refractive power" mean that the group as a whole has a negative refractive power. Similarly, the term "lens component that has a negative refractive power" means that the lens component as a whole has a negative refractive power. The term "a lens that has a positive refractive power" and the term "a positive lens" are synonymous. Each of the "first lens group", "second lens group", "third lens group", "focus group", and "vibration-proof group" in the present specification is not limited to a configuration consisting of a plurality of lenses, but may have a configuration consisting of only one lens.

The term "a single lens" means one lens that is not cemented. Here, a compound aspherical lens (a lens in which a spherical lens and an aspherical film formed on the spherical lens are integrally formed and function as one aspherical lens as a whole) is not regarded as a cemented lens, but the compound aspherical lens is regarded as one lens. The curvature radius, the sign of the refractive power, and the surface shape of the lens including the aspherical surface will be used in terms of the paraxial region unless otherwise specified. The sign of the curvature radius of the convex surface facing toward the object side is positive, and the sign of the curvature radius of the convex surface facing toward the image side is negative.

The "focal length" used in a conditional expression is a paraxial focal length. Unless otherwise specified, the "distance on the optical axis" used in Conditional Expression is considered as a geometrical distance. Unless otherwise specified, the values used in the conditional expressions are values based on the d line. Further, the "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide an imaging lens that maintains high optical performance even in closeup imaging while having a small size, and an imaging apparatus comprising the imaging lens.

DESCRIPTION OF EMBODIMENTS

Hereinafter, embodiments of the present disclosure will be described with reference to the accompanying drawings.

Figure 1:
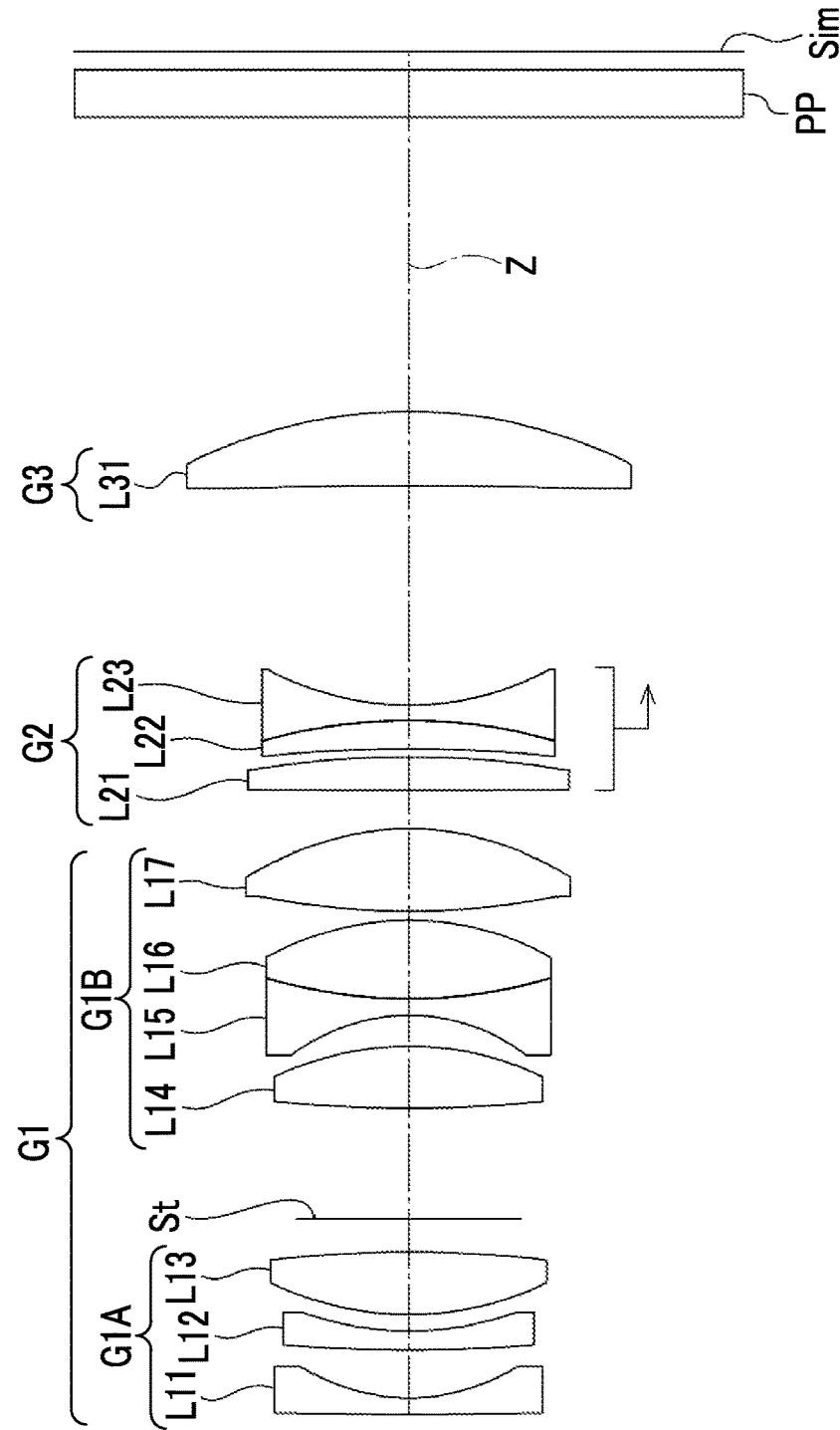
FIG. 1 is a cross-sectional view showing a configuration of an imaging lens according to an embodiment, which corresponds to an imaging lens of Example 1.
Figure 2:
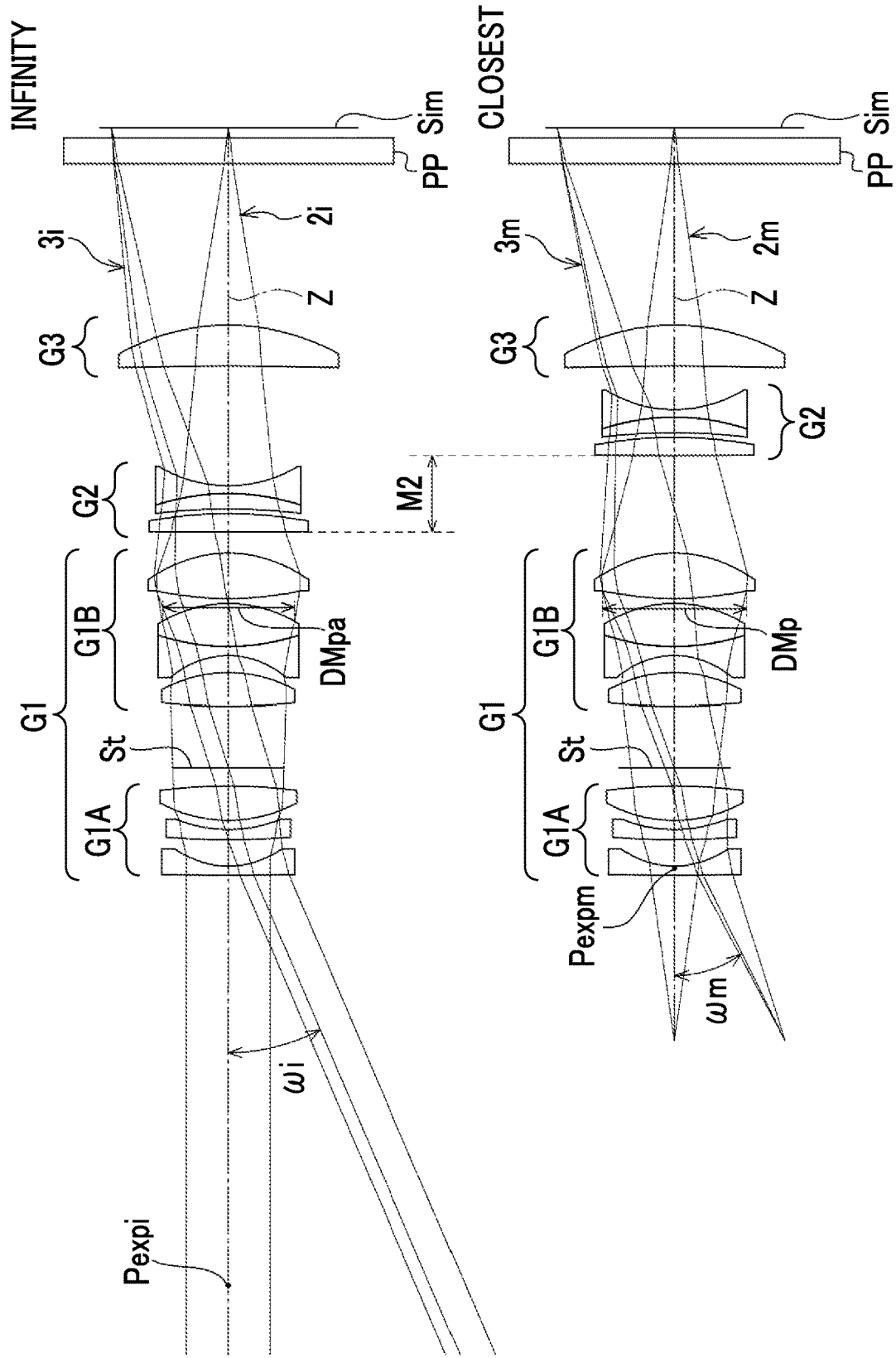
FIG. 2 is a cross-sectional view showing a configuration and luminous flux in each in-focus state of the imaging lens of FIG. 1.

FIG. 1 shows a cross-sectional view of the configuration of the imaging lens according to the embodiment of the present disclosure in a state where the infinite distance object is in focus. FIG. 2 shows a cross-sectional view showing a configuration and luminous flux in each in-focus state of the imaging lens of FIG. 1. In FIG. 2, the upper part labeled "INFINITY" shows a state in which the infinite distance object is in focus, and the lower part labeled "CLOSEST" shows a state in which a closest object at a distance of 18.2 millimeters (mm) from the lens surface closest to the object side is in focus. In the present specification, an object at an infinite distance is referred to as the "infinite distance object", and an object at the closest distance is referred to as the "closest object". The upper part of FIG. 2 shows, as the luminous flux, an on-axis luminous flux $2i$ and a luminous flux $3i$ having a maximum half angle of view $\omega i$ in a state in which the infinite distance object is in focus. The lower part of FIG. 2 shows, as the luminous flux, an on-axis luminous flux $2m$ and a luminous flux $3m$ having a maximum half angle of view om in a state in which the closest object is in focus. The examples shown in FIGS. 1 and 2 correspond to the imaging lens of Example 1 to be described later. In FIGS. 1 and 2, the left side is the object side and the right side is the image side. Hereinafter, description thereof will be given mainly with reference to FIG. 1.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lenses according to an embodiment of the present disclosure comprises, successively in order from a position closest to the object side to the image side along the optical axis Z: a first lens group G1 that has a positive refractive power; and a second lens group G2 that has a negative refractive power. During focusing, the first lens group G1 remains stationary with respect to the image plane Sim, and only the second lens group G2 moves along the optical axis Z. In the present specification, a group which moves along the optical axis Z during focusing is referred to as a focus group. Focusing is performed by moving the focus group. In the imaging lens according to the embodiment of the present disclosure, the second lens group G2 is a focus group.

In the imaging lens according to the embodiment of the present disclosure, lens groups having positive and negative refractive powers are arranged in order from the position closest to the object side to the image side, and a behavior of each lens group during focusing is set as described above. As a result, there is an advantage in achieving a high imaging magnification. By arranging the groups having refractive powers of which the signs are different, the refractive power of the focus group can be increased. Therefore, the amount of movement of the focus group during focusing can be shortened. As a result, there is an advantage in achieving reduction in size. In the present specification, the "high imaging magnification" means a large absolute value of the imaging magnification.

The first lens group G1 of the imaging lens according to the embodiment of the present disclosure is configured to include an aperture stop St therein. The first lens group G1 consists of in order from the object side to the image side, a first A group G1A, an aperture stop St, and a first B group G1B.

For example, the imaging lens of FIG. 1 is configured as follows. The imaging lens of FIG. 1 consists of, in order from the object side to the image side, the first lens group G1, the second lens group G2, and a third lens group G3. The first lens group G1 consists of in order from the object side to the image side, a first A group G1A, an aperture stop St, and a first B group G1B. The first A group G1A consists of three lenses L11 to L13 in order from the object side to the image side, and the first B group G1B consists of four lenses L14 to L17 in order from the object side to the image side. The second lens group G2 consists of three lenses L21 to L23, in order from the object side to the image side. The third lens group G3 consists of one lens L31. The aperture stop St shown in FIG. 1 does not indicate the shape and size, but indicates the position in the optical axis direction.

In the example of FIG. 1, the entire second lens group moves integrally during focusing, and the other lens groups remain stationary with respect to the image plane Sim. The term "moves integrally" described herein means that the same amount of movement is performed in the same direction simultaneously. The arrow pointing to the right below the second lens group G2 in FIG. 1 indicates that the second lens group G2 is a focus group moving toward the image side during focusing from the infinite distance object to the closest object.

It should be noted that the term "lens group" in the present specification refers to a part including at least one lens, which is a constituent part of the imaging lens and is divided by an air spacing that changes during focusing. During focusing, each lens group moves or remains stationary, and the mutual spacing between the lenses in each lens group does not change. That is, in the present specification, one lens group is a group in which the spacing between adjacent groups changes during focusing and the total spacing between adjacent lenses does not change within itself.

Hereinafter, preferable and possible configurations of the imaging lens according to the embodiment of the present disclosure will be described. In the following description of preferred and possible configurations, the term "imaging lens according to the embodiment of the present disclosure" is also simply referred to as an "imaging lens" to avoid redundancy.

The first A group G1A may be configured to be a group that has a negative refractive power, and the first B group G1B may be configured to be a group that has a positive refractive power. In such a case, there is an advantage in correcting aberrations.

It is preferable that the first A group G1A includes at least one positive lens. In such a case, there is an advantage in correcting distortion and lateral chromatic aberration.

The first A group G1A may be configured to include a cemented lens consisting of one negative lens and one positive lens. In such a case, there is an advantage in suppressing fluctuation in chromatic aberration accompanying fluctuation in object distance. In the present specification, a distance on the optical axis from the object to be imaged to the lens surface closest to the object side in the imaging lens is referred to as the "object distance".

The first A group G1A may be configured to consist of three lenses. For example, the first A group G1A may be configured to include a negative lens, a negative lens, and a positive lens in order from the object side to the image side. In such a case, there is an advantage in correcting aberrations.

The lens component closest to the object side in the first A group G1A may be configured to have an aspherical surface. In such a case, there is an advantage in correcting distortion. In addition, in the present specification, the term "one lens component" means one cemented lens or one single lens.

It is preferable that the first B group G1B includes a cemented lens consisting of one negative lens and one positive lens. In such a case, there is an advantage in suppressing fluctuation in chromatic aberration accompanying fluctuation in object distance.

The first B group G1B may be configured to consist of four lenses. For example, the first B group G1B may be configured to consist of, in order from the object side to the image side, a single lens that has a positive refractive power, a cemented lens, and a single lens that has a positive refractive power. In such a case, there is an advantage in correcting aberrations.

It is preferable that the second lens group G2 includes at least one positive lens. In such a case, there is an advantage in suppressing fluctuation in chromatic aberration accompanying fluctuation in object distance. It is more preferable that the second lens group G2 includes at least two positive lenses. In such a case, there is an advantage in suppressing fluctuation in chromatic aberration accompanying fluctuation in object distance.

It is preferable that the second lens group G2 includes a cemented lens consisting of one positive lens and one negative lens. In such a case, there is an advantage in suppressing fluctuation in chromatic aberration accompanying fluctuation in object distance.

The second lens group G2 may be configured to consist of two or three lenses. In a case where the second lens group G2 consists of two lenses, the second lens group G2 may be configured to consist of a positive lens and a negative lens in order from the object side to the image side. In a case where the second lens group G2 consists of three lenses, the second lens group G2 may be configured to consist of a single lens that has a positive refractive power and a cemented lens in order from the object side to the image side. In such a case, there is an advantage in suppressing fluctuation in chromatic aberration accompanying fluctuation in object distance. In a case where the second lens group G2 consists of a single lens that has a positive refractive power and a cemented lens in order from the object side to the image side, it is preferable that the cemented lens is a cemented lens in which a positive lens and a negative lens are cemented in order from the object side. In such a case, there is an advantage in suppressing fluctuation in chromatic aberration accompanying fluctuation in object distance.

The second lens group G2 may be configured to include a lens component that has an aspherical surface and that has a negative refractive power. In such a case, there is an advantage in correcting field curvature for each object distance.

The imaging lens may be configured to consist of, in order from the object side to the image side, the first lens group G1, the second lens group G2, and a third lens group G3 remaining stationary with respect to the image plane Sim during focusing. In such a case, there is an advantage in correcting field curvature.

In a case where the imaging lens consists of the first lens group G1, the second lens group G2, and the third lens group G3 in order from the object side to the image side, it is preferable that the third lens group G3 includes a cemented lens consisting of one positive lens and one negative lens. In such a case, there is an advantage in suppressing fluctuation in chromatic aberration accompanying fluctuation in object distance.

In a case where the imaging lens consists of the first lens group G1, the second lens group G2, and the third lens group G3 in order from the object side to the image side, it is preferable that the third lens group G3 consists of one lens component. In such a case, there is an advantage in achieving reduction in total length of the lens system. More specifically, the third lens group G3 may be configured to consist of one single lens that has a positive refractive power. Alternatively, the third lens group G3 may be configured to consist of a cemented lens in which a negative lens and a positive lens are cemented in order from the object side, and the third lens group G3 may be configured to consist of a cemented lens in which a positive lens and a negative lens are cemented in order from the object side.

In a case where the imaging lens consists of the first lens group G1, the second lens group G2, and the third lens group G3 in order from the object side to the image side, the third lens group G3 may be configured to include an aspherical lens. In such a case, there is an advantage in correcting field curvature for each object distance.

Assuming that a maximum imaging magnification is β, it is preferable that the imaging lens satisfies Conditional Expression (1). The maximum imaging magnification is an imaging magnification in a case where the closest object is imaged. By satisfying Conditional Expression (1), imaging can be performed at a high imaging magnification. In order to obtain more favorable characteristics, it is more preferable that the imaging lens satisfies Conditional Expression (1-1), it is yet more preferable that the imaging lens satisfies Conditional Expression (1-2), and it is most preferable that the imaging lens satisfies Conditional Expression (1-3).

$$0.45 < |\beta| \tag{1}$$

$$0.5 \leq |\beta| \tag{1-1}$$

$$0.75 < |\beta| \tag{1-2}$$

$$0.9 < |\beta| \tag{1-3}$$

Assuming that a focal length of the first A group G1A is f1A and a focal length of the first B group G1B is f1B, it is preferable that the imaging lens satisfies Conditional Expression (2). By not allowing the corresponding value of Conditional Expression (2) to be equal to or less than the lower limit thereof, the refractive power of the first A group G1A can be ensured. As a result, there is an advantage in correcting distortion and field curvature. By not allowing the corresponding value of Conditional Expression (2) to be equal to or greater than the upper limit thereof, the refractive power of the first B group G1B can be ensured. As a result, there is an advantage in achieving reduction in diameter of the group on the image side as compared with the first B group G1B. In order to obtain more favorable characteristics, it is more preferable that the imaging lens satisfies Conditional Expression (2-1), and it is yet more preferable that the imaging lens satisfies Conditional Expression (2-2).

$$-15 < f1A/f1B < -1.7 \tag{2}$$

$$-10 < f1A/f1B < -2 \tag{2-1}$$

$$-6 < f1A/f1B < -2.4 \tag{2-2}$$

It is preferable that the first B group G1B includes a positive lens at a position closest to the object side. Assuming that an Abbe number of the positive lens of the first B group G1B closest to the object side based on the d line is ν1Bp1, it is preferable that the imaging lens satisfies Conditional Expression (3). By not allowing the corresponding value of Conditional Expression (3) to be equal to or less than the lower limit thereof, it is easy to correct longitudinal chromatic aberration. By not allowing the corresponding value of Conditional Expression (3) to be equal to or greater than the upper limit thereof, the refractive index is prevented from becoming excessively low. Therefore, the absolute value of the curvature radius is prevented from becoming excessively small. Thereby, the sensitivity to error can be suppressed. In order to obtain more favorable characteristics, it is more preferable that the imaging lens satisfies Conditional Expression (3-1), and it is yet more preferable that the imaging lens satisfies Conditional Expression (3-2).

$$60 < \nu1Bp1 < 105 \tag{3}$$

$$70 < \nu1Bp1 < 105 \tag{3-1}$$

$$80 < \nu1Bp1 < 105 \tag{3-2}$$

It is preferable that the first B group G1B includes a positive lens at a position closest to the image side. In a configuration in which the first B group G1B includes a positive lens at a position closest to the image side, it is preferable that the imaging lens satisfies Conditional Expression (4). It is assumed that a larger diameter of a diameter of an on-axis luminous flux 2i in a state where an infinite distance object is in focus and a diameter of an on-axis luminous flux 2m in a state where a closest object is in focus, on an object side surface of the positive lens closest to the image side in the first B group G1B is DMp. Further, it is assumed that a larger diameter of a diameter of the on-axis luminous flux 2i in a state where the infinite distance object is in focus and a diameter of the on-axis luminous flux 2m in a state where the closest object is in focus, on an image side surface of a lens adjacent to the object side of the positive lens closest to the image side in the first B group G1B is DMpa. By not allowing the corresponding value of Conditional Expression (4) to be equal to or lower than the lower limit thereof, there is an advantage in correcting field curvature. By not allowing the corresponding value of Conditional Expression (4) to be equal to or greater than the upper limit thereof, there is an advantage in correcting spherical aberration. In order to obtain more favorable characteristics, it is more preferable that the imaging lens satisfies Conditional Expression (4-1), and it is yet more preferable that the imaging lens satisfies Conditional Expression (4-2).

$$0.5 < DMpa/DMp < 1 \tag{4}$$

$$0.7 < DMpa/DMp < 1 \tag{4-1}$$

$$0.9 < DMpa/DMp < 1 \tag{4-2}$$

For example, FIG. 2 shows the above-mentioned diameter DMp and diameter DMpa in the example of FIG. 1. In the example of FIG. 1, the positive lens closest to the image side in the first B group G1B corresponds to a lens L17, and the lens adjacent to the object side of the positive lens closest to the image side in the first B group G1B corresponds to a lens L16. In the present example, since the diameter of the on-axis luminous flux 2m on the object side surface of the lens L17 is larger than the diameter of the on-axis luminous flux 2i on the object side surface of the lens L17, the diameter of the on-axis luminous flux 2m is shown as the diameter DMp in FIG. 2. Further, in the present example, since the diameter of the on-axis luminous flux 2i on the image side surface of the lens L16 is larger than the diameter of the on-axis luminous flux 2m on the image side surface of the lens L16, the diameter of the on-axis luminous flux 2i is shown as a diameter DMpa in FIG. 2.

In a configuration in which the first B group G1B includes a cemented lens consisting of one negative lens and one positive lens, it is preferable that the imaging lens satisfies Conditional Expression (5). Here, it is assumed that a refractive index of the positive lens of the cemented lens of the first B group G1B at the d line is N1Bp and a refractive index of the negative lens of the cemented lens of the first B group G1B at the d line is N1Bn. By satisfying Conditional Expression (5), there is an advantage in correcting longitudinal chromatic aberration. In order to obtain more favorable characteristics, it is more preferable that the imaging lens satisfies Conditional Expression (5-1), and it is yet more preferable that the imaging lens satisfies Conditional Expression (5-2).

$$-0.5 < N1Bp - N1Bn < 0 \quad (5)$$

$$-0.4 < N1Bp - N1Bn < 0 \quad (5\text{-}1)$$

$$-0.3 < N1Bp - N1Bn < -0.1 \quad (5\text{-}2)$$

In a configuration in which the first B group G1B includes the cemented lens, it is preferable that the imaging lens satisfies Conditional Expression (6). Here, it is assumed that an Abbe number of the positive lens of the cemented lens of the first B group G1B based on the d line is ν1Bp and an Abbe number of the negative lens of the cemented lens of the first B group G1B based on the d line is ν1Bn. By satisfying Conditional Expression (6), there is an advantage in correcting longitudinal chromatic aberration. In order to obtain more favorable characteristics, it is more preferable that the imaging lens satisfies Conditional Expression (6-1), and it is yet more preferable that the imaging lens satisfies Conditional Expression (6-2).

$$30 < \nu1Bp - \nu1Bn < 70 \quad (6)$$

$$35 < \nu1Bp - \nu1Bn < 65 \quad (6\text{-}1)$$

$$40 < \nu1Bp - \nu1Bn < 60 \quad (6\text{-}2)$$

In a configuration in which the first B group G1B includes the cemented lens, it is preferable that the imaging lens satisfies Conditional Expression (7). Here, it is assumed that a partial dispersion ratio of the positive lens of the cemented lens of the first B group G1B between the g line and the F line is θ1Bp and a partial dispersion ratio of the negative lens of the cemented lens of the first B group G1B between the g line and the F line is θ1Bn. By satisfying Conditional Expression (7), there is an advantage in correcting longitudinal chromatic aberration. In order to obtain more favorable characteristics, it is more preferable that the imaging lens satisfies Conditional Expression (7-1), and it is yet more preferable that the imaging lens satisfies Conditional Expression (7-2).

$$-0.1 < \theta1Bp - \theta1Bn < -0.03 \quad (7)$$

$$-0.1 < \theta1Bp - \theta1Bn < -0.04 \quad (7\text{-}1)$$

$$-0.095 < \theta1Bp - \theta1Bn < -0.05 \quad (7\text{-}2)$$

Assuming that a refractive indexes for the g line, F line, and C line of a certain lens are Ng, NF, and NC, respectively, and the partial dispersion ratios thereof between the g line and F line of the lens is θgF, θgF is defined by the following expression.

$$\theta gF = (Ng - NF)/(NF - NC)$$

In a configuration in which the first B group G1B includes the cemented lens, it is more preferable that the imaging lens satisfies Conditional Expressions (5), (6), and (7) simultaneously. In order to obtain more favorable characteristics, it is yet more preferable that the imaging lens satisfies Conditional Expressions (5), (6), and (7) simultaneously, and then satisfies at least one of Conditional Expressions (5-1), (5-2), (6-1), (6-2), (7-1), and (7-2).

Assuming that a focal length of the imaging lens in a state where the infinite distance object is in focus is f and a focal length of the first B group G1B is f1B, it is preferable that the imaging lens satisfies Conditional Expression (8). By not allowing the corresponding value of Conditional Expression (8) to be equal to or less than the lower limit thereof, the height of the ray passing through the lens closer to the image side than the first B group G1B can be made lower than that of the lens closer to the image side than the first B group G1B. As a result, there is an advantage in achieving reduction in diameter. By not allowing the corresponding value of Conditional Expression (8) to be equal to or greater than the upper limit thereof, the refractive power of the first B group G1B is prevented from becoming excessively strong. As a result, there is an advantage in correcting spherical aberration. In order to obtain more favorable characteristics, it is more preferable that the imaging lens satisfies Conditional Expression (8-1), and it is yet more preferable that the imaging lens satisfies Conditional Expression (8-2).

$$0 < f/f1B < 4 \quad (8)$$

$$0.3 < f/f1B < 3 \quad (8\text{-}1)$$

$$0.6 < f/f1B < 2 \quad (8\text{-}2)$$

Assuming that a minimum value of Abbe numbers of all the positive lenses of the second lens group G2 based on the d line is ν2 min, it is preferable that the imaging lens satisfies Conditional Expression (9). By satisfying Conditional Expression (9), there is an advantage in suppressing fluctuation in chromatic aberration accompanying fluctuation in object distance. In order to obtain more favorable characteristics, it is more preferable that the imaging lens satisfies Conditional Expression (9-1), and it is yet more preferable that the imaging lens satisfies Conditional Expression (9-2).

$$10 < \nu2\text{ min} < 22 \quad (9)$$

$$10 < \nu2\text{ min} < 20 \quad (9\text{-}1)$$

$$10 < \nu2\text{ min} < 17 \quad (9\text{-}2)$$

Assuming that a lateral magnification of the second lens group G2 in a state where the infinite distance object is in focus is β2i and a combined lateral magnification of all the lenses closer to the image side than the second lens group G2 in a state where the infinite distance object is in focus is βri, it is preferable that the imaging lens satisfies Conditional Expression (10). However, in a case where the lens is not disposed closer to the image side than the second lens group G2, βri=1. By not allowing the corresponding value of Conditional Expression (10) to be equal to or less than the lower limit thereof, it is possible to suppress rigidness in accuracy of stop of the focus group during focusing. By not allowing the corresponding value of Conditional Expression (10) to be equal to or greater than the upper limit thereof, the amount of movement of the focus group during focusing can be shortened. As a result, there is an advantage in achieving reduction in total length of the lens system. In order to obtain more favorable characteristics, it is more preferable that the imaging lens satisfies Conditional Expression (10-1), and it is yet more preferable that the imaging lens satisfies Conditional Expression (10-2).

$$-6<(1-12i^2)\times\beta ri^2<-2 \quad (10)$$

$$-5.5<(1-\beta 2i^2)\times\beta ri^2<-2.4 \quad (10\text{-}1)$$

$$-5<(1-\beta 2i^2)\times\beta ri^2<-2.8 \quad (10\text{-}2)$$

The imaging lens consists of, in order from the object side to the image side, a first lens group G1, a second lens group G2, and a third lens group G3 remaining stationary with respect to the image plane Sim during focusing, it is preferable that the imaging lens satisfies Conditional Expression (11). Here, it is assumed that a focal length of the imaging lens in a state where the infinite distance object is in focus is f, and a focal length of the third lens group G3 is f3. By not allowing the corresponding value of Conditional Expression (11) to be equal to or less than the lower limit thereof, the negative refractive power of the third lens group G3 is prevented from becoming excessively strong. Therefore, the angle of incidence of the principal ray of off-axis luminous flux on the image plane Sim can be suppressed from becoming large. By not allowing the corresponding value of Conditional Expression (11) to be equal to or greater than the upper limit thereof, the positive refractive power of the third lens group G3 is prevented from becoming excessively strong. Therefore, it is possible to suppress an increase in field curvature. In order to obtain more favorable characteristics, it is more preferable that the imaging lens satisfies Conditional Expression (11-1), and it is yet more preferable that the imaging lens satisfies Conditional Expression (11-2).

$$-0.3<f/f3<0.8 \quad (11)$$

$$-0.2<f/f3<0.7 \quad (11\text{-}1)$$

$$-0.1<f/f3<0.65 \quad (11\text{-}2)$$

It is preferable that the imaging lens satisfies Conditional Expression (12) with respect to the paraxial exit pupil position. Here, it is assumed that a sum of an air-equivalent distance on an optical axis from a lens surface closest to the image side in the imaging lens to the image plane Sim and a distance on the optical axis from a paraxial exit pupil position Pexpm to a lens surface closest to the image side in the imaging lens in a state in which a closest object is in focus is Expm. Further, it is assumed that a sum of an air-equivalent distance on the optical axis from the lens surface closest to the image side in the imaging lens to the image plane Sim and a distance on the optical axis from the paraxial exit pupil position Pexpi to the lens surface closest to the image side in the imaging lens in a state in which an infinite distance object is in focus is Expi. For example, FIG. 2 shows the paraxial exit pupil position Pexpi in a state where the infinite distance object is in focus and the paraxial exit pupil position Pexpm in a state where the closest object is in focus. By not allowing the corresponding value of Conditional Expression (12) to be equal to or less than the lower limit thereof, it is possible to suppress an increase in angle of incidence of the principal ray of off-axis luminous flux on the image plane Sim in a state where the closest object is in focus. By not allowing the corresponding value of Conditional Expression (12) to be equal to or greater than the upper limit thereof, it is possible to change the height of the ray on the lens surface closest to the image side in a state where the infinite distance object is in focus and a state where the closest object is in focus. As a result, there is an advantage in correcting field curvature for each object distance. In order to obtain more favorable characteristics, it is more preferable that the imaging lens satisfies Conditional Expression (12-1), and it is yet more preferable that the imaging lens satisfies Conditional Expression (12-2).

$$0.35<Expm/Expi<1 \quad (12)$$

$$0.4<Expm/Expi<0.9 \quad (12\text{-}1)$$

$$0.45<Expm/Expi<0.8 \quad (12\text{-}2)$$

Assuming that a focal length of the imaging lens in a state where the infinite distance object is in focus is f and a focal length of the first lens group G1 is f1, it is preferable that the imaging lens satisfies Conditional Expression (13). By not allowing the corresponding value of Conditional Expression (13) to be equal to or less than the lower limit thereof, the height of the ray passing through the lens closer to the image side than the first lens group G1 can be made lower than that of the first lens group G1. As a result, there is an advantage in achieving reduction in diameter of the lens. By not allowing the corresponding value of Conditional Expression (13) to be equal to or greater than the upper limit thereof, the refractive power of the first lens group G1 is prevented from becoming excessively strong. As a result, there is an advantage in correcting spherical aberration. In order to obtain more favorable characteristics, it is more preferable that the imaging lens satisfies Conditional Expression (13-1), and it is yet more preferable that the imaging lens satisfies Conditional Expression (13-2).

$$0.2<f/f1<4 \quad (13)$$

$$0.4<f/f1<3 \quad (13\text{-}1)$$

$$0.6<f/f1<2.5 \quad (13\text{-}2)$$

Assuming that a paraxial curvature radius of a surface closest to the object side in the lens component closest to the object side in the imaging lens is R1f and a paraxial curvature radius of a surface closest to the image side in the lens component closest to the object side in the imaging lens is R1r, it is preferable that the imaging lens satisfies Conditional Expression (14). By not allowing the corresponding value of Conditional Expression (14) to be equal to or less than the lower limit thereof, there is an advantage in correcting field curvature. By not allowing the corresponding value of Conditional Expression (14) to be equal to or greater than the upper limit thereof, there is an advantage in correcting distortion. In order to obtain more favorable characteristics, it is more preferable that the imaging lens satisfies Conditional Expression (14-1), and it is yet more preferable that the imaging lens satisfies Conditional Expression (14-2).

$$0<(R1f+R1r)/(R1f-R1r)<3 \quad (14)$$

$$0.5<(R1f+R1r)/(R1f-R1r)<2.5 \quad (14\text{-}1)$$

$$1<(R1f+R1r)/(R1f-R1r)<2.2 \quad (14\text{-}2)$$

It is preferable that the imaging lens satisfies Conditional Expression (15). Here, it is assumed that an air-equivalent distance on an optical axis from a lens surface closest to the image side in the imaging lens to the image plane Sim in a state where the infinite distance object is in focus is Bf That is, Bf is the back focal length in terms of the air-equivalent distance in a state where the infinite distance object is in focus. It is assumed that a focal length of the imaging lens in a state where the infinite distance object is in focus is f and a maximum half angle of view in a state where the infinite distance object is in focus is ωi. The tan is a tangent. By not allowing the corresponding value of Conditional Expression (15) to be equal to or less than the lower limit thereof, there is an advantage in ensuring the back focal length. By not allowing the corresponding value of Conditional Expression (15) to be equal to or greater than the upper limit thereof, there is an advantage in achieving reduction in total length of the lens system. In order to obtain more favorable characteristics, it is more preferable that the imaging lens satisfies Conditional Expression (15-1), and it is yet more preferable that the imaging lens satisfies Conditional Expression (15-2).

$$0.3 < Bf/(f \times \tan \omega i) < 4 \tag{15}$$

$$0.5 < Bf/(f \times \tan \omega i) < 3.5 \tag{15-1}$$

$$1 < Bf/(f \times \tan \omega i) < 3 \tag{15-2}$$

In a configuration in which the second lens group G2 includes a cemented lens consisting of one positive lens and one negative lens, it is preferable that the imaging lens satisfies Conditional Expression (16). Here, it is assumed that a refractive index of the positive lens of the cemented lens of the second lens group G2 at the d line is N2p and a refractive index of the negative lens of the cemented lens of the second lens group G2 at the d line is N2n. By satisfying Conditional Expression (16), there is an advantage in suppressing fluctuation in chromatic aberration accompanying fluctuation in object distance. In order to obtain more favorable characteristics, it is more preferable that the imaging lens satisfies Conditional Expression (16-1), and it is yet more preferable that the imaging lens satisfies Conditional Expression (16-2).

$$-0.6 < N2p - N2n < -0.1 \tag{16}$$

$$-0.5 < N2p - N2n < -0.15 \tag{16-1}$$

$$-0.45 < N2p - N2n < -0.2 \tag{16-2}$$

In a configuration in which the second lens group G2 includes the cemented lens, it is preferable that the imaging lens satisfies Conditional Expression (17). Here, it is assumed that an Abbe number of the positive lens of the cemented lens of the second lens group G2 based on the d line is ν2p and an Abbe number of the negative lens of the cemented lens of the second lens group G2 based on the d line is ν2n. By satisfying Conditional Expression (17), there is an advantage in suppressing fluctuation in chromatic aberration accompanying fluctuation in object distance. In order to obtain more favorable characteristics, it is more preferable that the imaging lens satisfies Conditional Expression (17-1), and it is yet more preferable that the imaging lens satisfies Conditional Expression (17-2).

$$-20 < \nu 2p - \nu 2n < 50 \tag{17}$$

$$-15 < \nu 2p - \nu 2n < 40 \tag{17-1}$$

$$-10 < \nu 2p - \nu 2n < 30 \tag{17-2}$$

In a configuration in which the second lens group G2 includes the cemented lens, it is preferable that the imaging lens satisfies Conditional Expression (18). Here, it is assumed that a partial dispersion ratio of the positive lens of the cemented lens of the second lens group G2 between the g line and the F line is θ2p and a partial dispersion ratio of the negative lens of the cemented lens of the second lens group G2 between the g line and the F line is θ2n. By satisfying Conditional Expression (18), there is an advantage in suppressing fluctuation in chromatic aberration accompanying fluctuation in object distance. In order to obtain more favorable characteristics, it is more preferable that the imaging lens satisfies Conditional Expression (18-1), and it is yet more preferable that the imaging lens satisfies Conditional Expression (18-2).

$$-0.3 < \theta 2p - \theta 2n < 0.15 \tag{18}$$

$$-0.15 < \theta 2p - \theta 2n < 0.1 \tag{18-1}$$

$$-0.05 < \theta 2p - \theta 2n < 0.03 \tag{18-2}$$

In a configuration in which the second lens group G2 includes the cemented lens, it is more preferable that the imaging lens satisfies Conditional Expressions (16), (17), and (18) simultaneously. In order to obtain more favorable characteristics, it is yet more preferable that the imaging lens satisfies Conditional Expressions (16), (17), and (18) simultaneously, and then satisfies at least one of Conditional Expressions (16-1), (16-2), (17-1), (17-2), (18-1), and (18-2).

In a configuration in which the second lens group G2 includes the cemented lens, assuming that a refractive index of the negative lens of the cemented lens of the second lens group G2 at the d line is N2n, it is preferable that the imaging lens satisfies Conditional Expression (19). By not allowing the corresponding value of Conditional Expression (19) to be equal to or less than the lower limit thereof, there is an advantage in correcting field curvature. In general, the Abbe number of the optical material for the lens, decreases as the refractive index increases. Therefore, by not allowing the corresponding value of Conditional Expression (19) to be equal to or greater than the upper limit thereof, there is an advantage in suppressing fluctuation in chromatic aberration accompanying fluctuation in object distance. In order to obtain more favorable characteristics, it is more preferable that the imaging lens satisfies Conditional Expression (19-1), and it is yet more preferable that the imaging lens satisfies Conditional Expression (19-2).

$$1.75 < N2n < 2.2 \tag{19}$$

$$1.8 < N2n < 2.2 \tag{19-1}$$

$$1.85 < N2n < 2.2 \tag{19-2}$$

In a configuration in which the second lens group G2 includes the cemented lens, assuming that an Abbe number of the negative lens of the cemented lens of the second lens group G2 based on the d line is ν2n, it is preferable that the imaging lens satisfies Conditional Expression (20). By satisfying Conditional Expression (20), there is an advantage in suppressing fluctuation in chromatic aberration accompanying fluctuation in object distance. In order to obtain more favorable characteristics, it is more preferable that the imaging lens satisfies Conditional Expression (20-1), and it is yet more preferable that the imaging lens satisfies Conditional Expression (20-2).

$$20 < \nu 2n < 40 \tag{20}$$

$$30 < \nu 2n < 40 \tag{20-1}$$

$$35 < \nu 2n < 40 \tag{20-2}$$

In a configuration in which the second lens group G2 includes the cemented lens, it is more preferable that the imaging lens satisfies Conditional Expressions (19) and (20) simultaneously. In order to obtain more favorable characteristics, it is yet more preferable that the imaging lens satisfies Conditional Expressions (19) and (20) simultaneously, and then satisfies at least one of Conditional Expressions (19-1), (19-2), (20-1), and (20-2).

Assuming that a paraxial curvature radius of a surface closest to the object side in the lens component closest to the image side in the third lens group G3 is R3f and a paraxial curvature radius of a surface closest to the image side in the lens component closest to the image side in the third lens group G3 is R3r, it is preferable that the imaging lens satisfies Conditional Expression (21). By not allowing the corresponding value of Conditional Expression (21) to be equal to or less than the lower limit thereof, there is an advantage in suppressing ghosts and the like under imaging conditions of backlight and obtaining a clear image. By not allowing the corresponding value of Conditional Expression (21) to be equal to or greater than the upper limit thereof, there is an advantage in correcting field curvature. In order to obtain more favorable characteristics, it is more preferable that the imaging lens satisfies Conditional Expression (21-1), and it is yet more preferable that the imaging lens satisfies Conditional Expression (21-2).

$$0<(R3f+R3r)/(R3f-R3r)<2 \quad (21)$$

$$0.3<(R3f+R3r)/(R3f-R3r)<1.5 \quad (21\text{-}1)$$

$$0.6<(R3f+R3r)/(R3f-R3r)<1.4 \quad (21\text{-}2)$$

Assuming that an amount of movement of the second lens group G2 during focusing from the infinite distance object to the closest object is M2 and a focal length of the imaging lens in a state where the infinite distance object is in focus is f, it is preferable that the imaging lens satisfies Conditional Expression (22). For example, FIG. 2 shows the amount of movement M2. By not allowing the corresponding value of Conditional Expression (22) to be equal to or less than the lower limit thereof, it is possible to suppress rigidness in accuracy of stop of the focus group during focusing. By not allowing the corresponding value of Conditional Expression (22) to be equal to or greater than the upper limit thereof, the amount of movement of the focus group during focusing can be shortened. As a result, there is an advantage in achieving reduction in total length of the lens system. In order to obtain more favorable characteristics, it is more preferable that the imaging lens satisfies Conditional Expression (22-1), and it is yet more preferable that the imaging lens satisfies Conditional Expression (22-2).

$$0.05<M2/f<0.5 \quad (22)$$

$$0.1<M2/f<0.4 \quad (22\text{-}1)$$

$$0.15<M2/f<0.35 \quad (22\text{-}2)$$

It is preferable that the imaging lens satisfies Conditional Expression (23). Here, it is assumed that a distance on the optical axis from the lens surface closest to the object side in the imaging lens to the aperture stop St is D1St. Further, it is assumed that a sum of the distance on the optical axis from the lens surface closest to the object side in the imaging lens to the lens surface closest to the image side in the imaging lens and the air-equivalent distance on the optical axis from the lens surface closest to the image side in the imaging lens to the image plane Sim is TL. By not allowing the corresponding value of Conditional Expression (23) to be equal to or less than the lower limit thereof, there is an advantage in correcting aberrations. By not allowing the corresponding value of Conditional Expression (23) to be equal to or greater than the upper limit thereof, there is an advantage in achieving reduction in diameter of the first lens group G1. In order to obtain more favorable characteristics, it is more preferable that the imaging lens satisfies Conditional Expression (23-1), and it is yet more preferable that the imaging lens satisfies Conditional Expression (23-2).

$$0<D1St/TL<0.4 \quad (23)$$

$$0.05<D1St/TL<0.3 \quad (23\text{-}1)$$

$$0.1<D1St/TL<0.25 \quad (23\text{-}2)$$

Assuming that a focal length of the imaging lens in a state where the infinite distance object is in focus is f and a focal length of the first A group G1A is f1A, it is preferable that the imaging lens satisfies Conditional Expression (24). By not allowing the corresponding value of Conditional Expression (24) to be equal to or less than the lower limit thereof, there is an advantage in achieving reduction in diameter of the aperture stop St. By not allowing the corresponding value of Conditional Expression (24) to be equal to or greater than the upper limit thereof, there is an advantage in correcting distortion and field curvature. In order to obtain more favorable characteristics, it is more preferable that the imaging lens satisfies Conditional Expression (24-1), and it is yet more preferable that the imaging lens satisfies Conditional Expression (24-2).

$$-1<f/f1A<0 \quad (24)$$

$$-0.9<f/f1A<-0.1 \quad (24\text{-}1)$$

$$-0.8<f/f1A<-0.2 \quad (24\text{-}2)$$

It is preferable that the imaging lens satisfies Conditional Expression (25). Here, it is assumed that an amount of movement of the second lens group G2 during focusing from the infinite distance object to the closest object is M2. Further, it is assumed that a sum of the distance on the optical axis from the lens surface closest to the object side in the imaging lens to the lens surface closest to the image side in the imaging lens and the air-equivalent distance on the optical axis from the lens surface closest to the image side in the imaging lens to the image plane Sim is TL. By not allowing the corresponding value of Conditional Expression (25) to be equal to or less than the lower limit thereof, it is possible to suppress rigidness in accuracy of stop of the focus group during focusing. By not allowing the corresponding value of Conditional Expression (25) to be equal to or greater than the upper limit thereof, the amount of movement of the focus group during focusing can be shortened. As a result, there is an advantage in achieving reduction in total length of the lens system. In order to obtain more favorable characteristics, it is more preferable that the imaging lens satisfies Conditional Expression (25-1), and it is yet more preferable that the imaging lens satisfies Conditional Expression (25-2).

$$0.03<M2/TL<0.3 \quad (25)$$

$$0.04<M2/TL<0.2 \quad (25\text{-}1)$$

$$0.05<M2/TL<0.15 \quad (25\text{-}2)$$

Assuming that a paraxial curvature radius of the lens surface closest to the object side in the second lens group G2 is R2f and a paraxial curvature radius of the lens surface closest to the image side in the second lens group G2 is R2r, it is preferable that the imaging lens satisfies Conditional Expression (26). By not allowing the corresponding value of Conditional Expression (26) to be equal to or less than the lower limit thereof, there is an advantage in correcting field curvature. By not allowing the corresponding value of Conditional Expression (26) to be equal to or greater than the upper limit thereof, there is an advantage in correcting spherical aberration. In order to obtain more favorable characteristics, it is more preferable that the imaging lens satisfies Conditional Expression (26-1), and it is yet more preferable that the imaging lens satisfies Conditional Expression (26-2).

$$0<(R2f-R2r)/(R2f+R2r)<3 \quad (26)$$

$$0.3<(R2f-R2r)/(R2f+R2r)<2 \quad (26\text{-}1)$$

$$0.6<(R2f-R2r)/(R2f+R2r)<1.5 \quad (26\text{-}2)$$

Assuming that a focal length of the imaging lens in a state where the infinite distance object is in focus is f and a focal length of the second lens group G2 is f2, it is preferable that the imaging lens satisfies Conditional Expression (27). By not allowing the corresponding value of Conditional Expression (27) to be equal to or less than the lower limit thereof, it is possible to suppress rigidness in accuracy of stop of the focus group during focusing. By not allowing the corresponding value of Conditional Expression (27) to be equal to or greater than the upper limit thereof, the amount of movement of the focus group during focusing can be shortened. As a result, there is an advantage in achieving reduction in total length of the lens system. In order to obtain more favorable characteristics, it is more preferable that the imaging lens satisfies Conditional Expression (27-1), and it is yet more preferable that the imaging lens satisfies Conditional Expression (27-2).

$$-2.5<f/f2<0 \quad (27)$$

$$-2<f/f2<-0.5 \quad (27\text{-}1)$$

$$-1.8<f/f2<-0.8 \quad (27\text{-}2)$$

Assuming that a focal length of the first lens group G1 is f1 and a focal length of the second lens group G2 is f2, it is preferable that the imaging lens satisfies Conditional Expression (28). By not allowing the corresponding value of Conditional Expression (28) to be equal to or less than the lower limit thereof, it is possible to suppress rigidness in accuracy of stop of the focus group during focusing. By not allowing the corresponding value of Conditional Expression (28) to be equal to or greater than the upper limit thereof, the amount of movement of the focus group during focusing can be shortened. As a result, there is an advantage in achieving reduction in total length of the lens system. In order to obtain more favorable characteristics, it is more preferable that the imaging lens satisfies Conditional Expression (28-1), and it is yet more preferable that the imaging lens satisfies Conditional Expression (28-2).

$$-1.5<f1/f2<0 \quad (28)$$

$$-1.2<f1/f2<-0.2 \quad (28\text{-}1)$$

$$-1<f1/f2<-0.4 \quad (28\text{-}2)$$

The imaging lens consists of, in order from the object side to the image side, a first lens group G1, a second lens group G2, and a third lens group G3 remaining stationary with respect to the image plane Sim during focusing, it is preferable that the imaging lens satisfies Conditional Expression (29). Here, it is assumed that a focal length of the first lens group G1 is f1 and a focal length of the third lens group G3 is f3. By not allowing the corresponding value of Conditional Expression (29) to be equal to or less than the lower limit thereof, the negative refractive power of the third lens group G3 is prevented from becoming excessively strong. Therefore, the angle of incidence of the principal ray of off-axis luminous flux on the image plane Sim can be suppressed from becoming large. By not allowing the corresponding value of Conditional Expression (29) to be equal to or greater than the upper limit thereof, the positive refractive power of the third lens group G3 is prevented from becoming excessively strong. Therefore, it is possible to suppress an increase in field curvature. In order to obtain more favorable characteristics, it is more preferable that the imaging lens satisfies Conditional Expression (29-1), and it is yet more preferable that the imaging lens satisfies Conditional Expression (29-2).

$$-1<f1/f3<2 \quad (29)$$

$$-0.5<f1/f3<1.5 \quad (29\text{-}1)$$

$$-0.1<f1/f3<1 \quad (29\text{-}2)$$

In a configuration in which the imaging lens consists of a first lens group G1, a second lens group G2, and a third lens group G3 in order from the object side to the image side, it is preferable that the imaging lens satisfies Conditional Expression (30). Here, it is assumed that a focal length of the second lens group G2 is f2 and a focal length of the third lens group G3 is f3. By not allowing the corresponding value of Conditional Expression (30) to be equal to or less than the lower limit thereof, the negative refractive power of the third lens group G3 is prevented from becoming excessively strong. Therefore, the angle of incidence of the principal ray of off-axis luminous flux on the image plane Sim can be suppressed from becoming large. By not allowing the corresponding value of Conditional Expression (30) to be equal to or greater than the upper limit thereof, the positive refractive power of the third lens group G3 is prevented from becoming excessively strong. Therefore, it is possible to suppress an increase in field curvature. In order to obtain more favorable characteristics, it is more preferable that the imaging lens satisfies Conditional Expression (30-1), and it is yet more preferable that the imaging lens satisfies Conditional Expression (30-2).

$$-0.5<f2/f3<0.5 \quad (30)$$

$$-0.45<f2/f3<0.3 \quad (30\text{-}1)$$

$$-0.4<f2/f3<0.1 \quad (30\text{-}2)$$

Assuming that a minimum value of Z coefficients of all the lenses of the second lens group G2 is Z2 min, it is preferable that the imaging lens satisfies Conditional Expression (31). By not allowing the corresponding value of Conditional Expression (31) to be equal to or less than the lower limit thereof, there is an advantage in improving the processability of the lens. By not allowing the corresponding value of Conditional Expression (31) to be equal to or greater than the upper limit thereof, there is an advantage in correcting field curvature. In order to obtain more favorable characteristics, it is more preferable that the imaging lens satisfies Conditional Expression (31-1), and it is yet more preferable that the imaging lens satisfies Conditional Expression (31-2).

$$0.035 < Z2\ \text{min} < 0.13 \tag{31}$$

$$0.04 < Z2\ \text{min} < 0.1 \tag{31-1}$$

$$0.045 < Z2\ \text{min} < 0.09 \tag{31-2}$$

The Z coefficient of the lens is defined by the following expression. Here, it is assumed that an effective diameter of the object side surface of the lens is EDf, an effective diameter of the image side surface of the lens is EDr, a paraxial curvature radius of the object side surface of the lens is Rf, and a paraxial curvature radius of the image side surface of the lens is Rr.

$$Z\ \text{coefficient} = (1/4) \times |EDf/Rf - EDr/Rr|$$

In the present specification, twice the distance to the optical axis Z from the intersection between the lens surface and the ray passing through the outermost side among rays incident onto the lens surface from the object side and emitted to the image side is the "effective diameter" of the lens surface. The "outside" here is the radial outside centered on the optical axis Z, that is, the side separated from the optical axis Z. Further, the "ray passing through the outermost side" is determined in consideration of the fully focused state.

Figure 3:
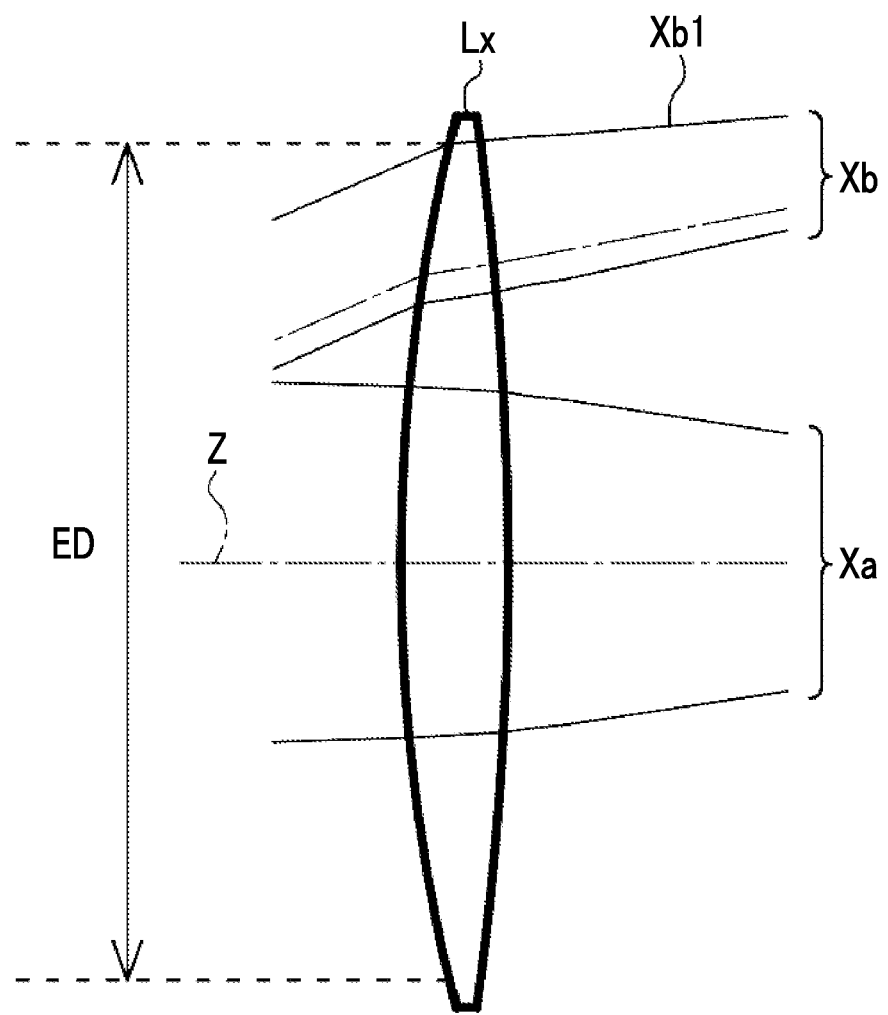
FIG. 3 is a diagram for explaining an effective diameter.

As an explanatory diagram, FIG. 3 shows an example of an effective diameter ED. In FIG. 3, the left side is the object side, and the right side is the image side. FIG. 3 shows an on-axis luminous flux Xa and an off-axis luminous flux Xb passing through the lens Lx. In the example of FIG. 3, a ray Xb1, which is the upper ray of the off-axis luminous flux Xb, is the ray passing through the outermost side. Therefore, in the example of FIG. 3, twice the distance to the optical axis Z from the intersection between the ray Xb1 and the object side surface of the lens Lx is the effective diameter ED of the object side surface of the lens Lx. In FIG. 3, the upper ray of the off-axis luminous flux Xb is the ray passing through the outermost side, but which ray is the ray passing through the outermost side depends on the optical system.

Assuming that a lateral magnification of the second lens group G2 in a state where the closest object is in focus is β2m and a combined lateral magnification of all the lenses closer to the image side than the second lens group G2 in a state where the closest object is in focus is βrm, it is preferable that the imaging lens satisfies Conditional Expression (32). However, in a case where the lens is not disposed closer to the image side than the second lens group G2, βrm=1. By not allowing the corresponding value of Conditional Expression (32) to be equal to or less than the lower limit thereof, it is possible to suppress rigidness in accuracy of stop of the focus group during focusing. By not allowing the corresponding value of Conditional Expression (32) to be equal to or greater than the upper limit thereof, the amount of movement of the focus group during focusing can be shortened. As a result, there is an advantage in achieving reduction in total length of the lens system. In order to obtain more favorable characteristics, it is more preferable that the imaging lens satisfies Conditional Expression (32-1), and it is yet more preferable that the imaging lens satisfies Conditional Expression (32-2).

$$-5 < (1-\beta 2m^2) \times \beta rm^2 < -1 \tag{32}$$

$$-4.5 < (1-\beta 2m^2) \times \beta rm^2 < -1.5 \tag{32-1}$$

$$-4 < (1-\beta 2m^2) \times \beta rm^2 < -2 \tag{32-2}$$

The imaging lens consists of, in order from the object side to the image side, the first lens group G1, the second lens group G2, and the third lens group G3 remaining stationary with respect to the image plane Sim during focusing. In such a configuration, it is preferable that the imaging lens satisfies Conditional Expression (33). Here, it is assumed that an effective diameter on the lens surface closest to the object side of the third lens group G3 in a state where the closest object is in focus is ED3m. Further, it is assumed that an effective diameter on the lens surface closest to the object side in the third lens group G3 in a state where the infinite distance object is in focus is ED3i. By not allowing the corresponding value of Conditional Expression (33) to be equal to or less than the lower limit thereof, it is possible to suppress an increase in angle of incidence of the principal ray of off-axis luminous flux on the image plane Sim in a state where the closest object is in focus. By not allowing the corresponding value of Conditional Expression (33) to be equal to or greater than the upper limit thereof, there is an advantage in correcting field curvature for each object distance. In order to obtain more favorable characteristics, it is more preferable that the imaging lens satisfies Conditional Expression (33-1), and it is yet more preferable that the imaging lens satisfies Conditional Expression (33-2).

$$0.5 < ED3m/ED3i < 1 \tag{33}$$

$$0.6 < ED3m/ED3i < 0.9 \tag{33-1}$$

$$0.7 < ED3m/ED3i < 0.85 \tag{33-2}$$

It is preferable that the imaging lens satisfies Conditional Expression (34). Here, it is assumed that a minimum air spacing on the optical axis in the second lens group G2 is D2 min. Further, it is assumed that a sum of the distance on the optical axis from the lens surface closest to the object side in the imaging lens to the lens surface closest to the image side in the imaging lens and the air-equivalent distance on the optical axis from the lens surface closest to the image side in the imaging lens to the image plane Sim is TL. Since D2 min is an air spacing and TL is a distance, regarding the lower limit of Conditional Expression (34), 0<D2 min/TL. By not allowing the corresponding value of Conditional Expression (34) to be equal to or greater than the upper limit thereof, there is an advantage in achieving reduction in size. In order to obtain more favorable characteristics, it is more preferable that the imaging lens satisfies Conditional Expression (34-1), and it is yet more preferable that the imaging lens satisfies Conditional Expression (34-2).

$$0 < D2\ \text{min}/TL < 0.05 \tag{34}$$

$$0 < D2\ \text{min}/TL < 0.03 \tag{34-1}$$

$$0 < D2\ \text{min}/TL < 0.015 \tag{34-2}$$

The imaging lens consists of the first lens group G1, the second lens group G2, and the third lens group G3 in order from the object side to the image side, and the third lens group G3 includes a cemented lens consisting of one positive lens and one negative lens. In such a configuration, it is preferable that the imaging lens satisfies Conditional Expression (35). Here, it is assumed that a refractive index of the cemented lens of the third lens group G3 at the d line of the positive lens is N3p and a refractive index of the cemented lens of the third lens group G3 at the d line of the negative lens is N3n. By satisfying Conditional Expression (35), there is an advantage in correcting lateral chromatic aberration. In order to obtain more favorable characteristics, it is more preferable that the imaging lens satisfies Conditional Expression (35-1), and it is yet more preferable that the imaging lens satisfies Conditional Expression (35-2).

$$-0.7<N3p-N3n<0 \tag{35}$$

$$-0.6<N3p-N3n<-0.2 \tag{35-1}$$

$$-0.5<N3p-N3n<-0.4 \tag{35-2}$$

The imaging lens consists of the first lens group G1, the second lens group G2, and the third lens group G3 in order from the object side to the image side, and the third lens group G3 includes the cemented lens. In such a configuration, it is preferable that the imaging lens satisfies Conditional Expression (36). Here, it is assumed that an Abbe number of the positive lens of the cemented lens of the third lens group G3 based on the d line is ν3p and an Abbe number of the negative lens of the cemented lens of the third lens group G3 based on the d line is ν3n. By satisfying Conditional Expression (36), there is an advantage in correcting lateral chromatic aberration. In order to obtain more favorable characteristics, it is more preferable that the imaging lens satisfies Conditional Expression (36-1), and it is yet more preferable that the imaging lens satisfies Conditional Expression (36-2).

$$5<\nu 3p-\nu 3n<80 \tag{36}$$

$$10<\nu 3p-\nu 3n<75 \tag{36-1}$$

$$15<\nu 3p-\nu 3n<70 \tag{36-2}$$

The imaging lens consists of the first lens group G1, the second lens group G2, and the third lens group G3 in order from the object side to the image side, and the third lens group G3 includes the cemented lens. In such a configuration, it is preferable that the imaging lens satisfies Conditional Expression (37). Here, it is assumed that a partial dispersion ratio of the positive lens of the cemented lens of the third lens group G3 between the g line and the F line is θ3p and a partial dispersion ratio of the negative lens of the cemented lens of the third lens group G3 between the g line and the F line is θ3n. By satisfying Conditional Expression (37), there is an advantage in correcting lateral chromatic aberration. In order to obtain more favorable characteristics, it is more preferable that the imaging lens satisfies Conditional Expression (37-1), and it is yet more preferable that the imaging lens satisfies Conditional Expression (37-2).

$$-0.2<\theta 3p-\theta 3n<0 \tag{37}$$

$$-0.17<\theta 3p-\theta 3n<-0.01 \tag{37-1}$$

$$-0.15<\theta 3p-\theta 3n<-0.03 \tag{37-2}$$

The imaging lens consists of the first lens group G1, the second lens group G2, and the third lens group G3 in order from the object side to the image side, and the third lens group G3 includes the cemented lens. In such a configuration, it is more preferable that the imaging lens satisfies Conditional Expressions (35), (36), and (37) simultaneously. In order to obtain more favorable characteristics, it is yet more preferable that the imaging lens satisfies Conditional Expressions (35), (36), and (37) simultaneously, and then satisfies at least one of Conditional Expressions (35-1), (35-2), (36-1), (36-2), (37-1), and (37-2).

The imaging lens consists of the first lens group G1, the second lens group G2, and the third lens group G3 in order from the object side to the image side, and the third lens group G3 includes the cemented lens. In such a configuration, it is preferable that the imaging lens satisfies Conditional Expression (38). Here, it is assumed that a refractive index at the d line of the positive lens of the cemented lens of the third lens group G3 is N3p. By not allowing the corresponding value of Conditional Expression (38) to be less than or equal to the lower limit thereof, the refractive index is prevented from becoming excessively low. Therefore, the absolute value of the curvature radius is prevented from becoming excessively small. Thereby, the sensitivity to error can be suppressed. In general, the Abbe number decreases as the refractive index of the optical material for a lens increases. Therefore, by not allowing the corresponding value of Conditional Expression (38) to be equal to or greater than the upper limit, there is an advantage in correcting lateral chromatic aberration. In order to obtain more favorable characteristics, it is more preferable that the imaging lens satisfies Conditional Expression (38-1), and it is yet more preferable that the imaging lens satisfies Conditional Expression (38-2).

$$1.3<N3p<1.7 \tag{38}$$

$$1.3<N3p<1.6 \tag{38-1}$$

$$1.4<N3p<1.55 \tag{38-2}$$

In a configuration in which the first B group G1B includes a cemented lens, assuming that a paraxial curvature radius of the surface closest to the object side in the cemented lens of the first B group G1B is R1Bf, a paraxial curvature radius of the surface closest to the image side in the cemented lens of the first B group G1B is R1Br, it is preferable that the imaging lens satisfies Conditional Expression (39). By not allowing the corresponding value of Conditional Expression (39) to be equal to or less than the lower limit thereof, there is an advantage in correcting field curvature. By not allowing the corresponding value of Conditional Expression (39) to be equal to or greater than the upper limit thereof, there is an advantage in correcting spherical aberration. In order to obtain more favorable characteristics, it is more preferable that the imaging lens satisfies Conditional Expression (39-1), and it is yet more preferable that the imaging lens satisfies Conditional Expression (39-2).

$$-20<(R1Bf+R1Br)/(R1Bf-R1Br)<0 \tag{39}$$

$$-15<(R1Bf+R1Br)/(R1Bf-R1Br)<-1 \tag{39-1}$$

$$-10<(R1Bf+R1Br)/(R1Bf-R1Br)<-2 \tag{39-2}$$

In a configuration in which the first A group G1A includes a cemented lens consisting of one negative lens and one positive lens, it is preferable that the imaging lens satisfies Conditional Expression (40). Here, it is assumed that a refractive index of the positive lens of the cemented lens of the first A group G1A at the d line is N1Ap and a refractive index of the negative lens of the cemented lens of the first A group G1A at the d line is N1An. By satisfying Conditional Expression (40), there is an advantage in correcting longitudinal chromatic aberration. In order to obtain more favorable characteristics, it is more preferable that the imaging lens satisfies Conditional Expression (40-1), and it is yet more preferable that the imaging lens satisfies Conditional Expression (40-2).

$$0<N1Ap-N1An<0.5 \tag{40}$$

$$0.1<N1Ap-N1An<0.3 \tag{40-1}$$

$$0.12<N1Ap-N1An<0.17 \tag{40-2}$$

In a configuration in which the first A group G1A includes a cemented lens consisting of one negative lens and one positive lens, it is preferable that the imaging lens satisfies Conditional Expression (41). Here, it is assumed that an Abbe number of the positive lens of the cemented lens of the first A group G1A based on the d line is ν1Ap, and an Abbe number of the negative lens of the cemented lens of the first A group G1A based on the d line is ν1An. By satisfying Conditional Expression (41), there is an advantage in correcting longitudinal chromatic aberration. In order to obtain more favorable characteristics, it is more preferable that the imaging lens satisfies Conditional Expression (41-1), and it is yet more preferable that the imaging lens satisfies Conditional Expression (41-2).

$$-50 < \nu1Ap - \nu1An < 0 \quad (41)$$

$$-40 < \nu1Ap - \nu1An < -10 \quad (41\text{-}1)$$

$$-35 < \nu1Ap - \nu1An < -20 \quad (41\text{-}2)$$

In a configuration in which the first A group G1A includes a cemented lens consisting of one negative lens and one positive lens, it is preferable that the imaging lens satisfies Conditional Expression (42). Here, it is assumed that a partial dispersion ratio of the positive lens of the cemented lens of the first A group G1A between the g line and the F line is θ1Ap and a partial dispersion ratio of the negative lens of the cemented lens of the first A group G1A between the g line and the F line is θ1An. By satisfying Conditional Expression (42), there is an advantage in correcting longitudinal chromatic aberration. In order to obtain more favorable characteristics, it is more preferable that the imaging lens satisfies Conditional Expression (42-1), and it is yet more preferable that the imaging lens satisfies Conditional Expression (42-2).

$$0 < \theta1Ap - \theta1An < 0.1 \quad (42)$$

$$0.02 < \theta1Ap - \theta1An < 0.08 \quad (42\text{-}1)$$

$$0.04 < \theta1Ap - \theta1An < 0.07 \quad (42\text{-}2)$$

In a configuration in which the first A group G1A includes a cemented lens consisting of one negative lens and one positive lens, it is more preferable that the imaging lens further satisfies Conditional Expressions (40), (41), and (42) simultaneously. In order to obtain more favorable characteristics, it is yet more preferable that the imaging lens satisfies Conditional Expressions (40), (41), and (42) simultaneously, and then satisfies at least one of Conditional Expressions (40-1), (40-2), (41-1), (41-2), (42-1), and (42-2).

The first B group G1B may be configured to include two or more lens components. In a configuration in which the first B group G1B includes two or more lens components and a single lens that has a positive refractive power is disposed closest to the object side in the first B group G1B, it is preferable that the imaging lens satisfies Conditional Expression (43). Here, it is assumed that a paraxial curvature radius of the image side surface of the single lens that has a positive refractive power and that is closest to the object side in the first B group G1B is R1Baf. Further, it is assumed that a paraxial curvature radius of the surface closest to the object side in the lens component disposed adjacent to the image side of the single lens that has a positive refractive power and that is closest to the object side in the first B group G1B is R1Bar. In the example of FIG. 1, the single lens that has a positive refractive power and that is closest to the object side in the first B group G1B corresponds to the lens L14, and the lens component disposed adjacent to the image side of the single lens that has a positive refractive power and that is closest to the object side in the first B group G1B corresponds to a cemented lens in which the lens L15 and the lens L16 are cemented. In the example of FIG. 1, Conditional Expression (43) is an expression of a shape factor of an air lens formed by the air spacing between the image side surface of the lens L14 and the object side surface of the lens L15. By satisfying Conditional Expression (43), there is an advantage in correcting spherical aberration. In order to obtain more favorable characteristics, it is more preferable that the imaging lens satisfies Conditional Expression (43-1), and it is yet more preferable that the imaging lens satisfies Conditional Expression (43-2).

$$-0.3 < (R1Baf - R1Bar)/(R1Baf + R1Bar) < 0.6 \quad (43)$$

$$-0.2 < (R1Baf - R1Bar)/(R1Baf + R1Bar) < 0.5 \quad (43\text{-}1)$$

$$-0.1 < (R1Baf - R1Bar)/(R1Baf + R1Bar) < 0.4 \quad (43\text{-}2)$$

The second lens group G2 may be configured to include two or more lens components. In a configuration in which the second lens group G2 includes two or more lens components and a single lens that has a positive refractive power and that is disposed closest to the object side in the second lens group G2, it is preferable that the imaging lens satisfies Conditional Expression (44). Here, it is assumed that a paraxial curvature radius of the image side surface of the single lens that has a positive refractive power and that is closest to the object side in the second lens group G2 is R2af. Further, it is assumed that a paraxial curvature radius of the surface closest to the object side in the lens component disposed adjacent to the image side of the single lens that has a positive refractive power and that is closest to the object side in the second lens group G2 is R2ar. In the example of FIG. 1, the single lens that has a positive refractive power and that is closest to the object side in the second lens group G2 corresponds to the lens L21, and the lens component disposed adjacent to the image side of the single lens that has a positive refractive power and that is closest to the object side in the second lens group G2 corresponds to a cemented lens in which the lens L22 and the lens L23 are cemented. In the example of FIG. 1, Conditional Expression (44) is an expression of a shape factor of an air lens formed by the air spacing between the image side surface of the lens L21 and the object side surface of the lens L22. By satisfying Conditional Expression (44), there is an advantage in correcting spherical aberration. In order to obtain more favorable characteristics, it is more preferable that the imaging lens satisfies Conditional Expression (44-1), and it is yet more preferable that the imaging lens satisfies Conditional Expression (44-2).

$$-0.4 < (R2af - R2ar)/(R2af + R2ar) < 0.4 \quad (44)$$

$$-0.3 < (R2af - R2ar)/(R2af + R2ar) < 0.3 \quad (44\text{-}1)$$

$$-0.2 < (R2af - R2ar)/(R2af + R2ar) < 0.2 \quad (44\text{-}2)$$

It is preferable that the imaging lens satisfies Conditional Expression (45). Here, it is assumed that a minimum air spacing on the optical axis in the first B group G1B is D1Bmin. Further, it is assumed that a sum of the distance on the optical axis from the lens surface closest to the object side in the imaging lens to the lens surface closest to the image side in the imaging lens and the air-equivalent distance on the optical axis from the lens surface closest to the image side in the imaging lens to the image plane Sim is TL. Since D1Bmin is an air spacing and TL is a distance, regarding the lower limit of Conditional Expression (45), 0 < D1Bmin/TL. By not allowing the corresponding value of Conditional Expression (45) to be equal to or greater than the upper limit thereof, there is an advantage in achieving reduction in size. In order to obtain more favorable characteristics, it is more preferable that the imaging lens satisfies Conditional Expression (45-1), and it is yet more preferable that the imaging lens satisfies Conditional Expression (45-2).

$$0<D1B\,\mathrm{min}/TL<0.05 \tag{45}$$

$$0<D1B\,\mathrm{min}/TL<0.03 \tag{45-1}$$

$$0<D1B\,\mathrm{min}/TL<0.015 \tag{45-2}$$

Assuming that a maximum image height is Ymax and a focal length of the imaging lens in a state where the infinite distance object is in focus is f, it is preferable that the imaging lens satisfies Conditional Expression (46). The arctan is an inverse function of the tangent. By not allowing the corresponding value of Conditional Expression (46) to be equal to or less than the lower limit thereof, the effect of the technique according to the embodiment of the present disclosure can be satisfactorily obtained in the range from the so-called wide-angle lens to the standard lens. By not allowing the corresponding value of Conditional Expression (46) to be equal to or greater than the upper limit thereof, the angle of view is prevented from being excessively increased. Therefore, it is possible to prevent aberration correction from becoming difficult. In order to obtain more favorable characteristics, it is more preferable that the imaging lens satisfies Conditional Expression (46-1), and it is yet more preferable that the imaging lens satisfies Conditional Expression (46-2).

$$20<\arctan(Y\,\mathrm{max}/f)<60 \tag{46}$$

$$22<\arctan(Y\,\mathrm{max}/f)<50 \tag{46-1}$$

$$25<\arctan(Y\,\mathrm{max}/f)<40 \tag{46-2}$$

The imaging lens may be configured to have a function of correcting image shake, that is, a vibration-proof function. For example, the image shake correction may be performed by moving apart of the first A group G1A in a direction intersecting the optical axis Z. Alternatively, the image shake correction may be performed by moving a part of the first B group G1B in a direction intersecting the optical axis Z. In the present specification, a group that moves in a direction intersecting the optical axis Z during image shake correction is referred to as a vibration-proof group. In a case where a part of the first lens group G1 is set as the vibration-proof group, the vibration-proof group can be formed by using a lens having a relatively small diameter in the vicinity of the aperture stop St. Therefore, there is an advantage in achieving reduction in size and weight of the vibration-proof group. For example, the vibration-proof group may be configured to consist of one lens adjacent to the aperture stop St. In such a case, there is an advantage in achieving reduction in size and weight of the vibration-proof group.

The example shown in FIG. 1 is an example, and various modifications can be made without departing from the scope of the technique according to the embodiment of the present disclosure. For example, the number of lenses included in each lens group may be different from the number shown in FIG. 1.

The above-mentioned preferred configurations and available configurations may be optional combinations, and it is preferable to appropriately selectively adopt the configurations in accordance with required specification. It should be noted that Conditional Expressions that the imaging lens according to the embodiment of the present disclosure preferably satisfies are not limited to Conditional Expressions described in the form of Expression, and the lower limit and the upper limit are selected from the preferable, more preferable, yet more preferable, and most preferable conditional expressions. Conditional Expressions may include all conditional expressions obtained through optional combinations.

For example, in a preferred aspect, the imaging lens according to the embodiment of the present disclosure comprises, in order from the position closest to the object side to the image side, a first lens group G1 that has a positive refractive power and a second lens group G2 that has a negative refractive power. During focusing, only the second lens group G2 moves along the optical axis Z. The first lens group G1 consists of the first A group G1A, the aperture stop St, and the first B group G1B, in order from the object side to the image side, and the second lens group G2 includes at least one positive lens. The imaging lens satisfies Conditional Expressions (1) and (2).

Next, examples of the imaging lens according to the embodiment of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Example 1

FIG. 1 is a cross-sectional view of a configuration of an imaging lens of Example 1, and an illustration method and a configuration thereof are as described above. Therefore, some description is not repeated herein. The imaging lens of Example 1 consists of, in order from the object side to the image side, a first lens group G1 having a positive refractive power, a second lens group G2 having a negative refractive power, and a third lens group G3 having a positive refractive power. The first lens group G1 consists of a first A group G1A that has a negative refractive power, an aperture stop St, and a first B group GIB that has a positive refractive power in order from the object side to the image side. During focusing from the infinite distance object to the closest object, the first lens group G1 and the third lens group G3 remain stationary with respect to the image plane Sim, and the second lens group G2 moves to the image side. The outline of the imaging lens according to Example 1 has been described above.

Regarding the imaging lens of Example 1, Table 1 shows basic lens data, Table 2 shows specifications and variable surface spacings, and Table 3 shows aspherical coefficients thereof. The table of basic lens data will be described as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each constituent element at the d line. The column of vd shows an Abbe number of each constituent element based on the d line. The column of θgF shows a partial dispersion ratio of each constituent element between the g line and the F line. The column of ED shows an effective diameter of each lens surface.

In the table of basic lens data, the sign of the curvature radius of the convex surface facing toward the object side is positive and the sign of the curvature radius of the convex surface facing toward the image side is negative. Table 1 also shows the aperture stop St and the optical member PP. In a cell of a surface number of a surface corresponding to the aperture stop St, the surface number and a term of (St) are noted. A value at the bottom cell of the column of surface spacing in the table indicates a spacing between the image plane Sim and the surface closest to the image side in the table. The symbol DD[ ] is used for each variable surface spacing during focusing, and the object side surface number of the spacing is given in [ ] and is noted in the column of surface spacing.

Table 2 shows the focal length, the F number, the maximum total angle of view, the maximum image height, and the variable surface spacing based on the d line. [°] in the column of the maximum total angle of view indicates the unit is degrees. In Table 2, the column of "Infinity" shows values in a state where the infinite distance object is in focus, and the column of "Closest" shows values in a state where the closest object is in focus. However, the description of the F number and the maximum image height in a state where the closest object is in focus is not repeated. In Example 1, the distance on the optical axis from the lens surface closest to the object side to the closest object is 18.2 millimeters (mm).

In basic lens data, a reference sign * is attached to surface numbers of aspherical surfaces, and numerical values of the paraxial curvature radius are written into the column of the curvature radius of the aspherical surface. In Table 3, the row of Sn shows surface numbers of the aspherical surfaces, and the rows of KA and Am show numerical values of the aspherical coefficients for each aspherical surface. It should be noted that m of Am is an integer of 3 or more, and differs depending on the surface. For example, in the first surface of Example 1, m=4, 6, 8, . . . , 16. The "E±n" (n: an integer) in numerical values of the aspherical coefficients of Table 3 indicates "×10$^{±n}$". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is an inverse of the paraxial curvature radius, KA and Am are aspherical coefficients, and $\Sigma$ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | vd | θgF | ED |
|---|---|---|---|---|---|---|
| *1 | 259.44525 | 1.000 | 1.58254 | 59.44 | 0.54184 | 14.6 |
| *2 | 11.42635 | 2.890 | | | | 13 |
| 3 | 95.17947 | 1.130 | 1.51633 | 64.14 | 0.53531 | 12.9 |
| 4 | 18.50036 | 1.000 | | | | 12.7 |
| 5 | 18.74098 | 3.750 | 1.80611 | 33.29 | 0.59129 | 13.59 |
| 6 | −72.28533 | 2.000 | | | | 13.63 |
| 7(St) | ∞ | 6.690 | | | | |
| 8 | 79.81830 | 3.710 | 1.49700 | 81.54 | 0.53748 | 13.93 |
| 9 | −18.45388 | 1.870 | | | | 13.91 |
| 10 | −11.37137 | 1.000 | 1.77047 | 29.74 | 0.59514 | 13.45 |
| 11 | 29.94630 | 4.710 | 1.49700 | 81.54 | 0.53748 | 15.11 |
| 12 | −17.25886 | 0.530 | | | | 16.13 |
| *13 | 40.08092 | 5.010 | 1.69350 | 53.20 | 0.54661 | 17.4 |
| *14 | −16.06849 | DD[14] | | | | 18.01 |
| 15 | 1355.62916 | 2.000 | 1.98613 | 16.48 | 0.66558 | 16.76 |
| 16 | −58.35203 | 0.500 | | | | 16.58 |
| 17 | −80.63177 | 1.710 | 1.67270 | 32.17 | 0.59825 | 16.19 |
| 18 | −31.01440 | 0.850 | 1.88300 | 39.22 | 0.57288 | 15.92 |
| 19 | 17.59974 | DD[19] | | | | 15.36 |
| *20 | −362.90949 | 4.470 | 1.51633 | 64.06 | 0.53345 | 22.58 |
| *21 | −29.00029 | 17.731 | | | | 23.49 |
| 22 | ∞ | 2.850 | 1.51680 | 64.20 | 0.53430 | |
| 23 | ∞ | 1.094 | | | | |

TABLE 2

Example 1

| | Infinity | Closest |
|---|---|---|
| Focal length | 29.109 | 19.101 |
| F number | 2.9 | |
| Maximum total angle of view [°] | 50.52 | 57.00 |
| Maximum image height | 14.2 | |
| DD[14] | 2.301 | 10.754 |
| DD[19] | 13.210 | 4.757 |

TABLE 3

Example 1

| Sn | 1 | 2 | 13 | 14 |
|---|---|---|---|---|
| KA | 1.0000000E+00 | 1.0000000E+00 | 1.0000000E+00 | 1.0000000E+00 |
| A4 | 1.4396948E−05 | −4.0187236E−05 | −1.7843847E−05 | 3.8791719E−05 |
| A6 | −7.5963315E−07 | −3.8178518E−07 | −6.5995223E−08 | −1.4891402E−07 |
| A8 | −2.2725354E−09 | −5.4098636E−08 | 1.8437096E−09 | 3.5802063E−09 |
| A10 | 7.2019214E−10 | 2.3495932E−09 | −2.5347955E−11 | −4.1769287E−11 |
| A12 | −2.1291689E−11 | −4.9163190E−11 | 1.5476592E−13 | 2.0464846E−13 |
| A14 | 2.8269476E−13 | 4.9032401E−13 | 1.1527442E−16 | 6.0430443E−16 |
| A16 | −1.4725889E−15 | −1.7126359E−15 | −4.4874977E−18 | −7.4079572E−18 |

| Sn | 20 | 21 |
|---|---|---|
| KA | 1.0000000E+00 | 1.0000000E+00 |
| A3 | 0.0000000E+00 | 0.0000000E+00 |
| A4 | −2.2626567E−06 | −1.4960212E−05 |
| A5 | −7.0952262E−07 | 5.0389048E−06 |
| A6 | 1.4860493E−07 | −4.8304387E−07 |
| A7 | −4.3810692E−09 | −8.0620131E−10 |
| A8 | −5.4028261E−10 | 1.4080434E−09 |
| A9 | 6.3776223E−12 | 7.9810471E−11 |
| A10 | 1.4554305E−12 | 1.3654881E−12 |
| A11 | 3.5058198E−13 | −5.2410713E−13 |
| A12 | 9.7555868E−15 | −3.7873139E−14 |
| A13 | −1.7508595E−15 | −2.0502988E−15 |
| A14 | −1.4774613E−17 | 5.2818284E−17 |
| A15 | −1.5738626E−17 | 1.5352864E−17 |
| A16 | −9.6280788E−19 | 1.3005284E−18 |
| A17 | 4.3535877E−20 | 5.0895333E−20 |
| A18 | 1.1041635E−20 | −1.5766933E−21 |
| A19 | 2.3670175E−21 | −2.8173143E−23 |
| A20 | −2.0340105E−22 | −4.2744026E−23 |

Figure 4:
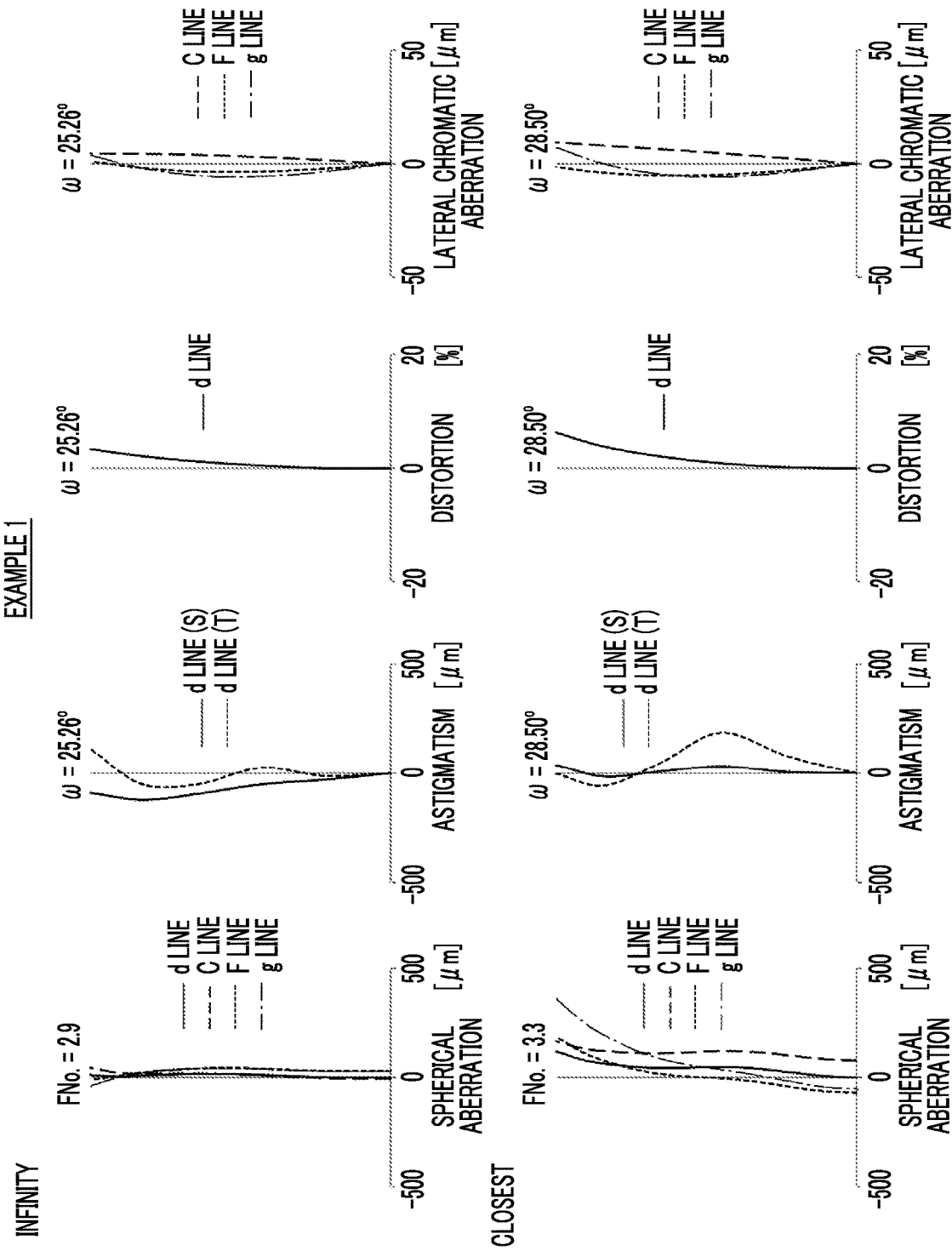
FIG. 4 is a diagram showing aberrations of the imaging lens of Example 1.

FIG. 4 shows a diagram showing aberrations of the imaging lens of Example 1. In FIG. 4, in order from the left side, spherical aberration, astigmatism, distortion, and lateral chromatic aberration are shown. In FIG. 4, the upper part labeled "infinity" shows aberration diagrams in a state where the infinite distance object is in focus, and the lower part labeled "closest" shows aberration diagrams in a state where the closest object is in focus. In the spherical aberration diagram, aberrations at the d line, the C line, the F line, and the g line are indicated by the solid line, the long broken line, the short broken line, and the chain line, respectively. In the astigmatism diagram, aberration in the sagittal direction at the d line is indicated by the solid line, and aberration in the tangential direction at the d line is indicated by the short broken line. In the distortion diagram, aberration at the d line is indicated by a solid line. In the lateral chromatic aberration diagram, aberrations at the C line, the F line, and the g line are respectively indicated by the long broken line, the short broken line, and the chain line. In the spherical aberration diagram, a value of the F number is shown after "FNo.=". In other aberration diagrams, a value of the maximum half angle of view is shown after "ω=". The maximum half angle of view shown in the upper part of FIG. 4 corresponds to ωi, and the maximum half angle of view shown in the lower part corresponds to ωm.

Symbols, meanings, description methods, and illustration methods of the respective data pieces according to Example 1 are basically similar to those in the following examples unless otherwise specified. Therefore, in the following description, repeated description will not be given.

Example 2

Figure 5:
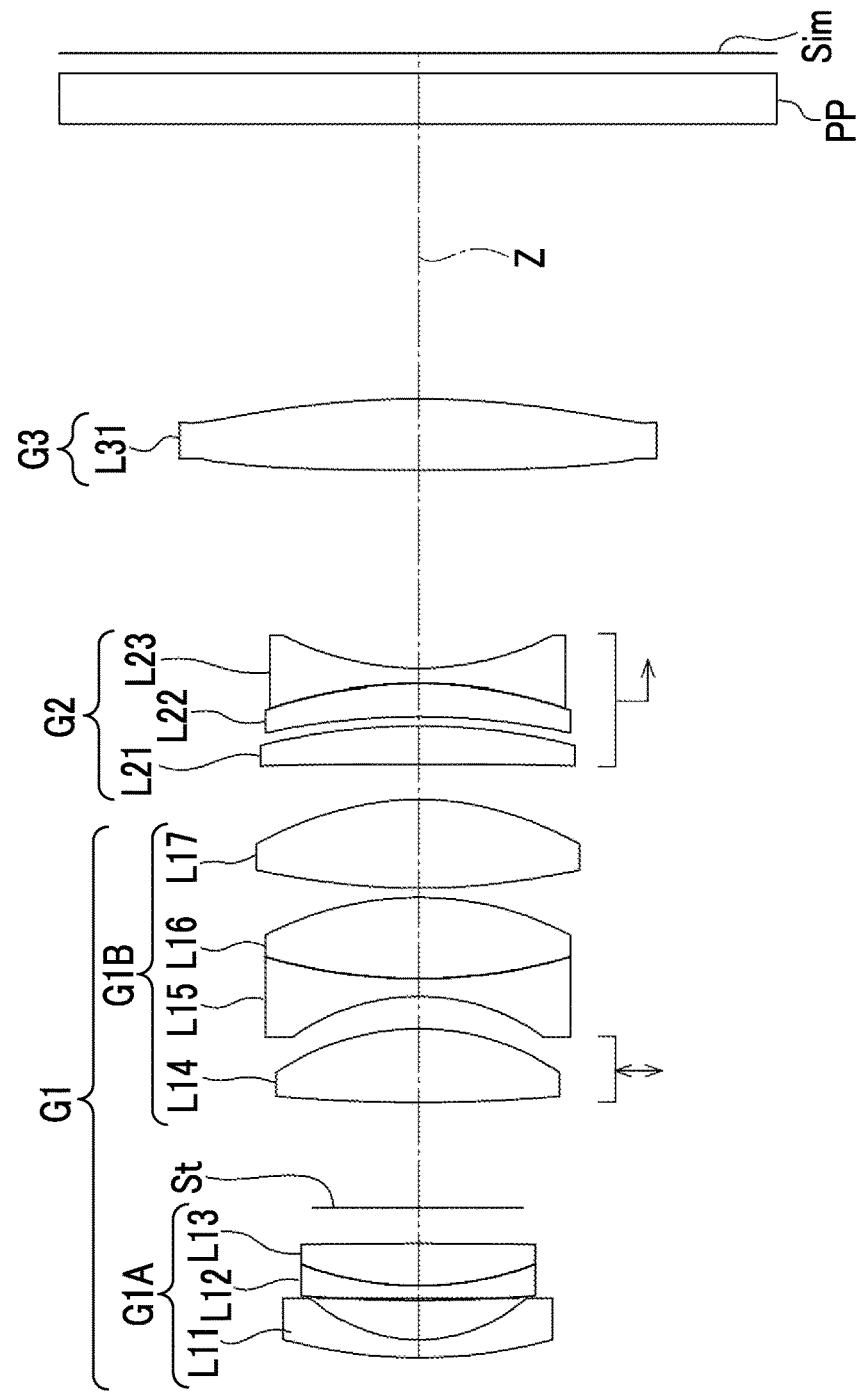
FIG. 5 is a cross-sectional view showing a configuration of an imaging lens of Example 2.

FIG. 5 is a cross-sectional view of a configuration of the imaging lens of Example 2. The imaging lens of Example 2 has the same configuration as the outline of the imaging lens of Example 1. Each group of the imaging lens of Example 2 is configured as follows. The first A group G1A consists of three lenses L11 to L13, in order from the object side to the image side. The first B group G1B consists of four lenses L14 to L17, in order from the object side to the image side. The second lens group G2 consists of three lenses L21 to L23, in order from the object side to the image side. The third lens group G3 consists of one lens L31. The imaging lens of Example 2 has a vibration-proof group consisting of a lens L14. An up-and-down arrow below the lens L14 in FIG. 5 indicates that the lens L14 is in the vibration-proof group. The method of showing the vibration-proof group is the same in the following examples.

Figure 6:
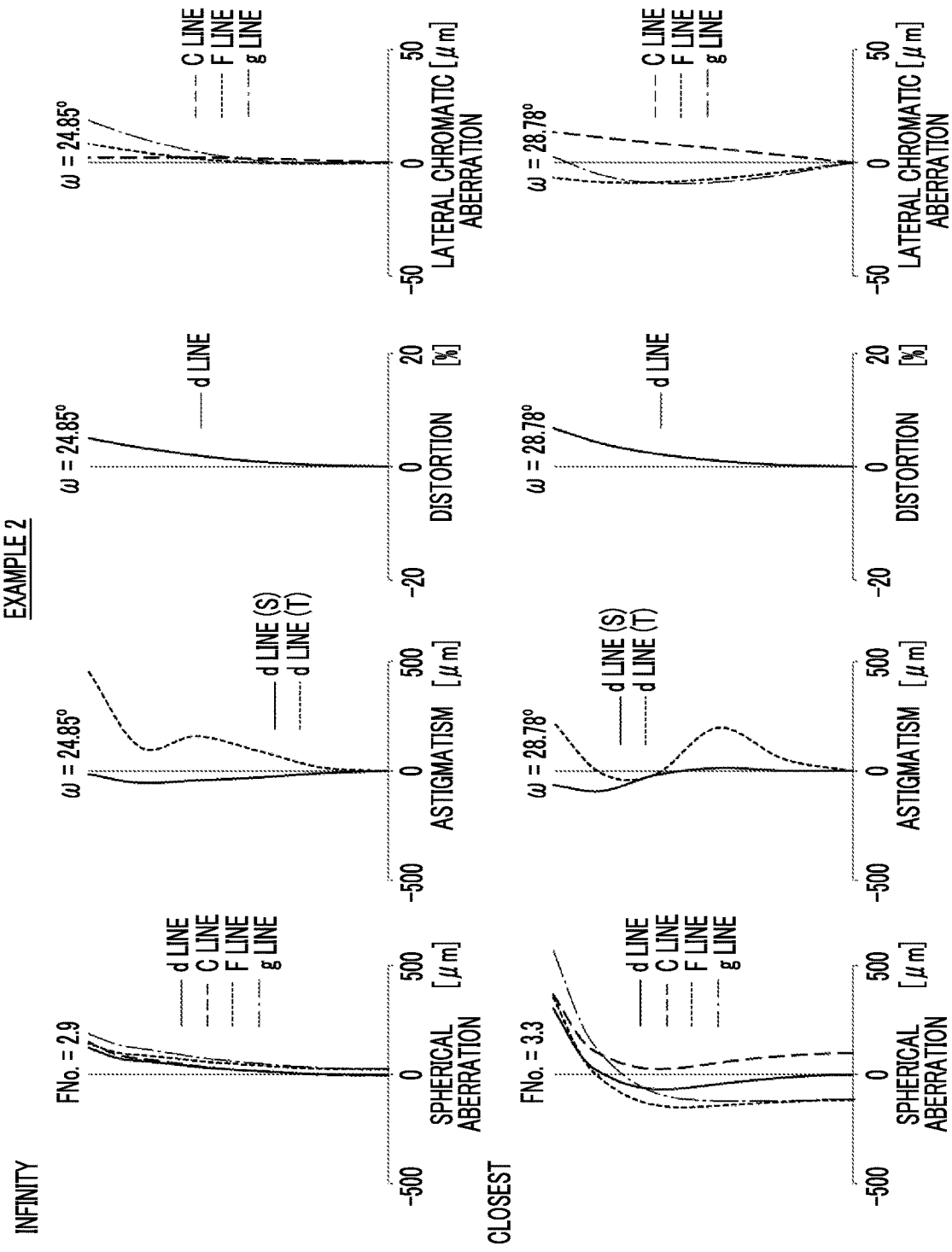
FIG. 6 is a diagram showing aberrations of the imaging lens of Example 2.

Regarding the imaging lens of Example 2, Table 4 shows basic lens data, Table 5 shows specifications and variable surface spacings, and Table 6 shows aspherical coefficients thereof. FIG. 6 shows aberration diagrams. In Example 2, the distance on the optical axis from the lens surface closest to the object side to the closest object is 18.7 millimeters (mm).

TABLE 4

Example 2

| Sn | R | D | Nd | vd | θgF | ED |
|---|---|---|---|---|---|---|
| *1 | 31.20363 | 1.000 | 1.51633 | 64.06 | 0.53345 | 13.04 |
| *2 | 8.84043 | 2.195 | | | | 11.31 |
| 3 | 76.50126 | 0.820 | 1.62041 | 60.29 | 0.54266 | 11.22 |
| 4 | 17.94823 | 2.376 | 1.75520 | 27.53 | 0.60994 | 11.43 |
| 5 | −363.84540 | 2.000 | | | | 11.53 |
| 6(St) | ∞ | 5.947 | | | | |
| 7 | 94.45673 | 4.116 | 1.49700 | 81.54 | 0.53748 | 13.75 |
| 8 | −13.94981 | 1.813 | | | | 14.09 |
| 9 | −11.84105 | 1.001 | 1.71736 | 29.50 | 0.60475 | 13.53 |
| 10 | 30.49914 | 4.542 | 1.53775 | 74.70 | 0.53936 | 15.09 |
| 11 | −18.07418 | 0.514 | | | | 15.96 |
| *12 | 35.38398 | 4.997 | 1.67686 | 54.80 | 0.54548 | 16.79 |
| *13 | −15.89755 | DD[13] | | | | 16.8 |
| 14 | −336.40992 | 2.137 | 1.98613 | 16.48 | 0.66558 | 15.64 |
| 15 | −35.56214 | 0.529 | | | | 15.48 |
| 16 | −39.65745 | 1.804 | 1.51633 | 64.14 | 0.53531 | 14.98 |
| 17 | −25.44229 | 0.850 | 1.90043 | 37.37 | 0.57720 | 14.5 |
| 18 | 16.25033 | DD[18] | | | | 14.04 |
| *19 | 249.88692 | 4.002 | 1.58313 | 59.38 | 0.54237 | 21.06 |
| *20 | −46.26702 | 15.446 | | | | 21.91 |
| 21 | ∞ | 2.850 | 1.51680 | 64.20 | 0.53430 | |
| 22 | ∞ | 1.084 | | | | |

TABLE 5

Example 2

| | Infinity | Closest |
|---|---|---|
| Focal length | 29.210 | 17.447 |
| F number | 2.9 | |
| Maximum total angle of view [°] | 49.70 | 57.56 |
| Maximum image height | 14.2 | |
| DD[13] | 2.000 | 8.984 |
| DD[18] | 11.103 | 4.119 |

TABLE 6

Example 2

| Sn | 1 | 2 | 12 | 13 |
|---|---|---|---|---|
| KA | 1.0000000E+00 | 1.0000000E+00 | 1.0000000E+00 | 1.0000000E+00 |
| A4 | 1.4788034E−04 | 1.0797830E−04 | −2.4949955E−05 | 4.4783325E−05 |
| A6 | −5.5884692E−06 | −5.2823446E−06 | 1.5179484E−07 | 1.5374227E−07 |

TABLE 6-continued

Example 2

| Sn | 1 | 2 | 12 | 13 |
|---|---|---|---|---|
| A8 | 1.4324320E−07 | 3.5459254E−08 | −1.5602022E−09 | −4.5184911E−09 |
| A10 | −2.4642472E−09 | 2.5556827E−09 | −9.5020633E−11 | 3.9887922E−11 |
| A12 | 2.1130333E−11 | −1.3952316E−10 | 2.9332264E−12 | 2.6545658E−13 |
| A14 | −5.5493747E−15 | 2.8366966E−12 | −3.2086009E−14 | −6.2628824E−15 |
| A16 | −7.8781433E−16 | −2.2421138E−14 | 1.1693595E−16 | 2.0410709E−17 |

| Sn | 19 | 20 |
|---|---|---|
| KA | 1.0000000E+00 | 1.0000000E+00 |
| A3 | 0.0000000E+00 | 0.0000000E+00 |
| A4 | 1.3694908E−05 | 1.7439327E−05 |
| A5 | 2.8271635E−07 | −3.3960117E−07 |
| A6 | −4.4295197E−08 | 8.2788177E−09 |
| A7 | 2.0878762E−09 | 4.6960385E−09 |
| A8 | 1.0686059E−10 | −4.4123357E−10 |
| A9 | −7.9030083E−12 | −2.8559426E−12 |
| A10 | −7.5046195E−13 | −4.1356693E−13 |
| A11 | 3.9948960E−14 | 8.7743730E−15 |
| A12 | −3.3936653E−15 | 5.9267939E−16 |
| A13 | 3.5686420E−17 | −1.0246854E−16 |
| A14 | 3.7528079E−17 | 3.9021976E−17 |
| A15 | −6.3644724E−18 | 1.7136237E−18 |
| A16 | 4.3606782E−20 | −3.5264233E−19 |
| A17 | 1.3240476E−20 | −1.5258323E−20 |
| A18 | 2.8268675E−21 | −6.5241468E−22 |
| A19 | 3.2062063E−23 | 2.2996167E−22 |
| A20 | −9.4954975E−25 | 6.0848408E−24 |

Example 3

Figure 7:
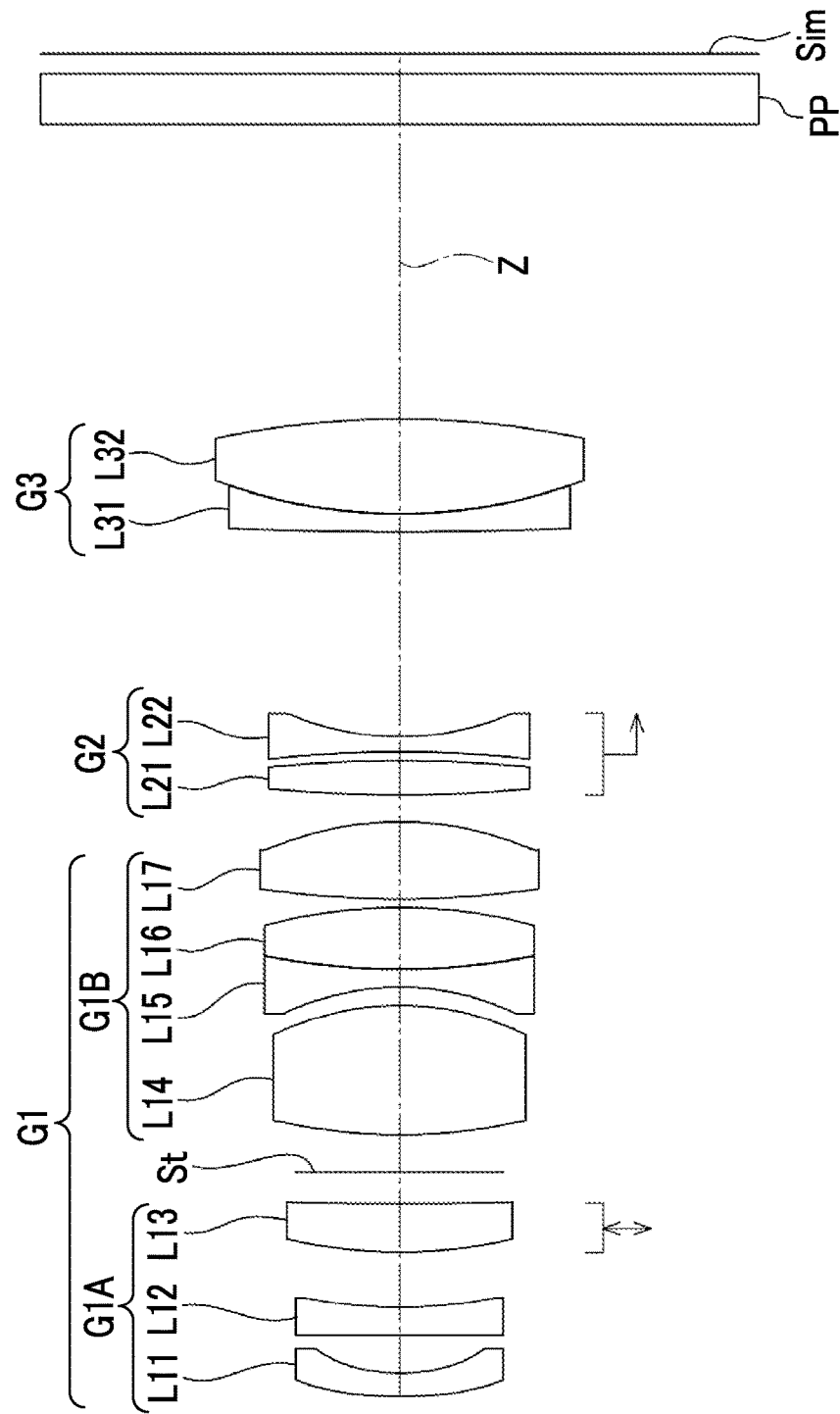
FIG. 7 is a cross-sectional view showing a configuration of an imaging lens of Example 3.

FIG. 7 is a cross-sectional view of a configuration of the imaging lens of Example 3. The imaging lens of Example 3 has the same configuration as the outline of the imaging lens of Example 1 except that the third lens group G3 has a negative refractive power. Each group of the imaging lens of Example 3 is configured as follows. The first A group G1A consists of three lenses L11 to L13, in order from the object side to the image side. The first B group G1B consists of four lenses L14 to L17, in order from the object side to the image side. The second lens group G2 consists of two lenses L21 and L22, in order from the object side to the image side. The third lens group G3 consists of two lenses L31 and L32, in order from the object side to the image side. The imaging lens of Example 3 has a vibration-proof group consisting of a lens L13.

Figure 8:
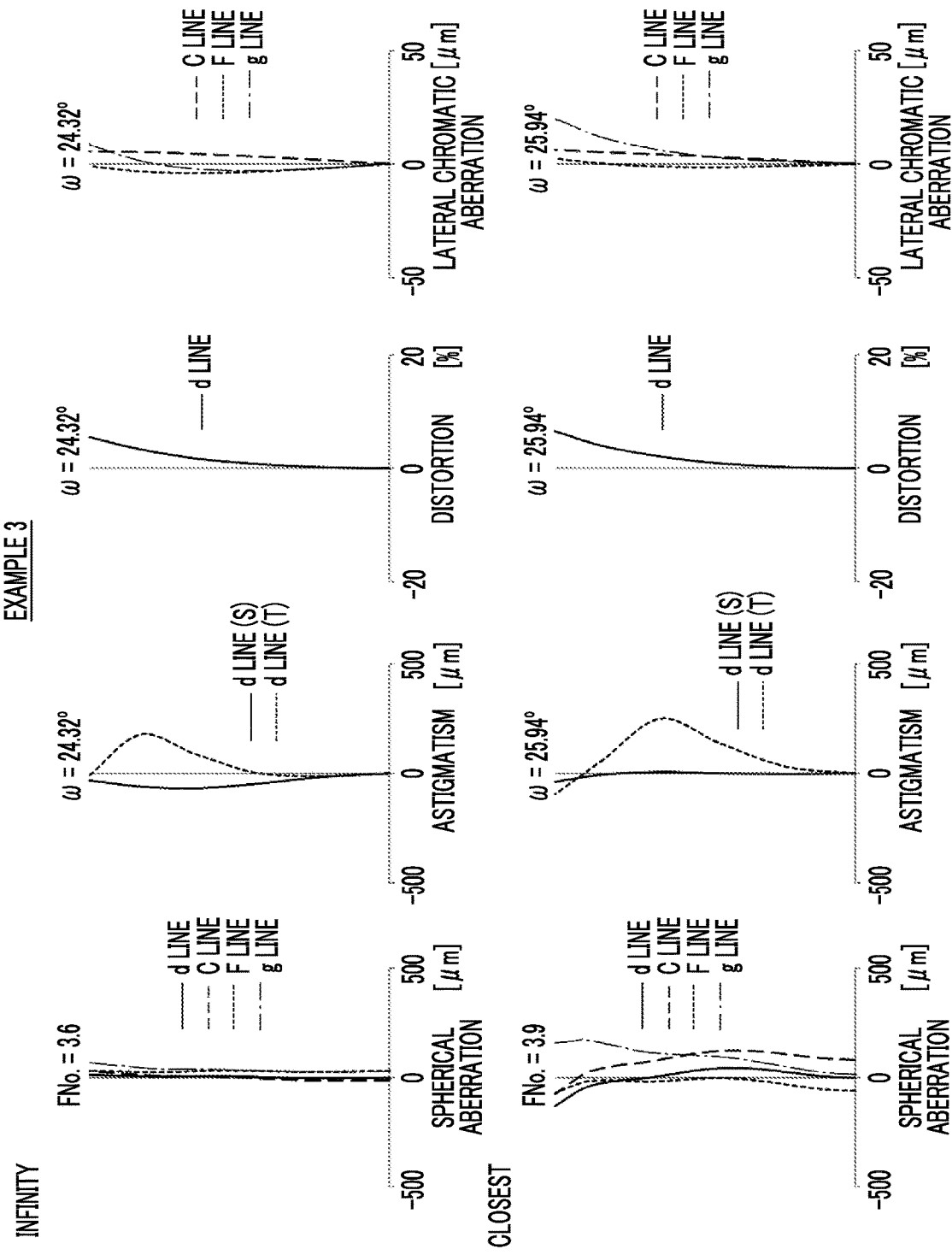
FIG. 8 is a diagram showing aberrations of the imaging lens of Example 3.

Regarding the imaging lens of Example 3, Table 7 shows basic lens data, Table 8 shows specifications and variable surface spacings, and Table 9 shows aspherical coefficients thereof. FIG. 8 shows aberration diagrams. In Example 3, the distance on the optical axis from the lens surface closest to the object side to the closest object is 18.8 mm (millimeter).

TABLE 7

Example 3

| Sn | R | D | Nd | vd | θgF | ED |
|---|---|---|---|---|---|---|
| *1 | 32.31333 | 1.300 | 1.58313 | 59.38 | 0.54237 | 10.42 |
| *2 | 10.98845 | 2.123 | | | | 8.94 |
| 3 | 1446.75612 | 1.573 | 1.74001 | 28.29 | 0.60853 | 8.4 |
| 4 | 25.83735 | 3.123 | | | | 8.78 |
| 5 | 27.58823 | 2.698 | 1.95906 | 17.47 | 0.65862 | 10.95 |
| 6 | 259.84895 | 1.737 | | | | 11.18 |
| 7(St) | ∞ | 2.125 | | | | |
| 8 | 30.62209 | 7.253 | 1.49700 | 81.54 | 0.53748 | 12.38 |
| 9 | −15.40905 | 1.030 | | | | 12.6 |
| 10 | −14.65057 | 1.000 | 1.80809 | 22.76 | 0.62868 | 12.18 |
| 11 | 37.31710 | 3.460 | 1.49700 | 81.54 | 0.53748 | 12.76 |
| 12 | −28.14856 | 0.455 | | | | 13.46 |
| *13 | 46.26840 | 4.343 | 1.80610 | 40.73 | 0.56940 | 13.92 |
| *14 | −17.13374 | DD[14] | | | | 14 |
| 15 | 76.39380 | 1.904 | 1.95906 | 17.47 | 0.65862 | 13.26 |
| 16 | −74.86224 | 0.516 | | | | 13.05 |
| *17 | −61.33297 | 0.850 | 1.80610 | 40.73 | 0.56940 | 12.82 |
| *18 | 15.39607 | DD[18] | | | | 12.4 |
| 19 | 248.85615 | 1.000 | 1.95375 | 32.32 | 0.59015 | 16.93 |
| 20 | 28.88661 | 5.338 | 1.51742 | 52.19 | 0.55915 | 17.34 |
| 21 | −49.34714 | 16.521 | | | | 18.72 |
| 22 | ∞ | 2.850 | 1.51680 | 64.20 | 0.53430 | |
| 23 | ∞ | 1.087 | | | | |

TABLE 8

Example 3

| | Infinity | Closest |
|---|---|---|
| Focal length | 29.787 | 17.383 |
| F number | 3.6 | |
| Maximum total angle of view [°] | 48.64 | 51.88 |
| Maximum image height | 14.2 | |
| DD[14] | 1.500 | 9.667 |
| DD[18] | 11.429 | 3.262 |

TABLE 9

Example 3

| Sn | 1 | 2 | 13 | 14 |
|---|---|---|---|---|
| KA | 1.0000000E+00 | 1.0000000E+00 | 1.0000000E+00 | 1.0000000E+00 |
| A4 | 5.9751485E−04 | 7.2000969E−04 | −2.6231150E−05 | 4.0911450E−05 |
| A6 | −1.0132173E−05 | −5.3026237E−06 | 1.7993733E−07 | −2.9243019E−08 |
| A8 | 1.0671768E−07 | −1.0814026E−07 | −2.1752522E−09 | 2.8850724E−09 |
| A10 | 6.5801815E−10 | 4.9168577E−09 | −1.6140850E−12 | −7.3435262E−11 |
| A12 | −1.2659866E−11 | −1.0928645E−11 | −5.1593250E−13 | 4.8639212E−13 |

TABLE 9-continued

Example 3

| Sn | 1 | 2 | 13 | 14 |
|---|---|---|---|---|
| A14 | −9.1519347E−13 | 1.4171842E−12 | 1.8603577E−14 | 1.6795208E−15 |
| A16 | 2.2157934E−14 | −8.5045392E−15 | −1.3849944E−16 | −5.9865271E−18 |

| Sn | 17 | 18 |
|---|---|---|
| KA | 1.0000000E+00 | 1.0000000E+00 |
| A3 | 0.0000000E+00 | 0.0000000E+00 |
| A4 | 1.0977707E−05 | 9.2096840E−06 |
| A5 | −1.1315562E−07 | 1.0061401E−06 |
| A6 | −8.8793017E−08 | −6.5718822E−08 |
| A7 | −5.3686643E−09 | −6.0523136E−09 |
| A8 | 3.9823449E−10 | −7.2201180E−10 |
| A9 | −6.2137577E−10 | −1.3662102E−10 |
| A10 | 1.9263992E−10 | −6.1433104E−11 |
| A11 | −2.8962070E−11 | −5.5117273E−12 |
| A12 | 1.8105401E−13 | −5.6187834E−13 |
| A13 | 6.1814263E−14 | −7.9635707E−14 |
| A14 | 4.0679142E−14 | 7.0219332E−15 |
| A15 | −4.5581678E−15 | 1.8155451E−15 |
| A16 | −3.0725995E−16 | 7.8363992E−16 |
| A17 | −5.0613008E−17 | 3.5554626E−16 |
| A18 | 5.6534708E−17 | 3.8921617E−17 |
| A19 | −3.5207258E−18 | −1.0664261E−17 |
| A20 | −2.7512125E−19 | −4.0407211E−19 |

Example 4

Figure 9:
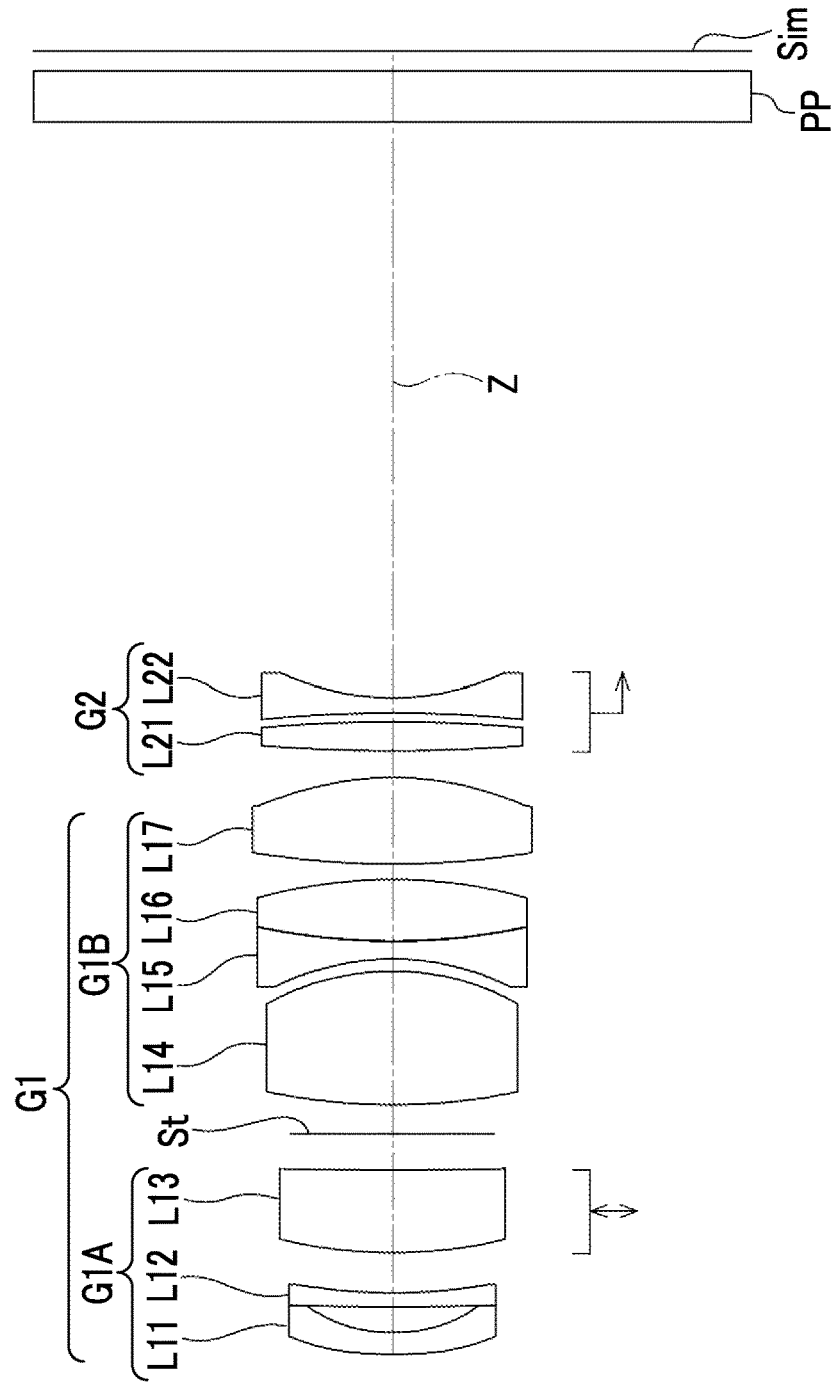
FIG. 9 is a cross-sectional view showing a configuration of an imaging lens of Example 4.

FIG. 9 is a cross-sectional view of a configuration of the imaging lens of Example 4. The imaging lens of Example 4 has the same configuration as the outline of the imaging lens of Example 1 except that the imaging lens consists of a first lens group G1 that has a positive refractive power and a second lens group G2 that has a negative refractive power in order from the object side to the image side. Each group of the imaging lens of Example 4 is configured as follows. The first A group G1A consists of three lenses L11 to L13, in order from the object side to the image side. The first B group G1B consists of four lenses L14 to L17, in order from the object side to the image side. The second lens group G2 consists of two lenses L21 and L22, in order from the object side to the image side. The imaging lens of Example 4 has a vibration-proof group consisting of a lens L13.

Figure 10:
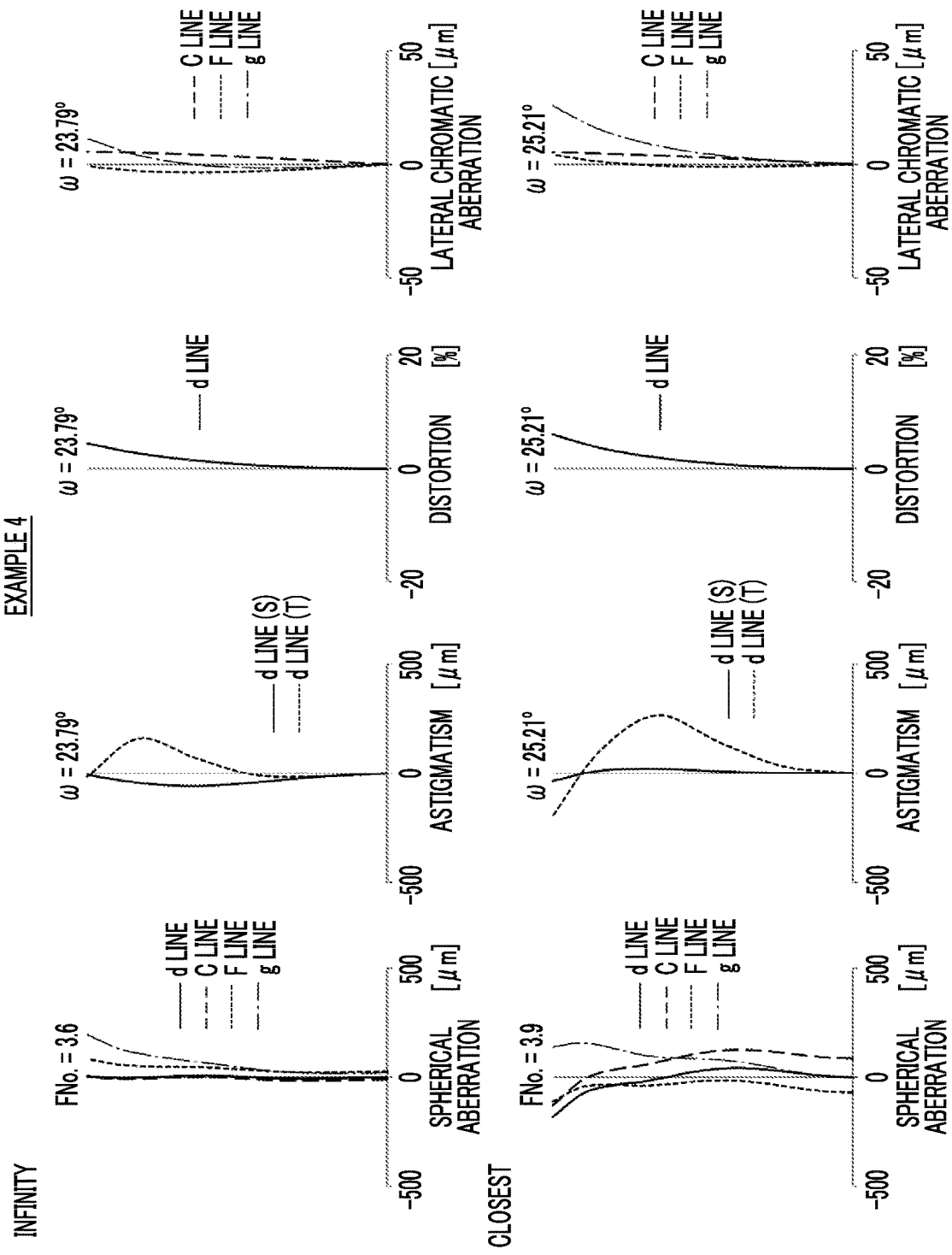
FIG. 10 is a diagram showing aberrations of the imaging lens of Example 4.

Regarding the imaging lens of Example 4, Table 10 shows basic lens data, Table 11 shows specifications and variable surface spacings, and Table 12 shows aspherical coefficients thereof. FIG. 10 shows aberration diagrams. In Example 4, the distance on the optical axis from the lens surface closest to the object side to the closest object is 21.3 millimeters (mm).

TABLE 10

Example 4

| Sn | R | D | Nd | vd | θgF | ED |
|---|---|---|---|---|---|---|
| *1 | 27.48558 | 1.220 | 1.58313 | 59.38 | 0.54237 | 9.95 |
| *2 | 10.15267 | 1.429 | | | | 8.58 |
| 3 | 184.53951 | 0.810 | 1.95375 | 32.32 | 0.59015 | 8.4 |
| 4 | 29.40389 | 2.246 | | | | 8.58 |
| 5 | 25.86823 | 4.614 | 1.95906 | 17.47 | 0.65862 | 10.23 |
| 6 | 225.71336 | 2.055 | | | | 10.72 |
| 7(St) | ∞ | 1.621 | | | | |
| 8 | 33.80869 | 7.500 | 1.49700 | 81.54 | 0.53748 | 11.94 |
| 9 | −14.14553 | 0.672 | | | | 12.39 |
| 10 | −14.49127 | 1.000 | 1.80809 | 22.76 | 0.62868 | 12.09 |
| 11 | 35.16723 | 3.460 | 1.49700 | 81.54 | 0.53748 | 12.7 |
| 12 | −27.30050 | 0.849 | | | | 13.39 |
| *13 | 42.33634 | 4.838 | 1.80610 | 40.73 | 0.56940 | 13.95 |
| *14 | −17.05218 | DD[14] | | | | 14 |
| 15 | 90.99998 | 1.619 | 1.95906 | 17.47 | 0.65862 | 13.2 |
| 16 | −79.92672 | 0.512 | | | | 13.04 |
| *17 | −73.86990 | 0.850 | 1.80610 | 40.73 | 0.56940 | 12.81 |
| *18 | 14.95017 | DD[18] | | | | 12.4 |
| 19 | ∞ | 2.850 | 1.51680 | 64.20 | 0.53430 | |
| 20 | ∞ | 1.095 | | | | |

TABLE 11

Example 4

| | Infinity | Closest |
|---|---|---|
| Focal length | 30.846 | 17.662 |
| F number | 3.6 | |
| Maximum total angle of view [°] | 47.58 | 50.42 |
| Maximum image height | 14.2 | |
| DD[14] | 1.500 | 9.092 |
| DD[18] | 32.230 | 24.638 |

TABLE 12

Example 4

| Sn | 1 | 2 | 13 | 14 |
|---|---|---|---|---|
| KA | 1.0000000E+00 | 1.0000000E+00 | 1.0000000E+00 | 1.0000000E+00 |
| A4 | 6.0854202E−04 | 7.2796878E−04 | −2.6000323E−05 | 4.1680440E−05 |
| A6 | −1.0352729E−05 | −5.0623487E−06 | 2.0272118E−07 | −3.3537298E−08 |
| A8 | 1.0392103E−07 | −1.1743890E−07 | −2.6722530E−09 | 3.1500249E−09 |
| A10 | 7.7451300E−10 | 4.4114491E−09 | 3.0845712E−12 | −8.1633195E−11 |
| A12 | −1.4189941E−11 | −9.7654559E−11 | −6.3261887E−13 | 5.3989425E−13 |
| A14 | −8.6834910E−13 | 1.0875360E−11 | 2.0777713E−14 | 1.7921256E−15 |
| A16 | 2.0065945E−14 | −2.3698148E−13 | −1.4830036E−16 | −3.4267169E−18 |

| Sn | 17 | 18 |
|---|---|---|
| KA | 1.0000000E+00 | 1.0000000E+00 |
| A3 | 0.0000000E+00 | 0.0000000E+00 |
| A4 | 1.0997974E−05 | 8.6642618E−06 |
| A5 | −1.5978941E−07 | 9.5935660E−07 |
| A6 | −9.0914574E−08 | −5.7936080E−08 |
| A7 | −6.6929895E−09 | −8.2467127E−09 |
| A8 | 4.9982165E−10 | −4.6271758E−10 |
| A9 | −6.6743409E−10 | −9.0298485E−11 |
| A10 | 1.9850360E−10 | −6.4503441E−11 |
| A11 | −2.7320203E−11 | −5.2438361E−12 |
| A12 | 1.4098130E−13 | −6.7176783E−13 |
| A13 | 1.0574036E−13 | −7.0657278E−14 |
| A14 | 3.2846175E−14 | 2.5785519E−15 |
| A15 | −4.1184101E−15 | 8.7972245E−16 |
| A16 | −4.9817834E−16 | 7.8269854E−16 |
| A17 | −7.3092979E−17 | 3.7539496E−16 |
| A18 | 5.7873443E−17 | 4.0005258E−17 |
| A19 | −2.8923142E−18 | −1.0675550E−17 |
| A20 | −3.1104734E−19 | −4.5991435E−19 |

Example 5

Figure 11:
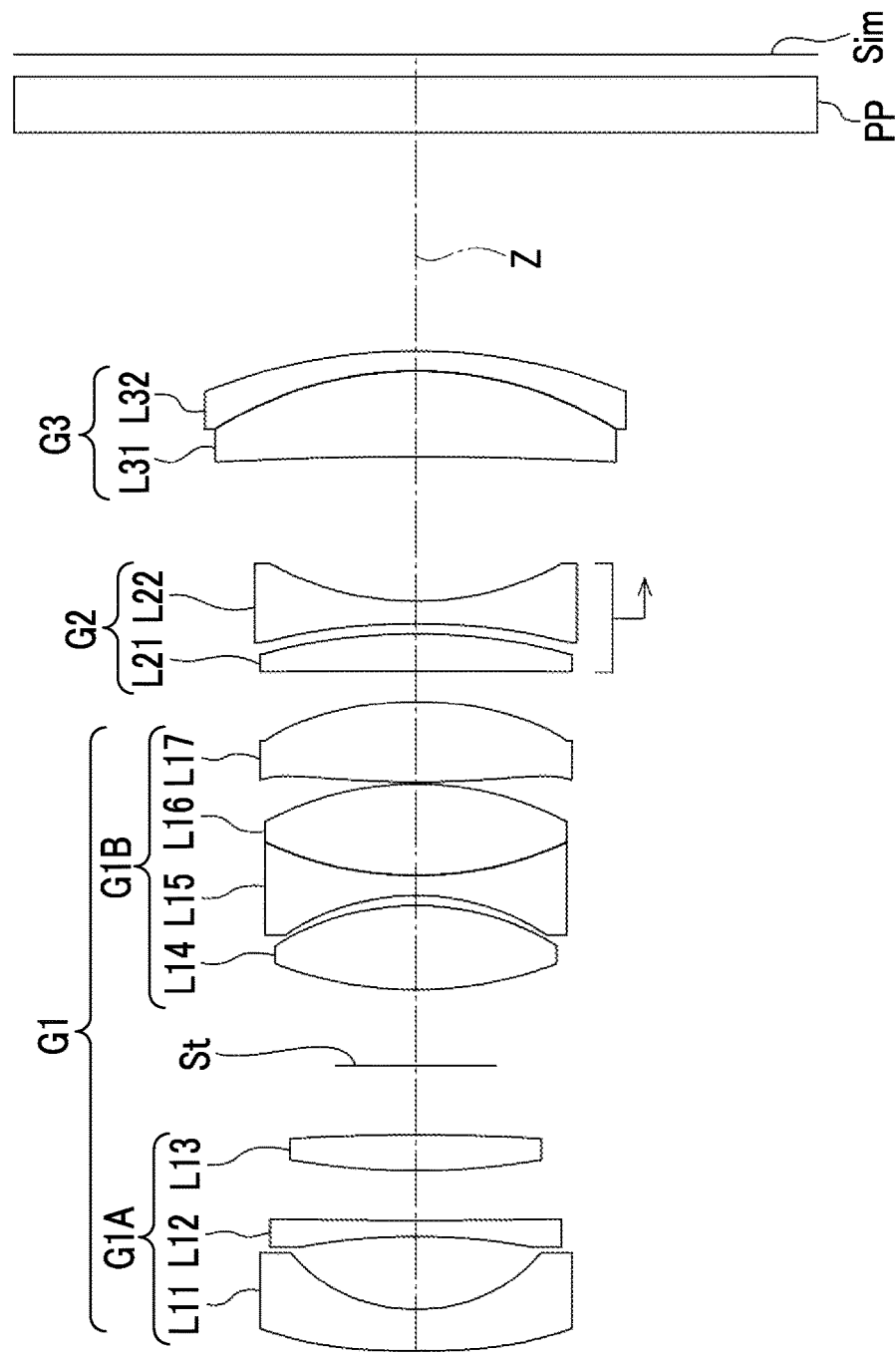
FIG. 11 is a cross-sectional view showing a configuration of an imaging lens of Example 5.

FIG. 11 is a cross-sectional view of a configuration of the imaging lens of Example 5. The imaging lens of Example 5 has the same configuration as the outline of the imaging lens of Example 1. Each group of the imaging lens of Example 5 is configured as follows. The first A group G1A consists of three lenses L11 to L13, in order from the object side to the image side. The first B group G1B consists of four lenses L14 to L17, in order from the object side to the image side. The second lens group G2 consists of two lenses L21 and L22, in order from the object side to the image side. The third lens group G3 consists of two lenses L31 and L32, in order from the object side to the image side.

Figure 12:
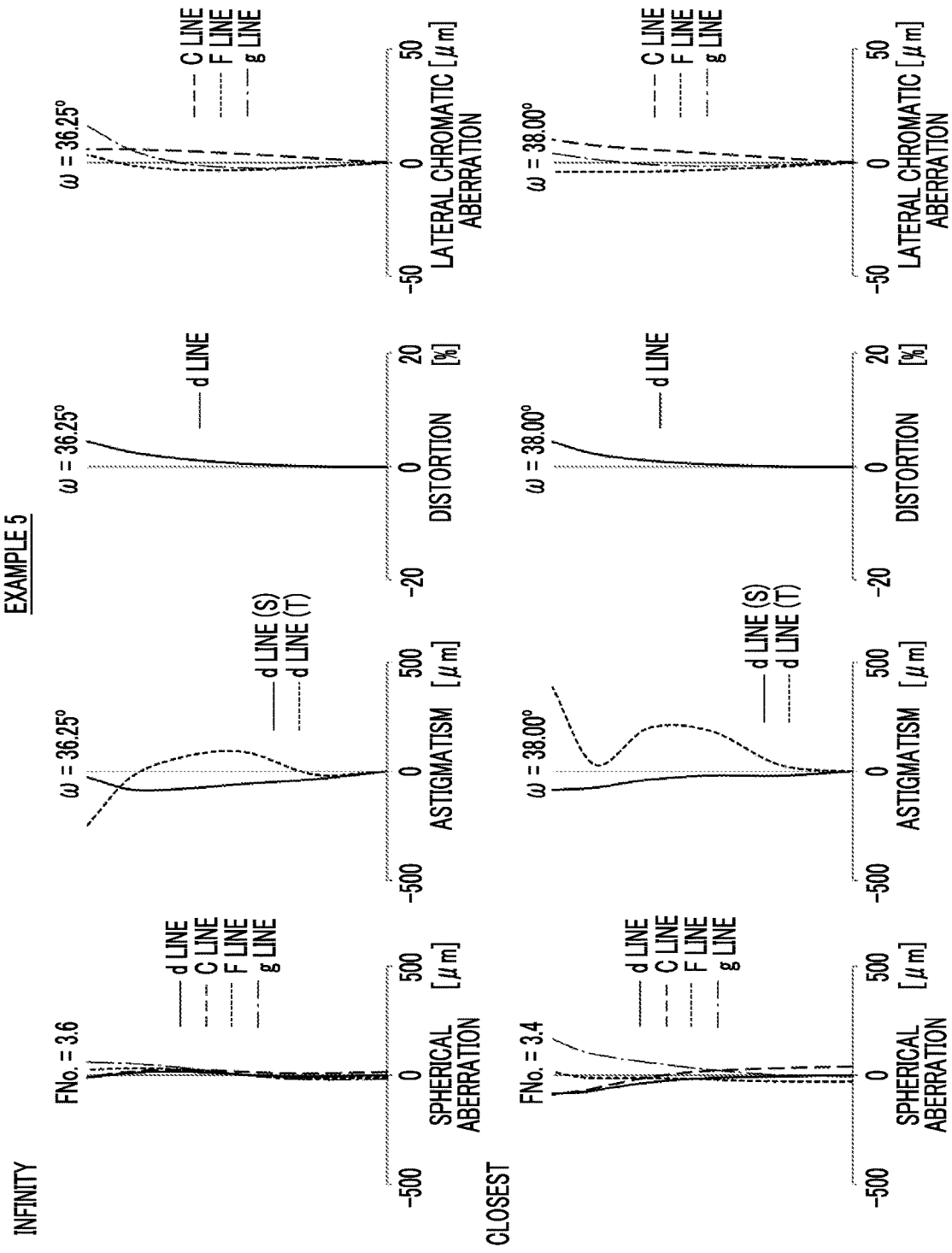
FIG. 12 is a diagram showing aberrations of the imaging lens of Example 5.

Regarding the imaging lens of Example 5, Table 13 shows basic lens data, Table 14 shows specifications and variable surface spacings, and Table 15 shows aspherical coefficients thereof. FIG. 12 shows aberration diagrams. In Example 5, the distance on the optical axis from the lens surface closest to the object side to the closest object is 26.6 millimeters (mm).

TABLE 13

Example 5

| Sn | R | D | Nd | vd | θgF | ED |
|---|---|---|---|---|---|---|
| *1 | 57.36022 | 2.085 | 1.58313 | 59.38 | 0.54237 | 15.5 |
| *2 | 9.25197 | 3.669 | | | | 11.88 |
| 3 | −31.59484 | 0.810 | 1.56888 | 62.96 | 0.53766 | 11.58 |
| 4 | 537.92734 | 2.488 | | | | 11.36 |

TABLE 13-continued

Example 5

| Sn | R | D | Nd | vd | θgF | ED |
|---|---|---|---|---|---|---|
| 5 | 35.16951 | 1.796 | 1.96300 | 24.11 | 0.62126 | 10.66 |
| 6 | −111.05530 | 3.475 | | | | 10.31 |
| 7(St) | ∞ | 3.814 | | | | |
| 8 | 19.51556 | 4.204 | 1.51633 | 64.14 | 0.53531 | 10.06 |
| 9 | −13.21528 | 0.500 | | | | 10.38 |
| 10 | −11.67052 | 1.000 | 1.85000 | 27.03 | 0.60935 | 10.29 |
| 11 | 17.61845 | 4.578 | 1.49700 | 81.54 | 0.53748 | 11.28 |
| 12 | −15.80445 | 0.100 | | | | 12.64 |
| *13 | 44.51838 | 4.048 | 1.80610 | 40.73 | 0.56940 | 13.41 |
| *14 | −16.61682 | DD[14] | | | | 14 |
| 15 | −634.97462 | 1.864 | 1.98613 | 16.48 | 0.66558 | 13.93 |
| 16 | −29.41640 | 0.500 | | | | 13.93 |
| *17 | −35.53399 | 1.127 | 1.80610 | 40.73 | 0.56940 | 13.63 |
| *18 | 14.76980 | DD[18] | | | | 13.46 |
| 19 | −191.61712 | 4.325 | 1.49700 | 81.54 | 0.53748 | 17.19 |
| 20 | −18.47225 | 1.000 | 1.98613 | 16.48 | 0.66558 | 18.26 |
| 21 | −28.18261 | 10.931 | | | | 19.37 |
| 22 | ∞ | 2.850 | 1.51680 | 64.20 | 0.53430 | |
| 23 | ∞ | 1.100 | | | | |

TABLE 14

Example 5

| | Infinity | Closest |
|---|---|---|
| Focal length | 18.546 | 14.734 |
| F number | 3.6 | |
| Maximum total angle of view [°] | 72.50 | 76.00 |
| Maximum image height | 14.2 | |
| DD[14] | 1.500 | 5.047 |
| DD[18] | 7.214 | 3.667 |

TABLE 15

Example 5

| Sn | 1 | 2 | 13 | 14 |
|---|---|---|---|---|
| KA | 1.0000000E+00 | 1.0000000E+00 | 1.0000000E+00 | 1.0000000E+00 |
| A4 | 3.9544681E−04 | 4.8934960E−04 | −7.0986494E−05 | 1.7879423E−06 |
| A6 | −9.2654555E−06 | −8.8510431E−06 | −2.7591792E−07 | −4.9857969E−07 |
| A8 | 1.7592619E−07 | 2.7708674E−08 | −3.3583786E−09 | 3.9476877E−09 |
| A10 | −2.2024740E−09 | 6.0815122E−09 | −1.2020311E−10 | −3.6346674E−10 |
| A12 | 1.5320800E−11 | −1.6321256E−10 | −5.6545202E−13 | 7.6186077E−12 |
| A14 | −3.6137738E−14 | 1.4593720E−12 | 1.8204328E−14 | −1.1614156E−13 |
| A16 | −8.6045621E−17 | −8.7845997E−16 | −8.7032799E−16 | 3.6599854E−16 |

| Sn | 17 | 18 |
|---|---|---|
| KA | 1.0000000E+00 | 1.0000000E+00 |
| A3 | 0.0000000E+00 | 0.0000000E+00 |
| A4 | −2.9889273E−05 | −2.9558928E−05 |
| A5 | −4.1423837E−06 | 1.2884952E−05 |
| A6 | 8.3705208E−07 | −2.4143702E−06 |
| A7 | 2.9406761E−08 | 9.1245793E−08 |
| A8 | −1.9545191E−08 | 6.8360640E−09 |
| A9 | −2.7305015E−10 | 4.3848372E−10 |
| A10 | 7.1340952E−11 | 1.4327101E−11 |
| A11 | 1.5362577E−11 | −2.5892224E−11 |
| A12 | 1.1329865E−12 | −9.9038189E−13 |

-continued

| Sn | 17 | 18 |
|---|---|---|
| A13 | 4.4955673E−13 | 6.7974942E−13 |
| A14 | −1.3958743E−14 | 1.3686358E−14 |
| A15 | −6.1242045E−15 | −1.1092248E−14 |
| A16 | −4.0735887E−16 | 5.1274988E−16 |
| A17 | −2.6127285E−16 | −2.8194732E−16 |
| A18 | −6.2379410E−18 | 4.7831370E−17 |
| A19 | 5.5874907E−18 | −7.2644707E−18 |
| A20 | 4.4827051E−20 | 8.3868222E−19 |

Example 6

Figure 13:
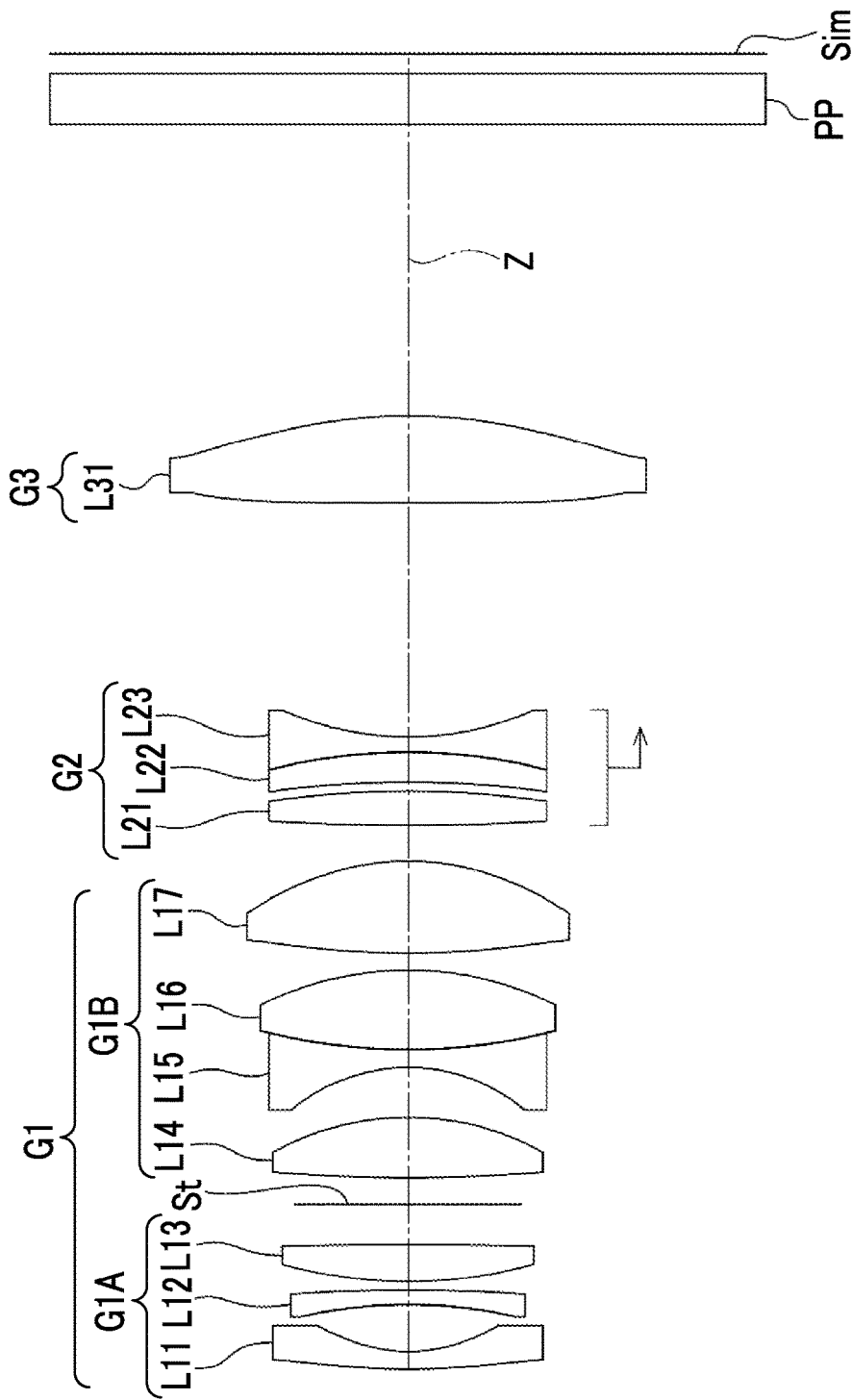
FIG. 13 is a cross-sectional view showing a configuration of an imaging lens of Example 6.

FIG. 13 is a cross-sectional view of a configuration of the imaging lens of Example 6. The imaging lens according to Example 6 has the same configuration as the outline of the imaging lens according to Example 1. Each group of the imaging lens of Example 6 is configured as follows. The first A group G1A consists of three lenses L11 to L13, in order from the object side to the image side. The first B group G1B consists of four lenses L14 to L17, in order from the object side to the image side. The second lens group G2 consists of three lenses L21 to L23, in order from the object side to the image side. The third lens group G3 consists of one lens L31.

Figure 14:
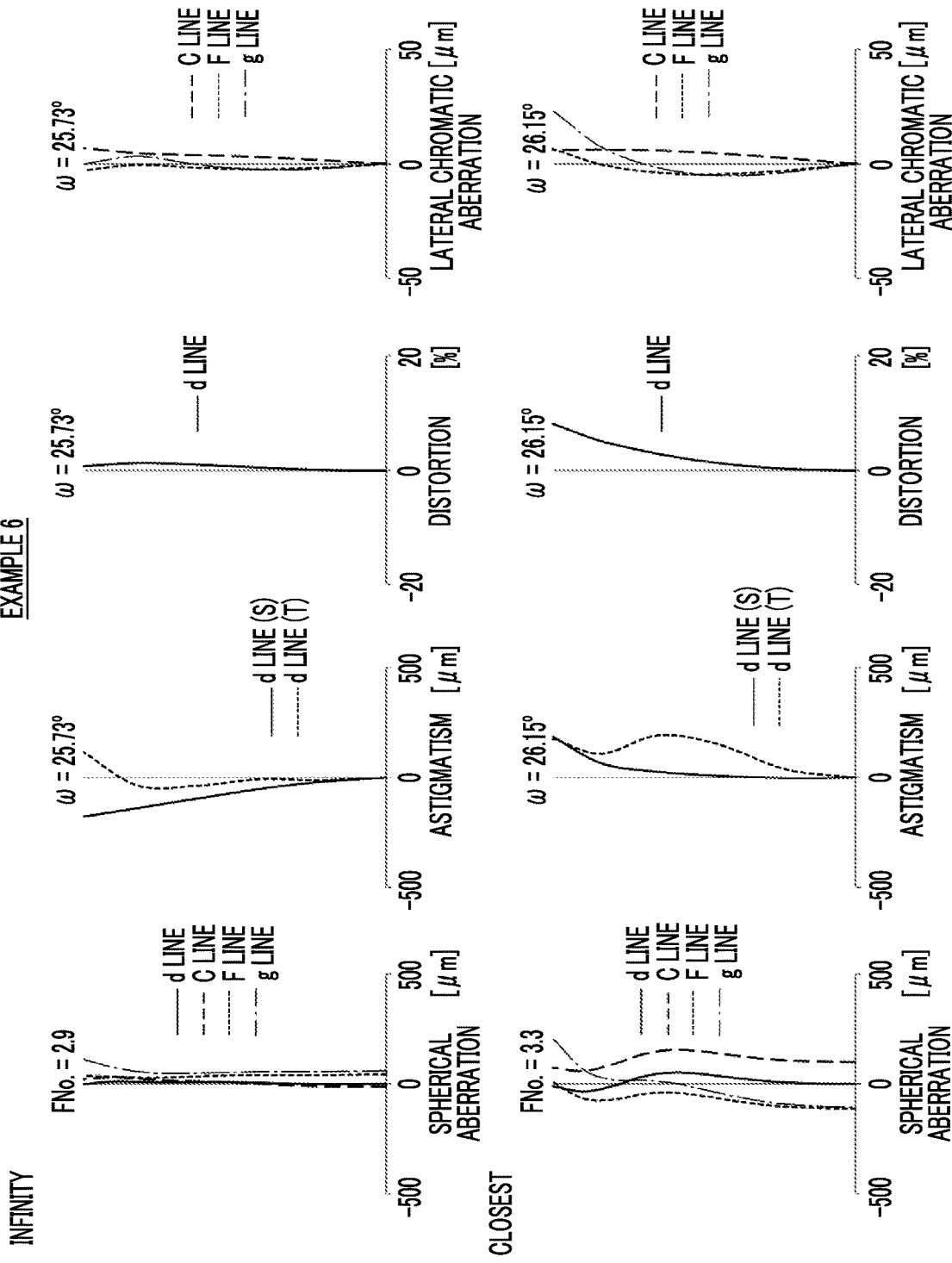
FIG. 14 is a diagram showing aberrations of the imaging lens of Example 6.

Regarding the imaging lens of Example 6, Table 16 shows basic lens data, Table 17 shows specifications and variable surface spacings, and Table 18 shows aspherical coefficients thereof. FIG. 14 shows aberration diagrams. In Example 6, the distance on the optical axis from the lens surface closest to the object side to the closest object is 20.9 millimeters (mm).

TABLE 16

Example 6

| Sn | R | D | Nd | vd | θgF | ED |
|---|---|---|---|---|---|---|
| *1 | 41.65563 | 1.000 | 1.51633 | 64.06 | 0.53345 | 11.42 |
| *2 | 8.94853 | 2.633 | | | | 10 |
| 3 | −25.65871 | 0.810 | 1.56888 | 62.96 | 0.53766 | 10.38 |
| 4 | −95.23897 | 0.500 | | | | 10.99 |
| 5 | 25.62963 | 2.092 | 1.96300 | 24.11 | 0.62126 | 12.04 |
| 6 | −262.05142 | 2.260 | | | | 12.19 |
| 7(St) | ∞ | 1.500 | | | | |
| 8 | 91.28771 | 3.395 | 1.49700 | 81.54 | 0.53748 | 12.89 |
| 9 | −15.15289 | 2.789 | | | | 13 |
| 10 | −10.00099 | 1.000 | 1.76182 | 26.52 | 0.61361 | 12.16 |
| 11 | 32.25006 | 4.496 | 1.53775 | 74.70 | 0.53936 | 13.86 |
| 12 | −18.10424 | 0.955 | | | | 15.1 |
| *13 | 43.48898 | 5.168 | 1.69350 | 53.18 | 0.54831 | 16.51 |

TABLE 16-continued

Example 6

| Sn | R | D | Nd | vd | θgF | ED |
|---|---|---|---|---|---|---|
| *14 | −13.99085 | DD[14] | | | | 16.8 |
| 15 | 116.56839 | 1.941 | 1.98613 | 16.48 | 0.66558 | 14 |
| 16 | −51.78595 | 0.501 | | | | 13.92 |
| 17 | −55.99320 | 1.688 | 1.53172 | 48.85 | 0.56700 | 13.69 |
| 18 | −30.04819 | 0.850 | 1.95375 | 32.32 | 0.59015 | 13.46 |
| 19 | 16.59192 | DD[19] | | | | 13.35 |
| *20 | −1096.52108 | 4.922 | 1.58313 | 59.38 | 0.54237 | 23.29 |
| *21 | −27.93668 | 16.409 | | | | 24.03 |
| 22 | ∞ | 2.850 | 1.51680 | 64.20 | 0.53430 | |
| 23 | ∞ | 1.078 | | | | |

TABLE 17

Example 6

| | Infinity | Closest |
|---|---|---|
| Focal length | 29.251 | 19.031 |
| F number | 2.9 | |
| Maximum total angle of view [°] | 51.46 | 52.30 |
| Maximum image height | 14.2 | |
| DD[14] | 2.000 | 10.929 |
| DD[19] | 13.130 | 4.201 |

TABLE 18

Example 6

| Sn | 1 | 2 | 13 | 14 |
|---|---|---|---|---|
| KA | 1.0000000E+00 | 1.0000000E+00 | 1.0000000E+00 | 1.0000000E+00 |
| A4 | 3.5721666E−05 | −2.3772998E−05 | −2.7424663E−05 | 5.1745374E−05 |
| A6 | −4.4782599E−06 | −5.4614146E−06 | −6.1746262E−08 | −2.4984173E−08 |
| A8 | 5.8683211E−08 | −4.3860468E−08 | 2.9791638E−09 | 2.1310461E−09 |
| A10 | 2.6091019E−09 | 1.0885434E−08 | −5.7675988E−11 | −4.1659350E−11 |
| A12 | −1.1767180E−10 | −4.3971042E−10 | 5.0174857E−14 | 2.4840486E−13 |
| A14 | 1.6295880E−12 | 7.2655228E−12 | 8.6868361E−15 | 3.3050971E−15 |
| A16 | −6.9679115E−15 | −4.4889624E−14 | −6.9305614E−17 | −3.6176482E−17 |

| Sn | 20 | 21 |
|---|---|---|
| KA | 1.0000000E+00 | 1.0000000E+00 |
| A3 | 0.0000000E+00 | 0.0000000E+00 |
| A4 | 2.0455267E−05 | 1.3026990E−05 |
| A5 | 5.3107426E−07 | 2.1150546E−06 |
| A6 | 7.8950982E−08 | −8.5152482E−08 |
| A7 | −8.5116085E−09 | −1.1211141E−08 |
| A8 | 2.8338325E−10 | 8.7783067E−10 |
| A9 | 1.4660928E−11 | 3.2300887E−11 |
| A10 | −6.0191945E−13 | 1.3058032E−12 |
| A11 | −6.3063602E−14 | −1.8476174E−13 |
| A12 | 3.7470555E−15 | −1.0328949E−14 |
| A13 | −4.1136064E−16 | −1.6089639E−15 |
| A14 | −1.2186689E−16 | −2.2880847E−17 |
| A15 | −3.3380469E−18 | −2.3576898E−18 |
| A16 | 1.3120292E−19 | 8.5041800E−19 |
| A17 | 3.4609237E−20 | 1.1330521E−20 |
| A18 | 6.4513986E−21 | 1.5810451E−21 |
| A19 | 7.7468012E−22 | 2.0677800E−22 |
| A20 | −7.5394013E−23 | −1.8348151E−23 |

Example 7

Figure 15:
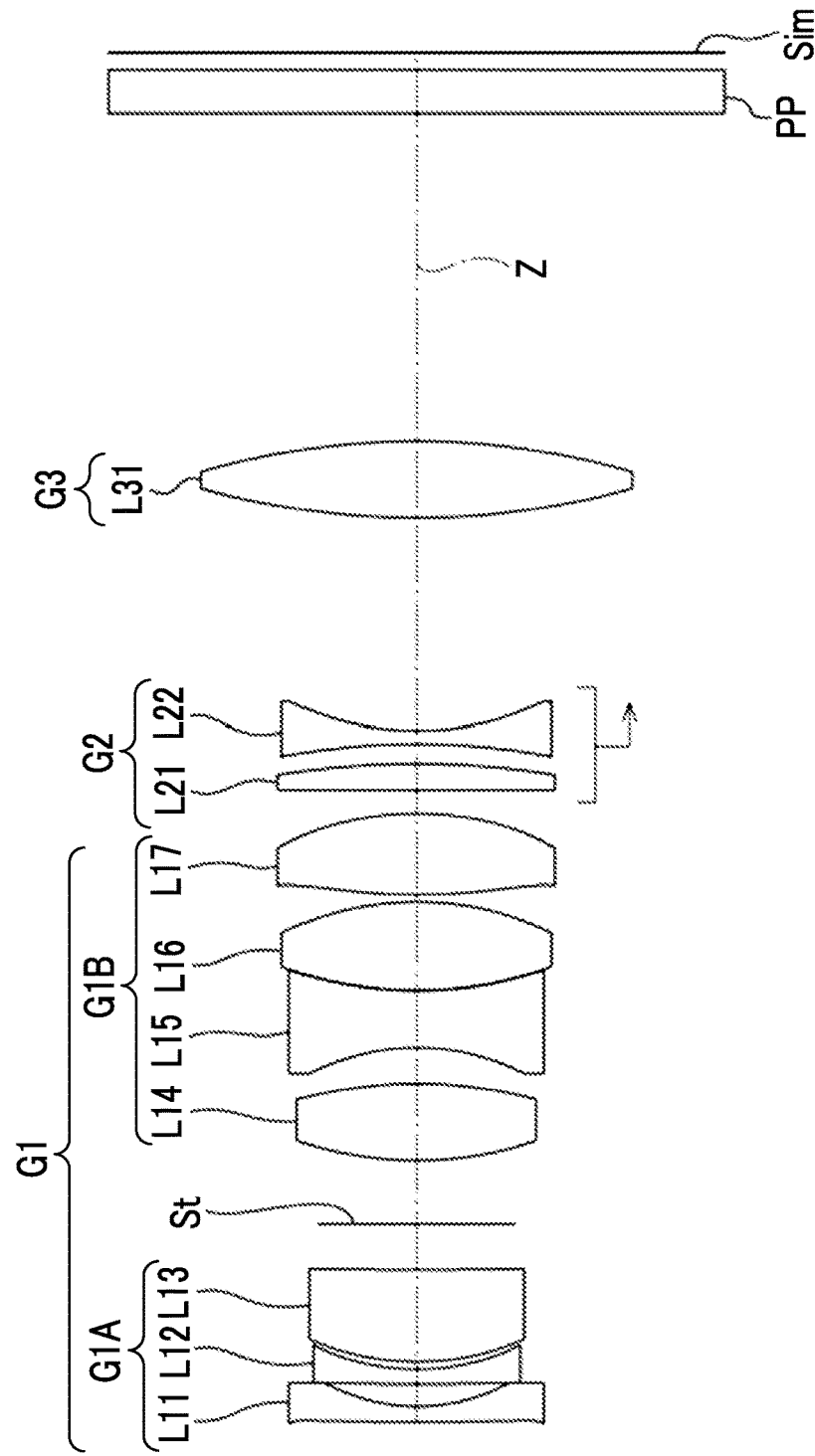
FIG. 15 is a cross-sectional view showing a configuration of an imaging lens of Example 7.

FIG. 15 is a cross-sectional view of a configuration of the imaging lens of Example 7. The imaging lens according to Example 7 has the same configuration as the outline of the imaging lens according to Example 1. Each group of the imaging lens of Example 7 is configured as follows. The first A group G1A consists of three lenses L11 to L13, in order from the object side to the image side. The first B group G1B consists of four lenses L14 to L17, in order from the object side to the image side. The second lens group G2 consists of two lenses L21 and L22, in order from the object side to the image side. The third lens group G3 consists of one lens L31.

Figure 16:
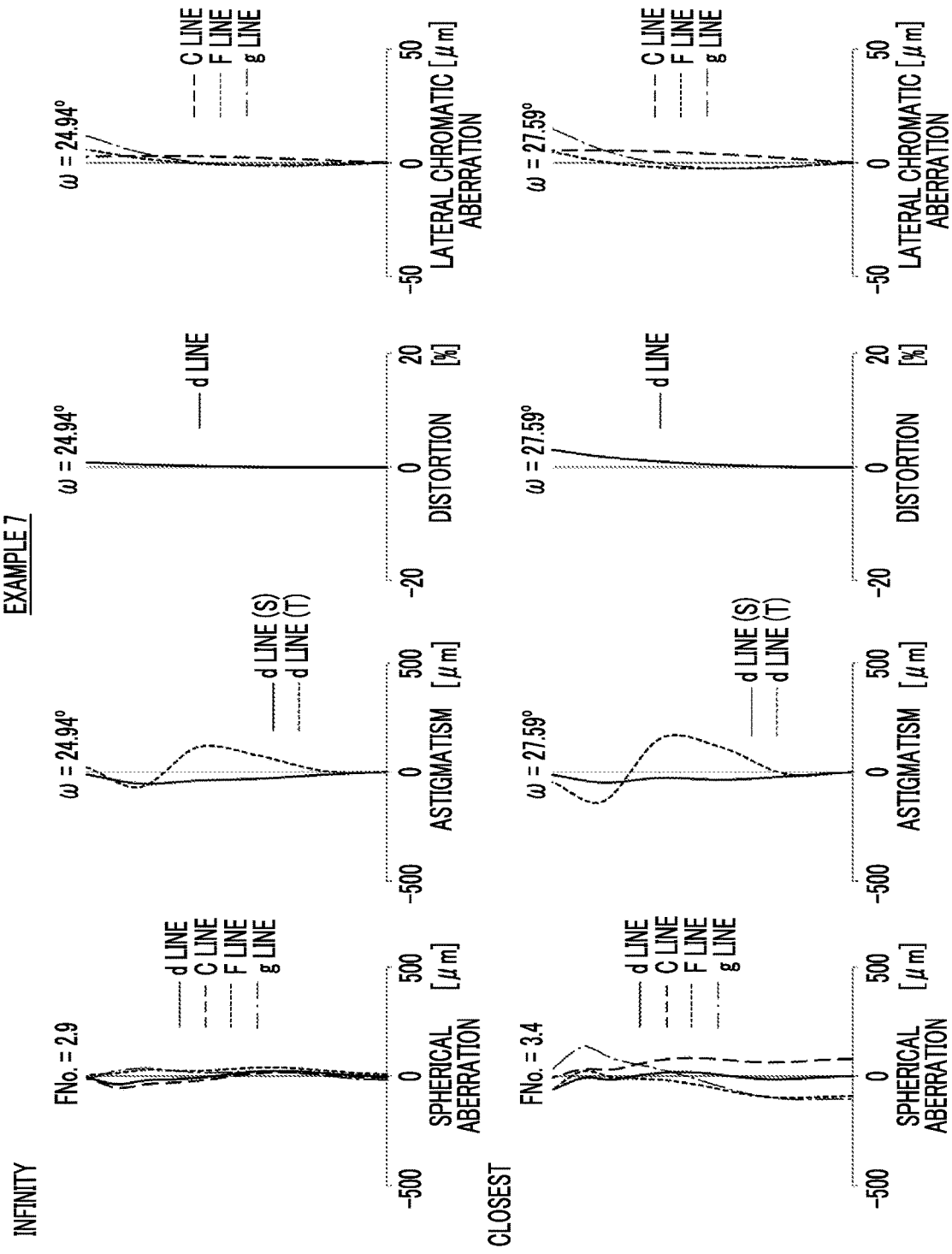
FIG. 16 is a diagram showing aberrations of the imaging lens of Example 7.

Regarding the imaging lens of Example 7, Table 19 shows basic lens data, Table 20 shows specifications and variable surface spacings, and Table 21 shows aspherical coefficients thereof. FIG. 16 shows aberration diagrams. In Example 7, the distance on the optical axis from the lens surface closest to the object side to the closest object is 19.4 millimeters (mm).

TABLE 19

Example 7

| Sn | R | D | Nd | vd | θgF | ED |
|---|---|---|---|---|---|---|
| *1 | 270.32934 | 1.000 | 1.51633 | 64.06 | 0.53345 | 13.46 |
| *2 | 11.64736 | 1.472 | | | | 12 |
| 3 | 259.73884 | 0.962 | 1.51633 | 64.14 | 0.53531 | 12 |
| 4 | 15.02073 | 0.500 | | | | 12.39 |
| 5 | 17.40981 | 6.000 | 1.95375 | 32.32 | 0.59015 | 12.71 |
| 6 | 439.01859 | 3.000 | | | | 12.72 |
| 7(St) | ∞ | 4.200 | | | | |
| 8 | 24.01356 | 5.000 | 1.49700 | 81.54 | 0.53748 | 13.97 |
| 9 | −30.58816 | 2.361 | | | | 13.78 |
| 10 | −15.26252 | 3.739 | 1.77047 | 29.74 | 0.59514 | 13.24 |
| 11 | 25.53316 | 5.804 | 1.49700 | 81.54 | 0.53748 | 14.76 |
| 12 | −19.82076 | 0.500 | | | | 16 |
| *13 | 37.56274 | 5.314 | 1.69350 | 53.18 | 0.54831 | 16.77 |
| *14 | −20.10107 | DD[14] | | | | 17.2 |
| 15 | 1987.66970 | 1.743 | 1.98613 | 16.48 | 0.66558 | 16.6 |
| 16 | −56.37373 | 1.281 | | | | 16.5 |
| *17 | −46.05653 | 0.850 | 1.88202 | 37.22 | 0.57699 | 15.9 |
| *18 | 18.72967 | DD[18] | | | | 15.62 |
| 19 | 52.75980 | 4.986 | 1.53996 | 59.73 | 0.54432 | 25.47 |
| 20 | −50.23753 | 21.487 | | | | 25.9 |
| 21 | ∞ | 2.850 | 1.51680 | 64.20 | 0.53430 | |
| 22 | ∞ | 1.090 | | | | |

TABLE 20

Example 7

| | Infinity | Closest |
|---|---|---|
| Focal length | 30.286 | 21.049 |
| F number | 2.9 | |
| Maximum total angle of view [°] | 49.88 | 55.18 |
| Maximum image height | 14.2 | |
| DD[14] | 1.500 | 10.326 |
| DD[18] | 13.937 | 5.111 |

TABLE 21

Example 7

| Sn | 1 | 2 | 13 |
|---|---|---|---|
| KA | 1.0000000E+00 | 1.0000000E+00 | 1.0000000E+00 |
| A4 | −3.6249366E−05 | −9.6618862E−05 | −3.6111665E−05 |

TABLE 21-continued

Example 7

| Sn | 1 | 2 | 13 |
|---|---|---|---|
| A6 | 2.3602117E−06 | 8.9697789E−08 | −2.8786739E−07 |
| A8 | −1.1314020E−07 | −3.7881533E−09 | 5.4285549E−09 |
| A10 | 4.5465690E−09 | 4.8346527E−09 | −1.3065874E−10 |
| A12 | −1.2922120E−10 | −3.5592836E−10 | 3.5490850E−13 |
| A14 | 2.0127899E−12 | 9.1096922E−12 | 1.1583824E−14 |
| A16 | −1.2572214E−14 | −8.0432873E−14 | −1.3689382E−16 |

| Sn | 14 | 17 | 18 |
|---|---|---|---|
| KA | 1.0000000E+00 | 1.0000000E+00 | 1.0000000E+00 |
| A4 | 3.7560682E−06 | 1.5772593E−05 | 1.0359306E−05 |
| A6 | −1.6483000E−07 | −2.0595856E−07 | −2.0779291E−07 |
| A8 | 5.3914712E−10 | −2.3497775E−10 | −1.3049778E−09 |
| A10 | −2.7276202E−11 | 5.4091083E−12 | 8.9718792E−13 |
| A12 | −3.9255839E−13 | −1.2628348E−13 | 3.4758596E−13 |
| A14 | 8.8726309E−15 | 7.3379350E−15 | 1.4631674E−15 |
| A16 | −6.9845257E−17 | −6.4713887E−17 | −4.4604539E−17 |

Example 8

Figure 17:
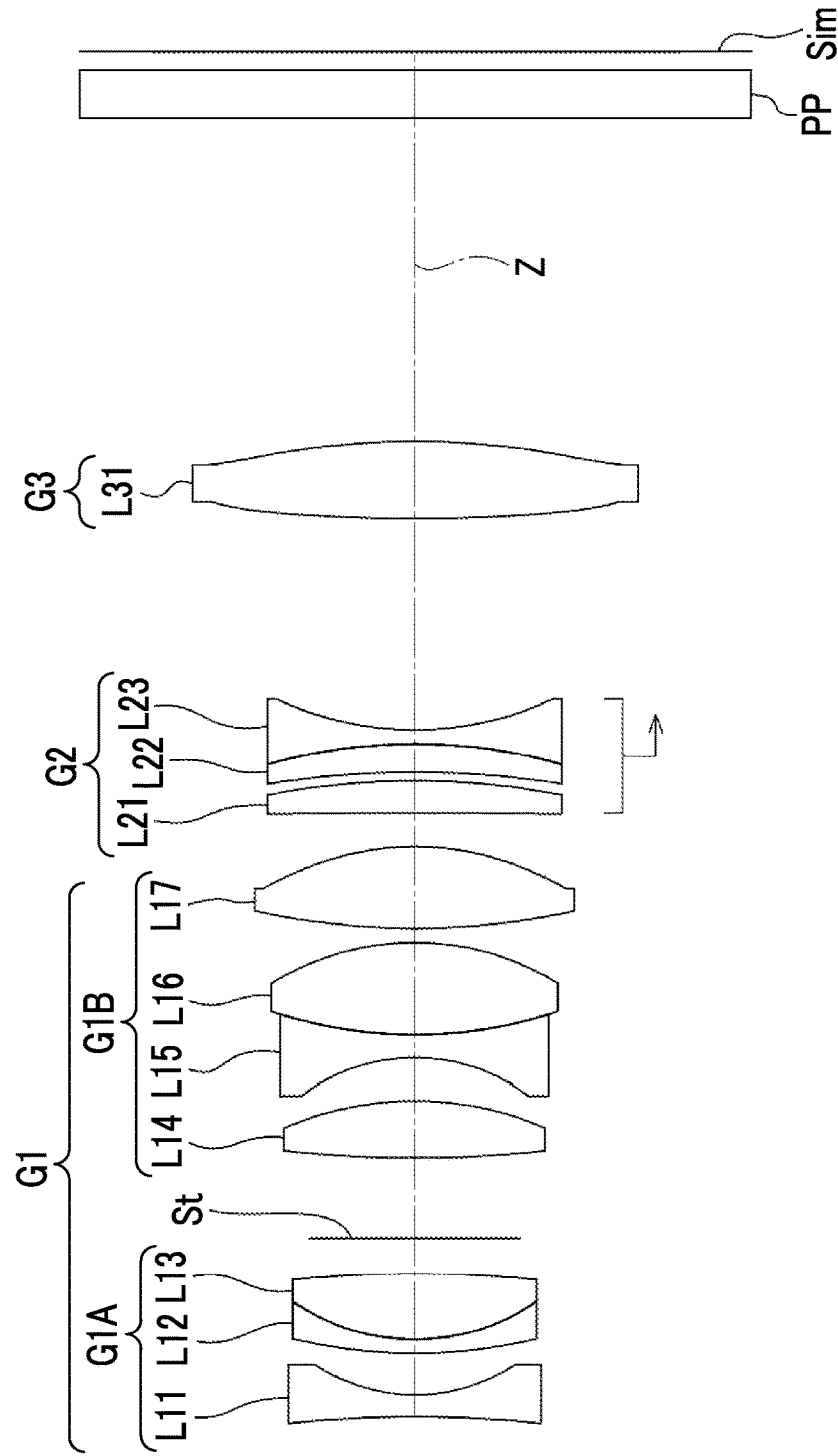
FIG. 17 is a cross-sectional view showing a configuration of an imaging lens of Example 8.

FIG. 17 is a cross-sectional view of a configuration of the imaging lens of Example 8. The imaging lens according to Example 8 has the same configuration as the outline of the imaging lens according to Example 1. Each group of the imaging lens of Example 8 is configured as follows. The first A group G1A consists of three lenses L11 to L13, in order from the object side to the image side. The first B group G1B consists of four lenses L14 to L17, in order from the object side to the image side. The second lens group G2 consists of three lenses L21 to L23, in order from the object side to the image side. The third lens group G3 consists of one lens L31.

Figure 18:
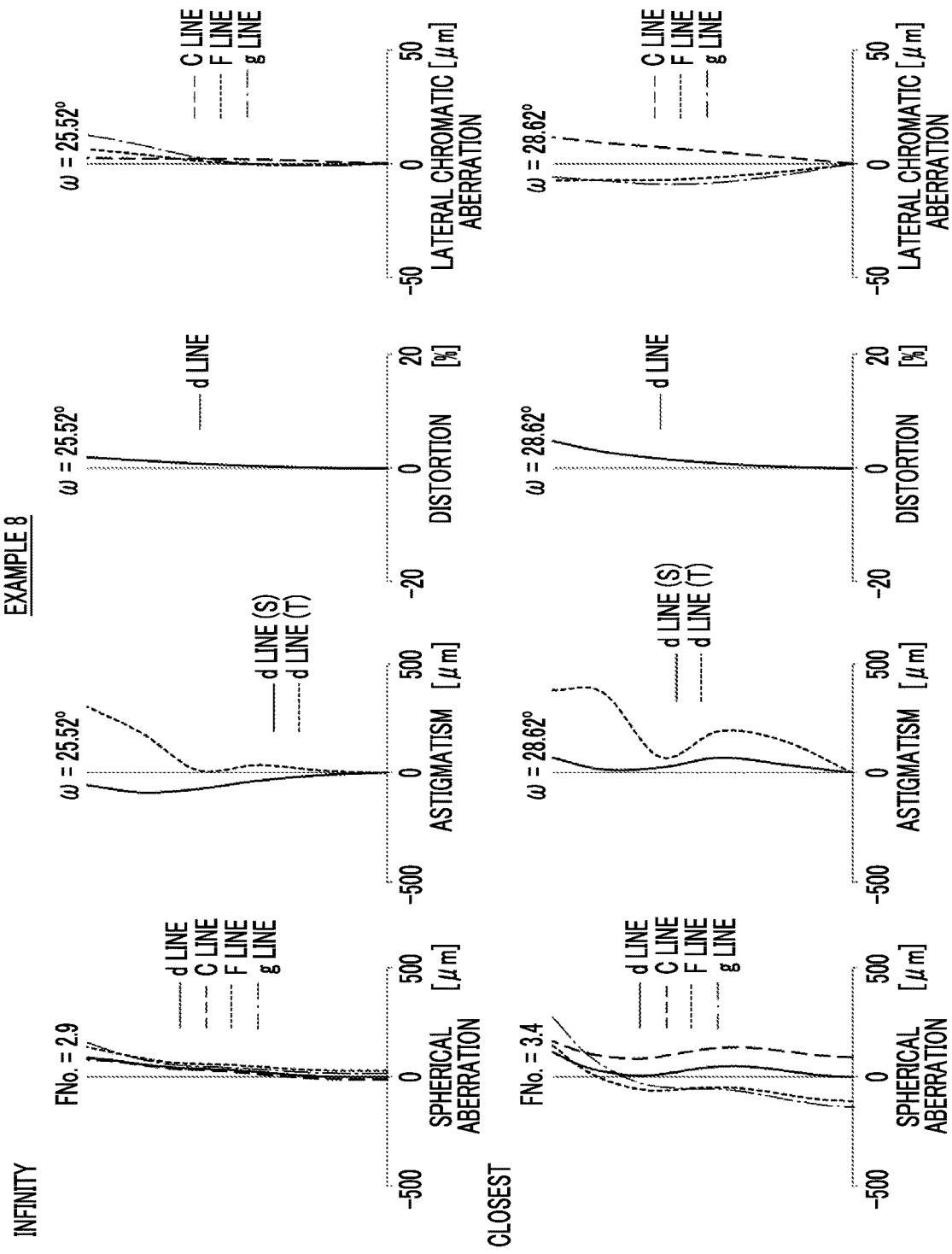
FIG. 18 is a diagram showing aberrations of the imaging lens of Example 8.

Regarding the imaging lens of Example 8, Table 22 shows basic lens data, Table 23 shows specifications and variable surface spacings, and Table 24 shows aspherical coefficients thereof. FIG. 18 shows aberration diagrams. In Example 8, the distance on the optical axis from the lens surface closest to the object side to the closest object is 19.0 mm (millimeter).

TABLE 22

Example 8

| Sn | R | D | Nd | vd | θgF | ED |
|---|---|---|---|---|---|---|
| *1 | −67.39110 | 1.290 | 1.51633 | 64.06 | 0.53345 | 13.13 |
| *2 | 10.07842 | 2.505 | | | | 11.47 |
| 3 | 31.05857 | 0.820 | 1.58313 | 59.37 | 0.54345 | 12.04 |
| 4 | 12.52622 | 3.959 | 1.74950 | 35.28 | 0.58704 | 12.42 |
| 5 | −75.60569 | 2.150 | | | | 12.56 |
| 6(St) | ∞ | 4.787 | | | | |
| 7 | 67.03506 | 3.398 | 1.49700 | 81.54 | 0.53748 | 13.13 |
| 8 | −19.39792 | 2.547 | | | | 13.16 |
| 9 | −11.20208 | 1.403 | 1.77047 | 29.74 | 0.59514 | 12.52 |
| 10 | 26.88087 | 5.478 | 1.49700 | 81.54 | 0.53748 | 14.18 |
| 11 | −16.12545 | 0.832 | | | | 15.64 |
| *12 | 38.87657 | 4.959 | 1.67686 | 54.80 | 0.54548 | 16.91 |
| *13 | −16.02165 | DD[13] | | | | 17 |
| 14 | −435.70255 | 1.923 | 1.98613 | 16.48 | 0.66558 | 16.23 |
| 15 | −44.88585 | 0.500 | | | | 16.14 |
| 16 | −56.64859 | 1.699 | 1.51602 | 56.81 | 0.54650 | 15.77 |
| 17 | −32.00739 | 0.850 | 1.90043 | 37.37 | 0.57720 | 15.44 |
| 18 | 19.22730 | DD[18] | | | | 15.14 |

TABLE 22-continued

Example 8

| Sn | R | D | Nd | vd | θgF | ED |
|---|---|---|---|---|---|---|
| *19 | 110.00175 | 4.636 | 1.58313 | 59.38 | 0.54237 | 23.31 |
| *20 | −44.99952 | 19.325 | | | | 23.82 |
| 21 | ∞ | 2.850 | 1.51680 | 64.20 | 0.53430 | |
| 22 | ∞ | 1.087 | | | | |

TABLE 23

Example 8

| | Infinity | Closest |
|---|---|---|
| Focal length | 29.194 | 19.345 |
| F number | 2.9 | |
| Maximum total angle of view [°] | 51.04 | 57.24 |
| Maximum image height | 14.2 | |
| DD[13] | 2.000 | 10.497 |
| DD[18] | 12.667 | 4.170 |

TABLE 24

Example 8

| Sn | 1 | 2 | 12 | 13 |
|---|---|---|---|---|
| KA | 1.0000000E+00 | 1.0000000E+00 | 1.0000000E+00 | 1.0000000E+00 |
| A4 | 7.1622011E−05 | −3.7826520E−05 | −1.6249935E−05 | 4.0751714E−05 |
| A6 | −3.3757918E−06 | −3.0426797E−06 | −1.3169766E−07 | −2.1889408E−07 |
| A8 | 6.6052255E−08 | −2.0645317E−08 | 2.5634962E−09 | 4.1191584E−09 |
| A10 | 6.6765253E−10 | 5.1126824E−09 | −1.8504408E−11 | −2.7541253E−11 |
| A12 | −6.4842713E−11 | −2.1792257E−10 | 1.6803302E−13 | 1.2961044E−13 |
| A14 | 1.2557083E−12 | 4.0250135E−12 | −3.2209765E−15 | −2.3903722E−15 |
| A16 | −8.2810496E−15 | −2.7904566E−14 | 2.6682905E−17 | 2.2957749E−17 |

| Sn | 19 | 20 |
|---|---|---|
| KA | 1.0000000E+00 | 1.0000000E+00 |
| A3 | 0.0000000E+00 | 0.0000000E+00 |
| A4 | 1.5415610E−05 | 1.1757716E−05 |
| A5 | −1.2498514E−06 | −6.1384342E−07 |
| A6 | −7.0169809E−09 | 2.9685985E−09 |
| A7 | 7.3651317E−10 | −2.4173763E−09 |
| A8 | 3.4002934E−10 | 1.0357058E−10 |
| A9 | 3.1662388E−11 | 1.4800031E−11 |
| A10 | 5.0581360E−14 | 1.9936957E−12 |
| A11 | 4.9811466E−15 | 1.4512695E−13 |
| A12 | 4.0450391E−15 | −3.8887908E−15 |
| A13 | −5.4428140E−16 | −5.5223835E−16 |
| A14 | 9.3095005E−18 | −1.3698012E−17 |
| A15 | 2.3760854E−18 | 3.1949555E−18 |
| A16 | −2.7850343E−19 | 1.0498428E−19 |
| A17 | −3.3106356E−20 | −2.8635695E−20 |
| A18 | 1.1067282E−21 | −2.5334929E−21 |
| A19 | 2.4552496E−24 | 1.8357606E−22 |
| A20 | 9.2158546E−24 | 5.1008987E−24 |

Tables 25 to 28 show the corresponding values of Conditional Expressions (1) to (46) of the imaging lenses of Examples 1 to 8. In Tables 25 to 28, diagonal lines are noted in cells where there is no corresponding lens. Preferable ranges of the conditional expressions may be set by using the corresponding values of the examples shown in Tables 25 to 28 as the upper limits or the lower limits of the conditional expressions.

TABLE 25

| Expression number | | Example 1 | Example 2 | Example 3 | Example 4 |
|---|---|---|---|---|---|
| (1) | $|\beta|$ | 1 | 1 | 1 | 1 |
| (2) | f1A/f1B | −3.068 | −3.002 | −2.474 | −2.554 |
| (3) | ν1Bp1 | 81.54 | 81.54 | 81.54 | 81.54 |
| (4) | DMpa/DMp | 0.931 | 0.950 | 0.974 | 0.964 |
| (5) | N1Bp − N1Bn | −0.27347 | −0.17961 | 0.31109 | −0.31109 |
| (6) | ν1Bp − ν1Bn | 51.81 | 45.20 | 58.78 | 58.78 |
| (7) | θ1Bp − θ1Bn | −0.05766 | −0.06539 | −0.0912 | −0.0912 |
| (8) | f/f1B | 0.641 | 1.912 | 1.831 | 1.971 |

TABLE 25-continued

| Expression number | | Example 1 | Example 2 | Example 3 | Example 4 |
|---|---|---|---|---|---|
| (9) | $\nu 2min$ | 16.48 | 16.48 | 17.47 | 17.47 |
| (10) | $(1-\beta 2i^2) \times \beta ri^2$ | −3.992 | −4.819 | −4.415 | −4.808 |
| (11) | f/f3 | 0.479 | 0.433 | −0.011 | |
| (12) | Expm/Expi | 0.682 | 0.779 | 0.891 | 0.919 |
| (13) | f/f1 | 0.664 | 2.311 | 2.347 | 2.410 |
| (14) | (R1f + R1r)/(R1f − R1r) | 1.092 | 1.791 | 2.031 | 2.171 |
| (15) | Bf/(f × tanωi) | 1.507 | 1.354 | 1.448 | 2.589 |
| (16) | N2p − N2n | −0.2103 | −0.3841 | | |
| (17) | $\nu$2p − $\nu$2n | −7.05 | 26.77 | | |
| (18) | θ2p − θ2n | 0.02537 | −0.04189 | | |
| (19) | N2n | 1.883 | 1.90043 | | |
| (20) | $\nu$2n | 39.22 | 37.37 | | |
| (21) | (R3f + R3r)/(R3f − R3r) | 1.174 | 0.688 | 0.669 | |
| (22) | M2/f | 0.290 | 0.240 | 0.274 | 0.246 |
| (23) | D1St/TL | 0.145 | 0.117 | 0.169 | 0.172 |

TABLE 26

| Expression number | | Example 1 | Example 2 | Example 3 | Example 4 |
|---|---|---|---|---|---|
| (24) | f/f1A | −0.209 | −0.637 | −0.740 | −0.772 |
| (25) | M2/TL | 0.103 | 0.096 | 0.108 | 0.104 |
| (26) | (R2f − R2r)/(R2f + R2r) | −0.160 | −0.054 | 0.099 | 0.039 |
| (27) | f/f2 | −1.352 | −1.655 | −1.142 | −1.258 |
| (28) | f1/f2 | −0.636 | −0.557 | −0.712 | −0.763 |
| (29) | f1/f3 | 0.722 | 0.187 | −0.005 | |
| (30) | f2/f3 | −0.354 | −0.261 | 0.009 | |
| (31) | Z2min | 0.086 | 0.06 | 0.096 | 0.085 |
| (32) | $(1 - \beta 2m^2) \times \beta rm^2$ | −2.968 | −3.581 | −2.994 | −3.420 |
| (33) | ED3m/ED3i | 0.798 | 0.803 | 0.850 | |
| (34) | D2min/TL | 0.006 | 0.007 | 0.007 | 0.007 |
| (35) | N3p − N3n | | | −0.43633 | |
| (36) | $\nu$3p − $\nu$3n | | | 19.87 | |
| (37) | θ3p − θ3n | | | −0.03099 | |
| (38) | N3p | | | 1.51742 | |
| (39) | (R1Bf + R1Br)/(R1Bf − R1Br) | −4.863 | −4.799 | −3.171 | −3.263 |
| (40) | N1Ap − N1An | | 0.13479 | | |
| (41) | $\nu$1Ap − $\nu$1An | | −32.76 | | |
| (42) | θ1Ap − θ1An | | 0.06728 | | |
| (43) | (R1Baf − R1Bar)/(R1Baf + R1Bar) | 0.237 | 0.082 | 0.025 | −0.012 |
| (44) | (R2af − R2ar)/(R2af + R2ar) | −0.160 | −0.054 | 0.099 | 0.039 |
| (45) | D1Bmin/TL | 0.007 | 0.007 | 0.006 | 0.009 |
| (46) | arctan(Ymax/f) | 26.00 | 26.01 | 25.49 | 24.72 |

TABLE 27

| Expression number | | Example 5 | Example 6 | Example 7 | Example 8 |
|---|---|---|---|---|---|
| (1) | $|\beta|$ | 0.5 | 1 | 1 | 1 |
| (2) | f1A/f1B | −2.975 | −4.201 | −2.872 | −5.752 |
| (3) | $\nu$1Bp1 | 64.14 | 81.54 | 81.54 | 81.54 |
| (4) | DMpa/DMp | 0.992 | 0.919 | 0.969 | 0.925 |
| (5) | N1Bp − N1Bn | −0.353 | −0.22407 | 0.27347 | −0.27347 |
| (6) | $\nu$1Bp − $\nu$1Bn | 54.52 | 48.18 | 51.81 | 51.81 |
| (7) | θ1Bp − θ1Bn | −0.07187 | −0.07425 | −0.05766 | −0.05766 |
| (8) | f/f1B | 1.309 | 1.717 | 1.610 | 1.643 |
| (9) | $\nu$2min | 16.48 | 16.48 | 16.48 | 16.48 |
| (10) | $(1-\beta 2i^2) \times \beta ri^2$ | −2.896 | −3.837 | −3.814 | −3.900 |
| (11) | f/f3 | 0.121 | 0.596 | 0.625 | 0.526 |
| (12) | Expm/Expi | 0.916 | 0.625 | 0.518 | 0.662 |
| (13) | f/f1 | 1.940 | 2.051 | 2.007 | 2.060 |
| (14) | (R1f + R1r)/(R1f − R1r) | 1.385 | 1.547 | 1.090 | 0.740 |
| (15) | Bf/(f × tanωi) | 1.023 | 1.374 | 1.701 | 1.592 |
| (16) | N2p − N2n | | −0.42203 | | −0.38441 |
| (17) | $\nu$2p − $\nu$2n | | 16.53 | | 19.44 |
| (18) | θ2p − θ2n | | −0.02315 | | −0.03070 |

TABLE 27-continued

| Expression number | | Example 5 | Example 6 | Example 7 | Example 8 |
|---|---|---|---|---|---|
| (19) | N2n | | 1.95375 | | 1.90043 |
| (20) | ν2n | | 32.32 | | 37.37 |
| (21) | (R3f + R3r)/(R3f − R3r) | 1.345 | 1.052 | 0.024 | 0.419 |
| (22) | M2/f | 0.191 | 0.304 | 0.291 | 0.292 |
| (23) | D1St/TL | 0.224 | 0.127 | 0.146 | 0.133 |

TABLE 28

| Expression number | | Example 5 | Example 6 | Example 7 | Example 8 |
|---|---|---|---|---|---|
| (24) | f/f1A | −0.440 | −0.409 | −0.560 | −0.286 |
| (25) | M2/TL | 0.055 | 0.122 | 0.099 | 0.105 |
| (26) | (R2f − R2r)/(R2f + R2r) | −0.094 | −0.039 | 0.101 | 1.092 |
| (27) | f/f2 | −0.812 | −1.473 | −1.415 | −1.367 |
| (28) | f1/f2 | −0.762 | −0.699 | −0.689 | −0.691 |
| (29) | f1/f3 | 0.062 | 0.291 | 0.311 | 0.255 |
| (30) | f2/f3 | −0.148 | −0.405 | −0.441 | −0.384 |
| (31) | Z2min | 0.126 | 0.06 | 0.082 | 0.059 |
| (32) | $(1 - \beta 2m^2) \times \beta rm^2$ | −2.356 | −3.244 | −3.092 | −2.999 |
| (33) | ED3m/ED3i | 0.908 | 0.737 | 0.770 | 0.785 |
| (34) | D2min/TL | 0.008 | 0.007 | 0.014 | 0.006 |
| (35) | N3p − N3n | −0.48913 | | | |
| (36) | ν3p − ν3n | 65.06 | | | |
| (37) | θ3p − θ3n | −0.1281 | | | |
| (38) | N3p | 1.49700 | | | |
| (39) | (R1Bf + R1Br)/(R1Bf − R1Br) | −6.646 | −3.468 | −7.697 | −5.551 |
| (40) | N1Ap − N1An | | | | 0.16637 |
| (41) | ν1Ap − ν1An | | | | −24.09 |
| (42) | θ1Ap − θ1An | | | | 0.04359 |
| (43) | (R1Baf − R1Bar)/(R1Baf + R1Bar) | 0.062 | 0.205 | 0.334 | 0.268 |
| (44) | (R2af − R2ar)/(R2af + R2ar) | −0.094 | −0.039 | 0.101 | −0.116 |
| (45) | D1Bmin/TL | 0.002 | 0.013 | 0.006 | 0.010 |
| (46) | arctan(Ymax/f) | 37.44 | 25.89 | 25.12 | 26.01 |

The imaging lenses of Examples 1 to 8 each have an absolute value of the maximum imaging magnification of 0.5 or more. In particular, the imaging lenses of Examples 1 to 4 and 6 to 8 each have an absolute value of the maximum imaging magnification of 1, and each have a high imaging magnification. Further, although the imaging lenses of Examples 1 to 8 each are configured to have a small size, various aberrations are satisfactorily corrected in both a state where the infinite distance object is in focus and a state where the closest object is in focus, and thus high optical performance is maintained.

In a lens system used in an imaging apparatus such as a digital camera, there is a demand for a lens system that has a high imaging magnification. In the lens system having a high imaging magnification, a front focus type is often used. However, since the front focus type tends to increase the weight of the focus group, there may be a disadvantage in achieving an increase in focus speed. Compared to the front focus type, the inner focus type tends to reduce the weight of the focus group. However, for the conventional inner focus type lens system, it is not easy to improve optical performance in closeup imaging. On the other hand, the imaging lenses of Examples 1 to 8 of the present disclosure achieve a small-size configuration, a high imaging magnification, and high performance in a closeup imaging state, in an inner focus type lens system in which the focus group is reduced in weight.

Figure 19:
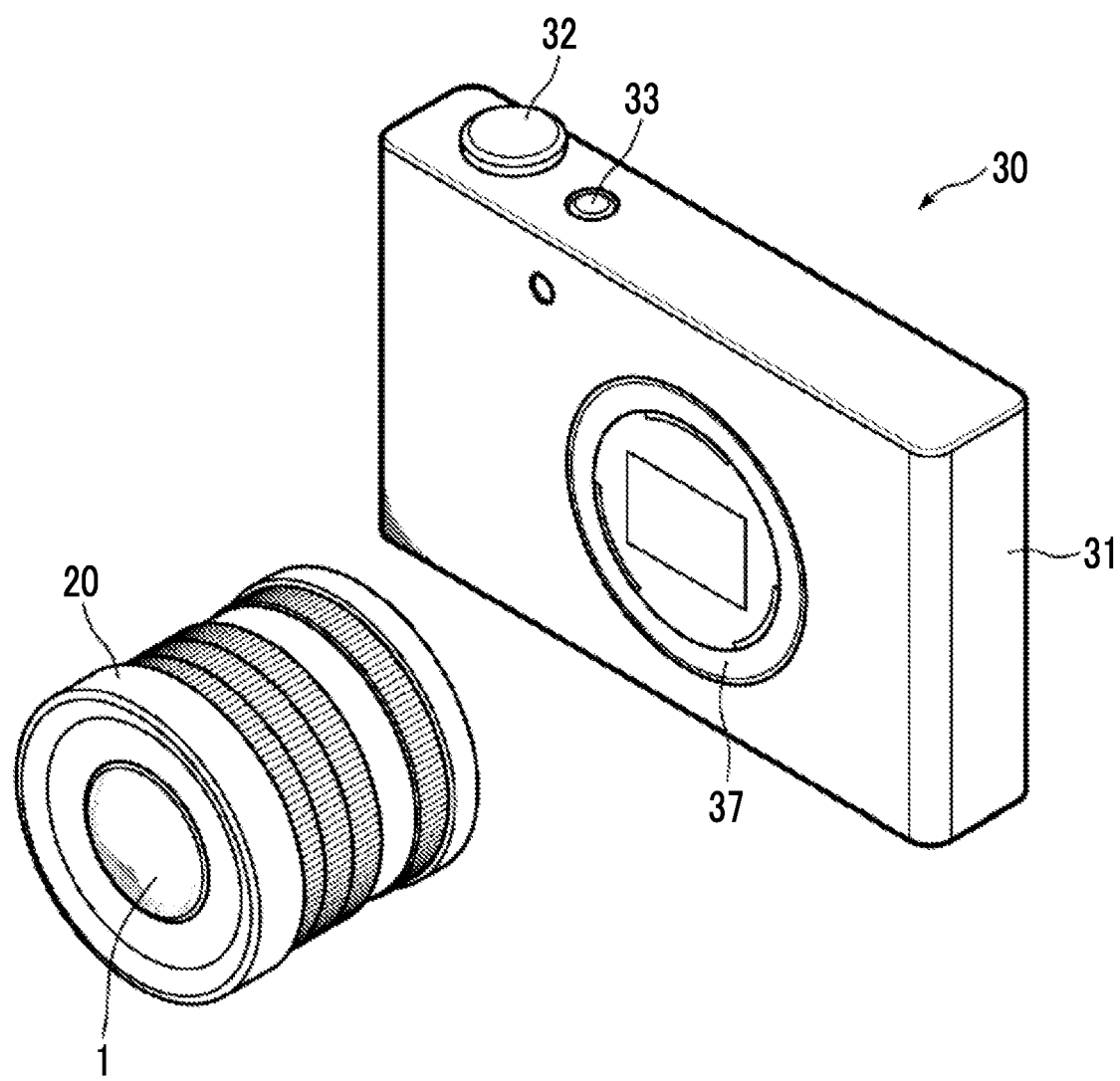
FIG. 19 is a perspective view showing a front side of an imaging apparatus according to an embodiment.
Figure 20:
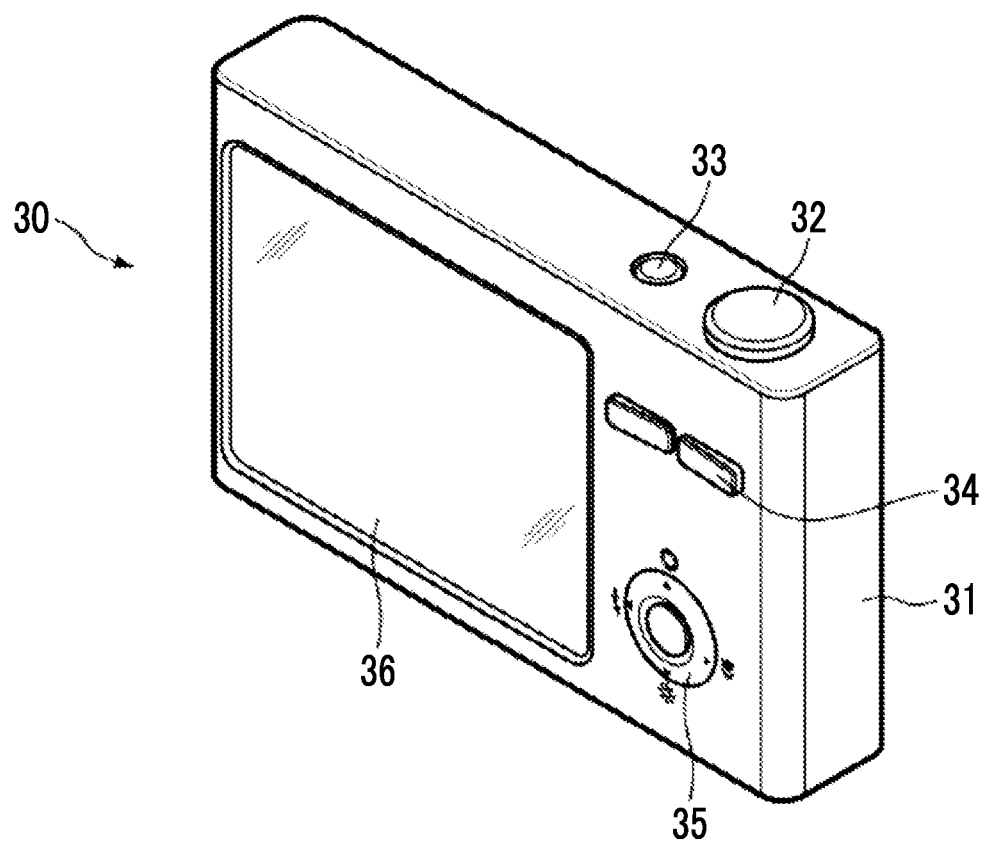
FIG. 20 is a perspective view showing a rear side of the imaging apparatus according to the embodiment.

Next, an imaging apparatus according to an embodiment of the present disclosure will be described. FIGS. 19 and 20 are external views of a camera 30 which is the imaging apparatus according to the embodiment of the present disclosure. FIG. 19 is a perspective view of the camera 30 viewed from a front side, and FIG. 20 is a perspective view of the camera 30 viewed from a rear side. The camera 30 is a so-called mirrorless type digital camera, and the interchangeable lens 20 can be removably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique according to the embodiment of the present disclosure has been hitherto described through embodiments and examples, but the technique according to the embodiment of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side to an image side:
   a first lens group that has a positive refractive power;
   a second lens group that has a negative refractive power; and
   a third lens group that remains stationary with respect to an image plane during focusing,
   wherein only the second lens group moves along an optical axis during focusing,
   the first lens group consists of a first A group, an aperture stop, and a first B group, in order from the object side to the image side,
   the second lens group includes at least one positive lens, and
   assuming that
      a maximum imaging magnification is $\beta$,
      a focal length of the first A group is f1A,
      a focal length of the first B group is f1B,
      a focal length of the imaging lens in a state where an infinite distance object is in focus is f, and
      a focal length of the third lens group is f3,
   Conditional Expressions (1), (2-2), (8-2), and (11) are satisfied, which are represented by $0.45 < |\beta|$         (1), $-6 < f1A/f1B < -2.4$         (2-2), $0.6 < f/f1B < 2$         (8-2), and $-0.3 < f/f3 < 0.8$         (11).

2. The imaging lens according to claim 1,
   wherein the first B group includes a positive lens at a position closest to the object side, and
   assuming that an Abbe number of the positive lens closest to the object side in the first B group based on a d line is v1Bp1,
   Conditional Expression (3) is satisfied, which is represented by $60 < v1Bp1 < 105$         (3).

3. The imaging lens according to claim 1,
   wherein the first B group includes a positive lens at a position closest to the image side, and
   assuming that
      a larger diameter of a diameter of an on-axis luminous flux in a state where an infinite distance object is in focus and a diameter of an on-axis luminous flux in a state where a closest object is in focus, on an object side surface of the positive lens closest to the image side in the first B group is DMp, and
      a larger diameter of a diameter of the on-axis luminous flux in a state where the infinite distance object is in focus and a diameter of the on-axis luminous flux in a state where the closest object is in focus, on an image side surface of a lens adjacent to the object side of the positive lens closest to the image side in the first B group is DMpa,
   Conditional Expression (4) is satisfied, which is represented by $0.5 < DMpa/DMp < 1$         (4).

4. The imaging lens according to claim 1,
   wherein the first B group includes a cemented lens consisting of one negative lens and one positive lens, and
   assuming that
      a refractive index of the positive lens of the cemented lens of the first B group at a d line is N1Bp,
      a refractive index of the negative lens of the cemented lens of the first B group at the d line is N1Bn,
      an Abbe number of the positive lens of the cemented lens of the first B group based on the d line is v1Bp,
      an Abbe number of the negative lens of the cemented lens of the first B group based on the d line is v1Bn,
      a partial dispersion ratio of the positive lens of the cemented lens in the first B group between a g line and an F line is θ1Bp, and
      a partial dispersion ratio of the negative lens of the cemented lens of the first B group between the g line and the F line is θ1Bn,
   Conditional Expressions (5), (6), and (7) are satisfied, which are represented by $-0.5 < N1Bp - N1Bn < 0$         (5), $30 < v1Bp - v1Bn < 70$         (6), and $-0.1 < \theta1Bp - \theta1Bn < -0.03$         (7).

5. The imaging lens according to claim 1,
   wherein the first A group includes at least one positive lens.

6. The imaging lens according to claim 1,
   wherein assuming that a minimum value of Abbe numbers of all positive lenses of the second lens group based on the d line is v2 min, Conditional Expression (9) is satisfied, which is represented by $10 < v2\ min < 22$         (9).

7. The imaging lens according to claim 1,
   wherein in a case where one lens component is one single lens or one cemented lens, the third lens group consists of one lens component.

8. The imaging lens according to claim 1,
   wherein assuming that
      a focal length of the first lens group is f1,
   Conditional Expression (13) is satisfied, which is represented by $0.2 < f/f1 < 4$         (13).

9. The imaging lens according to claim 1,
   wherein in a case where one lens component is one single lens or one cemented lens, assuming that
      a paraxial curvature radius of a surface closest to the object side in the lens component closest to the object side in the imaging lens is R1f, and a paraxial curvature radius of a surface closest to the image side in the lens component closest to the object side in the imaging lens is R1r, Conditional Expression (14) is satisfied, which is represented by $$0<(R1f+R1r)/(R1f-R1r)<3 \qquad (14).$$

10. The imaging lens according to claim 1,
wherein assuming that
an air-equivalent distance on an optical axis from a lens surface closest to the image side in the imaging lens to the image plane in a state where an infinite distance object is in focus is Bf, and
a maximum half angle of view in a state where the infinite distance object is in focus is ωi, Conditional Expression (15) is satisfied, which is represented by $$0.3<Bf/(f \times \tan \omega i)<4 \qquad (15).$$

11. The imaging lens according to claim 1,
wherein the second lens group includes at least two positive lenses.

12. The imaging lens according to claim 1,
wherein the second lens group includes a cemented lens consisting of one positive lens and one negative lens, and
assuming that
a refractive index of the positive lens of the cemented lens of the second lens group at a d line is N2p,
a refractive index of the negative lens of the cemented lens of the second lens group at the d line is N2n,
an Abbe number of the positive lens of the cemented lens of the second lens group based on the d line is ν2p,
an Abbe number of the negative lens of the cemented lens of the second lens group based on the d line is ν2n,
a partial dispersion ratio of the positive lens of the cemented lens of the second lens group between a g line and an F line is θ2p, and
a partial dispersion ratio of the negative lens of the cemented lens of the second lens group between the g line and the F line is θ2n, Conditional Expressions (16), (17), and (18) are satisfied, which are represented by $$-0.6<N2p-N2n<-0.1 \qquad (16),$$

$$-20<\nu 2p-\nu 2n<50 \qquad (17), \text{ and}$$

$$-0.3<\theta 2p-\theta 2n<0.15 \qquad (18).$$

13. The imaging lens according to claim 1,
wherein the second lens group includes a cemented lens consisting of one positive lens and one negative lens, and
assuming that
a refractive index of the negative lens of the cemented lens of the second lens group at a d line is N2n, and
an Abbe number of the negative lens of the cemented lens of the second lens group based on the d line is ν2n, Conditional Expressions (19) and (20) are satisfied, which are represented by $$1.75<N2n<2.2 \qquad (19), \text{ and}$$

$$20<\nu 2n<40 \qquad (20).$$

14. An imaging apparatus comprising the imaging lens according to claim 1.

15. An imaging lens comprising, successively in order from a position closest to an object side to an image side:
a first lens group that has a positive refractive power; and
a second lens group that has a negative refractive power,
wherein only the second lens group moves along an optical axis during focusing,
the first lens group consists of a first A group, an aperture stop, and a first B group, in order from the object side to the image side,
the second lens group includes at least one positive lens,
assuming that
a maximum imaging magnification is β,
a focal length of the first A group is f1A, and
a focal length of the first B group is f1B, Conditional Expressions (1) and (2) are satisfied, which are represented by $$0.45<|\beta| \qquad (1), \text{ and}$$

$$-15<f1A/f1B<-1.7 \qquad (2), \text{ and}$$

assuming that
a lateral magnification of the second lens group in a state where an infinite distance object is in focus is β2i,
a combined lateral magnification of all lenses closer to the image side than the second lens group in a state where the infinite distance object is in focus is βri, and
βri=1 in a case where a lens is not disposed closer to the image side than the second lens group, Conditional Expression (10) is satisfied, which is represented by $$-6<(1-\beta 2i^2)\times \beta ri^2<-2 \qquad (10).$$

16. The imaging lens according to claim 15,
wherein Conditional Expression (2-1) is satisfied, which is represented by $$-10<f1A/f1B<-2 \qquad (2-1).$$

17. An imaging apparatus comprising the imaging lens according to claim 15.

18. An imaging lens comprising, successively in order from a position closest to an object side to an image side:
a first lens group that has a positive refractive power; and
a second lens group that has a negative refractive power,
wherein only the second lens group moves along an optical axis during focusing,
the first lens group consists of a first A group, an aperture stop, and a first B group, in order from the object side to the image side,
the second lens group includes at least one positive lens,
assuming that
a maximum imaging magnification is β,
a focal length of the first A group is f1A, and
a focal length of the first B group is f1B, Conditional Expressions (1) and (2) are satisfied, which are represented by $$0.45<|\beta| \qquad (1), \text{ and}$$

$$-15<f1A/f1B<-1.7 \qquad (2), \text{ and}$$

assuming that
a sum of an air-equivalent distance on an optical axis from a lens surface closest to the image side in the imaging lens to an image plane and a distance on the optical axis from a paraxial exit pupil position to a lens surface closest to the image side in the imaging lens in a state in which a closest object is in focus is Expm, and a sum of an air-equivalent distance on the optical axis from the lens surface closest to the image side in the imaging lens to the image plane and a distance on the optical axis from the paraxial exit pupil position to the lens surface closest to the image side in the imaging lens in a state in which an infinite distance object is in focus is Expi, Conditional Expression (12) is satisfied, which is represented by $$0.35 < Expm/Expi < 1 \tag{12}$$

19. The imaging lens according to claim 18, wherein Conditional Expression (2-1) is satisfied, which is represented by $$-10 < f1A/f1B < -2 \tag{2-1}$$

20. An imaging apparatus comprising the imaging lens according to claim 18.

* * * * *